(12) United States Patent
Huc et al.

(10) Patent No.: US 12,145,949 B2
(45) Date of Patent: Nov. 19, 2024

(54) CYCLIC SUPPORTED CATALYSTS

(71) Applicants: UNIVERSITE PARIS-SACLAY, Gif-sur-Yvette (FR); CENTRE NATIONAL DE LA RECHERCHE SCIENTIFIQUE, Paris (FR)

(72) Inventors: Vincent Germain Huc, Orsay (FR); Cyril August Roger Martini, Villebon dur Yvette (FR); Ibrahim Abdellah, Gif sur Yvette (FR); Emmanuelle Schulz, Saint Remy les Chevreuse (FR)

(73) Assignees: UNIVERSITE PARIS-SACLAY, Gif-sur-Yvette (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 190 days.

(21) Appl. No.: 17/559,495

(22) Filed: Dec. 22, 2021

(65) Prior Publication Data

US 2022/0112227 A1 Apr. 14, 2022

Related U.S. Application Data

(63) Continuation-in-part of application No. 16/345,581, filed as application No. PCT/FR2017/052980 on Oct. 27, 2017, now abandoned.

(30) Foreign Application Priority Data

Oct. 27, 2016 (FR) ..................... 16/60471

(51) Int. Cl.
*C07F 15/00* (2006.01)
*B01J 31/18* (2006.01)
*B01J 31/22* (2006.01)
*B01J 31/24* (2006.01)
*C07F 15/06* (2006.01)

(52) U.S. Cl.
CPC ........... *C07F 15/006* (2013.01); *B01J 31/181* (2013.01); *B01J 31/2213* (2013.01); *B01J 31/2273* (2013.01); *B01J 31/2295* (2013.01); *B01J 31/2404* (2013.01); *C07F 15/065* (2013.01); *B01J 2531/822* (2013.01); *B01J 2531/824* (2013.01); *B01J 2531/845* (2013.01)

(58) Field of Classification Search
None
See application file for complete search history.

(56) References Cited

U.S. PATENT DOCUMENTS

2013/0018199 A1\* 1/2013 Katz ................. B01J 31/16
585/277

FOREIGN PATENT DOCUMENTS

| | | |
|---|---|---|
| JP | 2005-255564 | 9/2005 |
| WO | WO 2008/124468 | 10/2008 |
| WO | WO 2011/050300 | 4/2011 |
| WO | WO 2014/033406 | 3/2014 |
| WO | WO 2014/033407 | 3/2014 |

OTHER PUBLICATIONS

Menard et al. Chem. Eur. J., 2013, 19, 10611-10618 (Year: 2013).\*

\* cited by examiner

*Primary Examiner* — Yun Qian
(74) *Attorney, Agent, or Firm* — NIXON & VANDERHYE

(57) ABSTRACT

The present invention relates to ligands based on calixarenes, metal complexes comprising such ligands and their use as homogeneous or heterogeneous catalysts.

3 Claims, No Drawings

CYCLIC SUPPORTED CATALYSTS

CROSS-REFERENCE TO RELATED APPLICATIONS

The present application is a continuation-in-part of copending application Ser. No. 16/345,581, filed Apr. 26, 2019, which was the U.S. national phase of International application PCT/FR2017/052980 filed Oct. 27, 2017, which claims the priority of French patent application No. 16/60471 filed Oct. 27, 2016; the entirety of each of the foregoing applications is hereby expressly incorporated by reference.

BACKGROUND OF THE INVENTION

The present invention relates to ligands based on calixarenes, metal complexes comprising such ligands and their use as homogeneous or heterogeneous catalysts.

Metal catalysis represents, however, a way to accelerate or make possible certain reactions and access a large number of compounds at production costs much lower than the conventional routes of organic synthesis (sometimes requiring a large number of steps).

Requirements with respect to residual metals in products for human use, particularly in products for pharmaceutical use, are at present an obstacle for the use of metal deactivators in the manufacture of such products. For example, the residual ratio of transition metals of classes 1A and 1B must be less than 10 ppm for oral administration and less than 1 ppm for parenteral administration.

Various ways have been proposed to reduce the amount of metal in the finished product without the need for costly and/or tedious purification steps.

Among these methods, heterogeneous catalysis is a way of primary importance. The disadvantage of heterogeneous catalysts, however, is their inferior performance compared to similar homogeneous catalysts. Conversely, the use of homogeneous catalysts that may be separated from the finished product by simple filtration after the reaction in which they were engaged (or after a precipitation step or by ultrafiltration) is an alternative which was explored.

Common to these two pathways is the leaching of metal in the solution due to decomplexation of the ligand, and therefore its presence in the final product.

SUMMARY AND OBJECTS OF THE INVENTION

An object of the present invention is a catalyst having a high catalytic activity compared to the existing catalysts.

Another object of the invention is a catalyst capable of being used as a homogeneous catalyst or as a heterogeneous catalyst readily separable product.

A still further object of the present invention is a catalyst capable of greatly reducing the leaching of metal during the reaction in which it is engaged and obtaining finished products containing a very small amount of metal, in particular less than 100 ppm, or even less than 10 or 5 ppm.

The present invention relates to a compound of general formula (I):

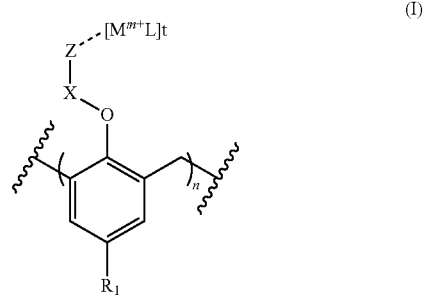

(I)

in which:
n represents an integer from 7 to 20 or greater than 20, in particular 21 to 220,
X is:
  a linear or branched alkyl comprising 1 to 10 carbon atoms, or
  a polyethylene glycol comprising from 1 to 5 units of ethylene glycol, or
  a linear alkyl-O comprising 1 to 10 carbon atoms, or
  (linear or branched alkyl comprising from 0 to 10 carbon atoms)-aryl, the aryl being in particular selected from phenyl and naphthyl,
$R_1$ represents:
  a linear or branched alkyl comprising 1 to 8 carbon atoms, or
  O-linear or branched alkyl comprising 1 to 8 carbon atoms or
  O-(straight or branched alkyl of 0-3 carbon atoms)-aryl,
$M^{m+}$ is a metal in oxidation state m or a metal cluster comprising a plurality of metals in the oxidation state m, where m is 0, 1, 2, 3, 4 or 5, in particular 0, 1, 2 or 3,
L consists of one or more neutral ligands or negatively charged linked to the metal, and
said compound has the formula (IA) in which t is 0 and Z represents a group Q selected from the group consisting of phosphorus ligands such as the phosphonites and phosphinites, with the exception of phosphines and phosphine oxides, N-heterocyclic carbenes such as 4-substituted-1,3-imidazolylidenes, 1,3-imidazolylidenes, 1,3-imidazolinylidenes, 1,2,4-triazolylidenes, 1,3-benzimidazolylidenes, 1,2,4-triazolylidenes and 1,3-thiazolylidenes, or salen ligands,
or said compound has the formula (IB) in which t is 0 and Z represents a group Q', a precursor of a group Q selected from the group consisting of azoliums such as 1,3-imidazolium, 1,3-imidazolinium, 1,3-benzimidazolium, 1,2,4-triazolium, 1,3-thiazolium, precursors of phosphorus ligands with the exception of phosphines and phosphine oxides, or chalcogenides, in particular phosphine sulfides, or salen ligands precursors, in particular derivatives of salicylaldehyde,
or said compound has the formula (IC) wherein t is 1 and Z represents a group Q selected from the group consisting of phosphorus ligands such as phosphines, phosphonites, phosphinites, and N-heterocyclic carbenes such as 4-substituted-1,3-imidazolylidenes, 1,3-imidazolylidenes, 1,3-imidazolinylidenes, 1,2,4-triazolylidenes, 1,3-benzimidazolylidenes, 1,2,4 triazolylidenes and 1,3-thiazolylidenes, or salen ligands.

DETAILED DESCRIPTION

In one embodiment, the present invention relates to a compound of general formula (I):

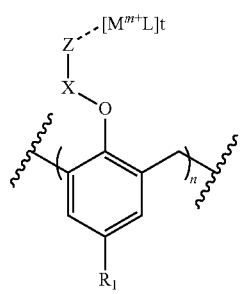

in which:
n represents an integer from 7 to 20 or greater than 20, in particular 21 to 220,
X is:
  a linear or branched alkyl comprising 1 to 10 carbon atoms, or
  a polyethylene glycol comprising from 1 to 5 units of ethylene glycol, or
  (linear or branched alkyl comprising from 0 to 10 carbon atoms)-aryl, the aryl being in particular selected from phenyl and naphthyl,
$R_1$ represents:
  a linear or branched alkyl comprising 1 to 8 carbon atoms, or
  O-linear or branched alkyl comprising 1 to 8 carbon atoms or
  O-(straight or branched alkyl of 0-3 carbon atoms)-aryl,
$M^{m+}$ is a metal in oxidation state m or a metal cluster comprising a plurality of metals in the oxidation state m, where m is 0, 1, 2, 3, 4 or 5, in particular 0, 1, 2 or 3,
L consists of one or more neutral ligands or negatively charged linked to the metal, and
said compound has the formula (IA) in which t is 0 and Z represents a group Q selected from the group consisting of phosphorus ligands such as the phosphonites and phosphinites, with the exception of phosphines and phosphine oxides, N-heterocyclic carbenes such as 4-substituted-1,3-imidazolylidenes, 1,3-imidazolylidenes, 1,3-imidazolinylidenes, 1,2,4-triazolylidenes, 1,3-benzimidazolylidenes, 1,2,4-triazolylidenes and 1,3-thiazolylidenes, or salen ligands,
or said compound has the formula (IB) in which t is 0 and Z represents a group Q', a precursor of a group Q selected from the group consisting of azoliums such as 1,3-imidazolium, 1,3-imidazolinium, 1,3-benzimidazolium, 1,2,4-triazolium, 1,3-thiazolium, precursors of phosphorus ligands with the exception of phosphines and phosphine oxides, or chalcogenides, in particular phosphine sulfides, or salen ligands precursors, in particular derivatives of salicylaldehyde,
or said compound has the formula (IC) wherein t is 1 and Z represents a group Q selected from the group consisting of phosphorus ligands such as phosphines, phosphonites, phosphinites, and N-heterocyclic carbenes such as 4-substituted-1,3-imidazolylidenes, 1,3-imidazolylidenes, 1,3-imidazolinylidenes, 1,2,4-triazolylidenes, 1,3-benzimidazolylidenes, 1,2,4-triazolylidenes and 1,3-thiazolylidenes, or salen ligands.

In one embodiment, the present invention relates to compound of formula (I) in which X is a linear alkyl-O comprising 1 to 10 carbon atoms.

Within the meaning of the present invention, the term "linear or branched alkyl comprising 1 to 10 carbon atoms" defines an acyclic carbon chain, saturated, linear or branched, comprising 1 to 10 carbon atoms. This is methyl, ethyl, propyl, butyl, pentyl, hexyl, heptyl, octyl, nonyl and decyl. The definition of propyl, butyl, pentyl, hexyl, heptyl, octyl, nonyl and decyl include all possible isomers. For example, the term butyl includes n-butyl, iso-butyl, sec-butyl and tert-butyl. One or more hydrogen atoms may be substituted in the alkyl chain with a fluorine atom or a $CF_3$ group.

Within the meaning of the present invention, the term "ethylene glycol unit" defines a group of formula —$CH_2$—$CH_2$—O—. A polyethylene glycol having 1-5 ethylene glycol units is thus a chain of formula —($CH_2$—$CH_2$—O)$_n$— where n is 1 to 5.

Within the meaning of the present invention, the term "a linear alkyl-O comprising 1 to 10 carbon atoms" defines a group of formula —($CH_2$)$_n$—O—, where n is 1 to 10.

Within the meaning of the present invention, the term "aryl" defines an aromatic monocycle comprising from 5 to 6 carbon atoms, which may itself be fused with a second saturated, unsaturated or aromatic. The term aryl includes, without limitation, phenyl and its derivatives in which one or more hydrogen atoms have been replaced by a group independently selected from alkyl, halogen, alkyl, halogen, hydroxyl, alkoxy, amino, amido, nitro, cyano, trifluoromethyl, carboxylic acid or carboxylic ester and naphthyl. Examples of substituted aryls include, without limitation, 2-, 3- or 4-(N, N-dimethylamino)phenyl, 2-, 3- or 4-cyanophenyl, 2-, 3- or 4-nitrophenyl, 2-, 3- or 4-fluoro-, chloro-, bromo- or iodo-phenyl, 2-, 3- or 4-methoxyphenyl.

Within the meaning of the present invention, the expression "(straight or branched alkyl containing from 1 to 10 carbon atoms)-aryl" defines a group comprising an acyclic carbon chain, saturated, linear or branched, comprising 1 to 10 carbon atoms such as defined above linked to an aryl. Examples of linear or branched alkyl comprising 1 to 10 carbon atoms-aryl include benzyl and homobenzyles groups.

For the purposes of this invention, "$M^{m+}$" represents a metal atom in the oxidation state 0, 1, 2, 3, 4 or 5, in particular 0, 1, 2 or 3. The said metal atom is linked to as ligands as required to obtain a stable and neutral species. For example, when the metal is palladium in the oxidation state 2, it can be linked to two chloride ions, the Q moiety of the compounds according to the present invention and another ligand L, such as a pyridine or one of its derivatives. The nature of the ligands to which the metal M is bound varies depending on the metal precursor and the conditions used for the preparation of the metal complex. The metal M can also be part of a metal cluster or cluster. Examples of such aggregates include metal carbonyls aggregates in particular triruthenium dodecacarbonyl $Ru_3(CO)_{12}$.

The N-heterocyclic carbenes are well known to the skilled person and have been the subject of magazine articles and books. We may mention in particular reference to the N-heterocyclic carbenes the book N-Heterocyclic carbenes: Effective Tools for Organometallic Synthesis (Steven P. Nolan Editor; ISBN: 978-3-527-33490-2).

N-heterocyclic carbenes have the following general formula (M representing a metal which they are attached):

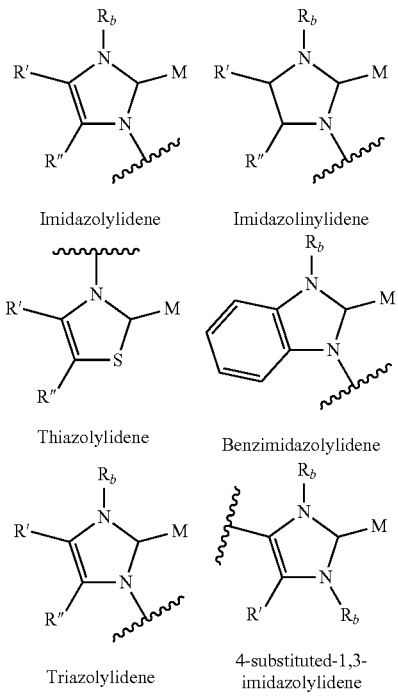

Imidazolylidene   Imidazolinylidene

Thiazolylidene   Benzimidazolylidene

Triazolylidene   4-substituted-1,3-imidazolylidene in which:

$R_b$ is selected from but not limited to:
- alkyl such as i-propyl and adamantyl,
- groups of formula $CH_2$—$COOR_c$ in which $R_c$ is alkyl or aryl,
- aryl such as phenyl, optionally substituted in particular by one or more alkyl, in particular methyl or i-propyl, one or more alkoxy, in particular methoxy, and
- heteroaryl such as pyridyl, furyl, pyrrolyl and indolyl, R' and R" are selected from but not limited to:
- H, or
- Alkyl such as methyl, or
- O-alkyl such as O-methyl, or
- O-aryl, or
- Aryl.

The term "4-substituted-1,3-imidazolylidenes" corresponds to term "Imidazolydenes" of the parent U.S. application Ser. No. 16/345,581.

The term "4-substituted-1,3-imidazolylidenes" encompasses 4,5-disubstituted-1,3-imidazolylidenes when R' does not represent H.

In an advantageous embodiment, the N-heterocyclic carbene is a 4-substituted-1,3-imidazolylidene and R' is H or $CH_3$.

Within the meaning of the present invention, the term "phosphine" defines a compound of formula $PR_2$ bonded to the rest of the calix[n]arene by the phosphorus atom. Not limited to include, as a group R:
- alkyl such as methyl, ethyl, propyl, n-butyl, t-butyl, octyl, cyclohexyl, adamantyl,
- aryl such as phenyl, optionally substituted in particular by one or more alkyl, in particular methyl, one or more alkoxy, in particular methoxy, naphthyl optionally substituted,
- heteroaryl such as pyridyl, furyl, pyrrolyl and indolyl, or
- The two R groups may together form a carbocycle.

Many examples of phosphines are known in the prior art and the corresponding ligands can be introduced by the skilled person from the teaching of the present application.

More advantageously, the phosphine is selected from the group consisting of dicyclohexylphosphine, diphenylphosphine and di-tert-butylphosphine.

Within the meaning of the present invention, the term "phosphonite" defines a compound of formula $P(OR)_2$, wherein R is as defined for the above phosphines.

Within the meaning of the present invention, the term "phosphinite" defines a compound of formula $PR_a(OR)$, wherein $R_a$ and R, independently of one another are as defined for the above phosphines.

Within the meaning of the present invention, the term "salen ligand" defines a compound of formula

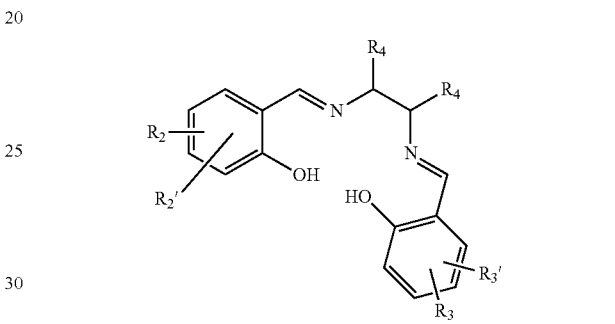

in which:

the groups $R_2$, $R_2'$, $R_3$, $R_3'$ and $R_4$ are selected from:
- Alkyls such as methyl, ethyl, propyl, n-butyl, t-butyl, octyl, cyclohexyl, adamantyl,
- aryl such as phenyl, optionally substituted in particular by one or more alkyl, in particular methyl, one or more alkoxy, in particular methoxy, naphthyl optionally substituted,
- heteroaryl such as pyridyl, furyl, pyrrolyl and indolyl, or
- the two R groups can together form a carbocycle linked to the rest of the calix[n]arene via one of the groups $R_2$, $R_2'$, $R_3$ or $R_3'$.

The carbon bearing $R_4$ groups can be racemic, enantioenriched or enantiopure.

In a particular embodiment, the present invention relates to a compound of general formula (I)

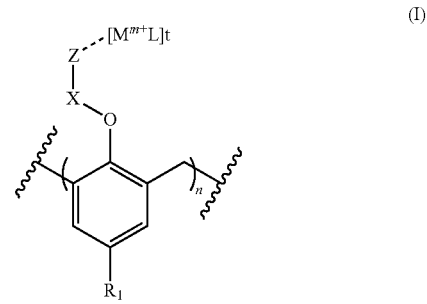

(I)

in which:
n represents an integer from 7 to 220,
X is:
—(CH$_2$)$_q$— wherein q is an integer of 3 to 8, or
a chain of ethylene glycol comprising from 1 to 5 units of ethylene glycol, or
—(CH$_2$)$_v$—O— wherein v is an integer of 1 to 10, or
(—(CH$_2$)$_r$—)-aryl, wherein r is an integer of 0 to 10, said aryl being selected from phenyl and naphthyl,
R$_1$ represents:
a linear or branched alkyl comprising 1 to 8 carbon atoms, or
O-alkyl comprising 1 to 8 carbon atoms, or
O—(CH$_2$)$_s$-aryl, wherein s is 0, 1, 2 or 3,
M$^{m+}$ is a metal in oxidation state m or a metal cluster comprising a plurality of metals in the oxidation state m, where m is 0, 1, 2, 3, 4 or 5,
L consists of one or more neutral ligands or negatively charged linked to the metal,
t is 0 or 1; and wherein
when t is 0, Z is selected from the group consisting of:
phosphonites and phosphinites,
4-substituted-1,3-imidazolylidenes, 1,3-imidazolylidenes, 1,3-imidazolinylidenes, 1,2,4-triazolylidenes, 1,3-benzimidazolylidenes, 1,2,4-triazolylidenes and 1,3-thiazolylidenes,
enantiopure salen ligands,
1,3-imidazolium, 1,3-imidazolinium, 1,3-benzimidazolium, 1,2,4-triazolium, 1,3-thiazolium,
phosphine sulfides,
and enantiopure salen ligands precursors;
and when t is 1, Z is selected from the group consisting of:
phosphines, phosphonites, phosphinites,
4-substituted-1,3-imidazolylidenes, 1,3-imidazolylidenes, 1,3-imidazolinylidenes, 1,2,4-triazolylidenes, 1,3-benzimidazolylidenes, 1,2,4 triazolylidenes and 1,3-thiazolylidenes,
and enantiopure salen ligands.

In a particular embodiment, the present invention relates to a compound of general formula (I)

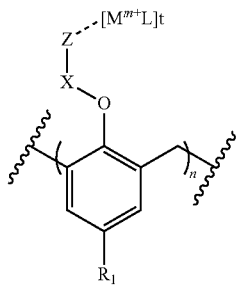

(I)

in which:
n represents an integer from 7 to 220,
X is:
—(CH$_2$)$_q$— wherein q is an integer of 3 to 8, or
a chain of ethylene glycol comprising from 1 to 5 units of ethylene glycol, or
(—(CH$_2$)$_r$—)-aryl, wherein r is an integer of 0 to 10, said aryl being selected from phenyl and naphthyl,
R$_1$ represents:
a linear or branched alkyl comprising 1 to 8 carbon atoms, or
O-alkyl comprising 1 to 8 carbon atoms, or
O—(CH$_2$)$_s$-aryl, wherein s is 0, 1, 2 or 3,
M$^{m+}$ is a metal in oxidation state m or a metal cluster comprising a plurality of metals in the oxidation state m, where m is 0, 1, 2, 3, 4 or 5,
L consists of one or more neutral ligands or negatively charged linked to the metal,
t is 0 or 1; and wherein
when t is 0, Z is selected from the group consisting of:
phosphonites and phosphinites,
4-substituted-1,3-imidazolylidenes, 1,3-imidazolylidenes, 1,3-imidazolinylidenes, 1,2,4-triazolylidenes, 1,3-benzimidazolylidenes, 1,2,4-triazolylidenes and 1,3-thiazolylidenes,
enantiopure salen ligands,
1,3-imidazolium, 1,3-imidazolinium, 1,3-benzimidazolium, 1,2,4-triazolium, 1,3-thiazolium,
phosphine sulfides,
and enantiopure salen ligands precursors;
and when t is 1, Z is selected from the group consisting of:
phosphines, phosphonites, phosphinites,
4-substituted-1,3-imidazolylidenes, 1,3-imidazolylidenes, 1,3-imidazolinylidenes, 1,2,4-triazolylidenes, 1,3-benzimidazolylidenes, 1,2,4 triazolylidenes and 1,3-thiazolylidenes,
and enantiopure salen ligands.

In a particular embodiment, the present invention relates to a compound of general formula (I):

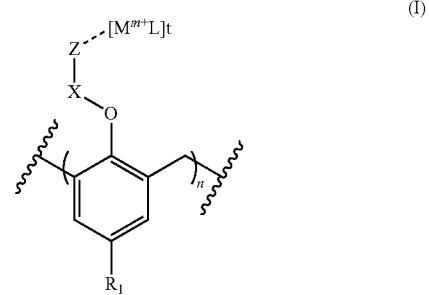

(I)

in which:
n represents an integer from 7 to 220,
X is —(CH$_2$)$_v$—O— wherein v is an integer of 1 to 10,
R$_1$ represents:
a linear or branched alkyl comprising 1 to 8 carbon atoms, or
O-alkyl comprising 1 to 8 carbon atoms, or
O—(CH$_2$)$_s$-aryl, wherein s is 0, 1, 2 or 3,
M$^{m+}$ is a metal in oxidation state m or a metal cluster comprising a plurality of metals in the oxidation state m, where m is 0, 1, 2, 3, 4 or 5,
L consists of one or more neutral ligands or negatively charged linked to the metal,
t is 0 or 1; and wherein
when t is 0, Z is selected from the group consisting of:
phosphonites and phosphinites,
4-substituted-1,3-imidazolylidenes, 1,3-imidazolylidenes, 1,3-imidazolinylidenes, 1,2,4-triazolylidenes, 1,3-benzimidazolylidenes, 1,2,4-triazolylidenes and 1,3-thiazolylidenes,
enantiopure salen ligands, or
1,3-imidazolium, 1,3-imidazolinium, 1,3-benzimidazolium, 1,2,4-triazolium, 1,3-thiazolium, phosphine sulfides,
and enantiopure salen ligands precursors;
and when t is 1, Z is selected from the group consisting of:
phosphines, phosphonites, phosphinites, 4-substituted-1,3-imidazolylidenes, 1,3-imidazolylidenes, 1,3-imidazolinylidenes, 1,2,4-triazolylidenes, 1,3-benzimidazolylidenes, 1,2,4 triazolylidenes and 1,3-thiazolylidenes,
and enantiopure salen ligands.

In a particular embodiment, the present invention relates to a compound of general formula (I):

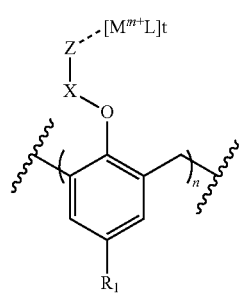

(I)

in which:
n represents an integer from 7 to 20 or greater than 20, in particular 21 to 220,
X is:
a linear or branched alkyl comprising 1 to 10 carbon atoms, or
a polyethylene glycol comprising from 1 to 5 ethylene glycol units or
an alkyl-O comprising 1 to 10 carbon atoms, or
(linear or branched alkyl comprising from 0 to 10 carbon atoms)-aryl, the aryl being in particular selected from phenyl and naphthyl,
$R_1$ represents:
a linear or branched alkyl comprising 1 to 8 carbon atoms, or
O-linear or branched alkyl comprising 1 to 8 carbon atoms or
O-(straight or branched alkyl of 0-3 carbon atoms)-aryl,
$M^{m+}$ is a metal in oxidation state m or a metal cluster comprising a plurality of metals in the oxidation state m, where m is 0, 1, 2, 3, 4 or 5, in particular 0, 1, 2 or 3,
L consists of one or more neutral ligands or negatively charged linked to the metal, and
said compound has the formula (IA) in which t is 0 and Z represents a group Q selected from the group consisting of phosphorus ligands such as the phosphonites and phosphinites, with the exception of phosphines and phosphine oxides, N-heterocyclic carbenes such as 4-substituted-1,3-imidazolylidenes, 1,3-imidazolylidenes, 1,3-imidazolinylidenes, 1,2,4-triazolylidenes, 1,3-benzimidazolylidenes, 1,2,4-triazolylidenes and 1,3-thiazolylidenes,
or said compound has the formula (IB) in which t is 0 and Z represents a group Q', a precursor of a group Q selected from the group consisting of azoliums such as 1,3-imidazolium, 1,3-imidazolinium, 1,3-benzimidazolium, 1,2,4-triazolium, 1,3-thiazolium, precursors of phosphorus ligands with the exception of phosphines and phosphine oxides or chalcogenides, in particular phosphine sulfides
or said compound has the formula (IC) wherein t is 1 and Z represents a group Q selected from the group consisting of phosphorus ligands such as phosphines, phosphonites, phosphinites, and N-heterocyclic carbenes such as 4-substituted-1,3-imidazolylidenes, 1,3-imidazolylidenes, 1,3-imidazolinylidenes, 1,2,4-triazolylidenes, 1,3-benzimidazolylidenes, 1,2,4-triazolylidenes and 1,3-thiazolylidenes.

In one embodiment the calix[n]arenes according to the present invention contain from 7 to 20 phenolic units. These calixarenes can be isolated in pure form or be in the form of mixtures comprising calixarenes of different sizes.

In an advantageous embodiment, the calixarenes are in pure form.

More advantageously, the calixarenes of the present invention are calix[8]arenes and calix[16]arenes.

In another embodiment, calixarenes contain more than 20 phenolic units, in particular 21-220 phenolic units. These so-called "wide" or "giant" calixarenes are in particular prepared according to the method described in international applications WO 2014/033407 and WO 2014/033406. They are isolated as a mixture of calixarenes and the number n thus indicates an average number of phenolic units.

Advantageously, the calixarenes of the present invention in which n is greater than 20 contain 21 to 35, 35 to 50, 51 to 199 or 100 to 220 phenolic units. More preferably, the average number of phenolic units in these calixarenes is about 35.

In the compounds according to the present invention, the group X is preferably a linear alkyl chain comprising from 2 to 8 or from 3 to 8 carbon atoms, in particular 2, 3, 4, 5, 6, 7 or 8. More advantageously said linear alkyl chain comprises from 3 to 6 carbon atoms. In a particular embodiment, the group X is a linear alkyl having 3 or 4 carbon atoms, in particular 4 carbon atoms. The present invention therefore relates to a compound of formula (I) as defined above, wherein X is a linear alkyl comprising from 2 to 8 or 3 to 8 carbon atoms, in particular from 2 to 6 or from 3 to 6 carbon atoms, preferably 3 or 4 carbon atoms.

In the compounds according to the present invention, the group $R_1$ is preferably selected from n-octyl, t-butyl, O-benzyl and O-alkyl in particular O-methyl, O-ethyl, O-propyl and O-n-octyl, preferably t-butyl O-benzyl. In a particular embodiment, $R_1$ is O-benzyl.

In one embodiment, the compounds according to the present invention are in the form of a mixture of at least two compounds of formula (IA), at least two compounds of formula (IB) or a mixture of at least two compounds of formula (IC).

A first object of the present invention relates to ligands based on a pattern calix[n]arene, said ligands having the general formula (IA) below:

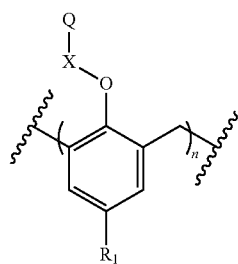

in which:

n, X, R$_1$ are as defined above.

In the compounds of formula (IA), the group Q is selected from the group of phosphorus ligands such as the phosphonites and phosphinites, with the exception of phosphines and phosphine oxides, and N-heterocyclic carbenes such as 4-substituted-1,3-imidazolylidenes, 1,3-imidazolylidenes, 1,3-imidazolinylidenes, 1,2,4-triazolylidenes, 1,3-benzimidazolylidenes, 1,2,4-triazolylidenes and 1,3-thiazolylidenes.

In the compounds of formula (IA), the compounds are therefore able to bind to metal M.

A second object of the present invention is a compound of formula (IB) below:

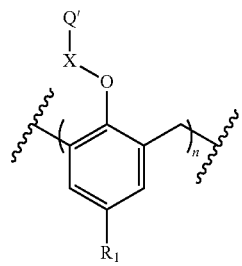

in which:

n, X and R$_1$ are as defined above.

In the compounds of formula (IB), the group Q' is a precursor of a group Q selected from the group consisting of azoliums such as 1,3-imidazolium, 1,3-imidazolinium, 1,3-benzimidazolium, 1,2,4-triazolium, 1,3-thiazolium, precursors of phosphorus ligands with the exception of phosphines and phosphine oxides or chalcogenides, particularly the phosphine sulfides.

The term "precursor of a group Q" is meant within the meaning of the present invention that the moiety Q' is likely to lead to the group Q prior to its association with the metal or simultaneous binding with the metal. For example, the compound of formula (IB) wherein Q is an imidazolium can lead to the formation of the compound of formula (IA) wherein Q is an imidazolylidene by reaction with a base such as an alkoxide, in particular the t butoxide or sodium.

Phosphine oxides are an example of phosphine precursors. They are particularly useful in the case of highly sensitive to moisture and/or oxygen phosphines such as dialkylphosphines as e.g. dicyclohexylphosphine or di-t-butylphosphine.

Preferably, Q' is an azolium selected from the group consisting of 1,3-imidazolium, the 1,3-imidazolinium, of 1,2,4-triazolium, of 1,3-benzimidazolium and 1,3-thiazolium. These include an imidazolium aryl, aryl being in particular the 1,3,5-mesityl or 2,6-diisopropyl-phenyl.

A third object of the present invention is a metal complex comprising a ligand of formula (IA) as defined above. Within the meaning of the present invention, the term "metal complex" means a compound comprising a compound of formula (IA) wherein at least one of Q groups is bonded to a metal atom M, preferably having the oxidation state 0, 1, 2, 3, 4 or 5, in particular 0, 1, 2 or 3.

Unexpectedly, the inventors of the present invention have revealed that compounds containing much metal M that of the formula Q ligand can be obtained with the ligands according to the present invention.

The number of metal atoms M depends of course on the nature of the ligand, the metal and the stoichiometry (that is to say the ratio M/Q). For example, in the case where the metal is rhodium and Q represents a phosphine and in the case where the metal is palladium and Q represents an imidazolylidene, metal complexes containing 8 metal atoms were obtained with the calix[8]arene.

The metal complexes according to the present invention therefore in particular formula (IC) as follows:

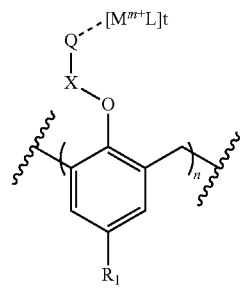

in which:

n, X, M$^{m+}$, R$_1$ and L are as defined above, t is 1,

Q is selected from the group consisting of phosphorus ligands such as phosphines, phosphonites, phosphinites, and N-heterocyclic carbenes such as 4-substituted-1,3-imidazolylidenes, 1,3-imidazolylidenes, 1,3-imidazolinylidenes, 1,2,4-triazolylidenes, 1,3-benzimidazolylidenes, 1,2,4-triazolylidenes and 1,3-thiazolylidenes.

The Q group is in particular a 1,3-imidazolylidene, in particular an aryl-imidazolylidene wherein the aryl is in particular the 1,3,5-mesityl or 2,6-diisopropyl-phenyl. Advantageously, the metal complexes according to the present invention, particularly of formula (IC) contain at least one transition metal belonging to Group IB, IIB, IIIB, IVB, VB, VIB, VIIB or VIIIB.

More preferably, the metal is selected from metals known to possess catalytic activity. These include a metal selected from the group consisting of Mn, Cr, Fe, Co, Ni, Pd, Ru, Rh, Au, Pt, Cu, Ag, Bi, Re, Mo, Ir, V, Cd and Zn, in particular a metal selected from the group consisting of Ni, Pd, Ru, Rh, Cu, Co or Pt.

Even more advantageously, the metal is selected from the group consisting of Pd$^0$, Pd$^{2+}$, Rh$^0$, Rh$^{1+}$, Rh$^{3+}$, Co$^{2+}$, Co$^{3+}$, Ru$^0$ and Ru$^{2+}$. The metal may also be part of a metal cluster such as Ru$_3$(CO)$_{12}$.

In an advantageous embodiment, the present invention relates to a metal complex wherein each Q moiety is bonded to a single atom M. The present invention therefore relates to a metal complex in which the number of metals M is equal to n of the calix[n]arene of the formula (IC) as follows:

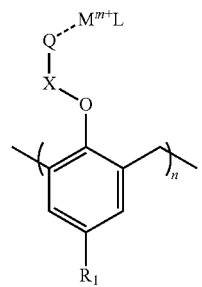

in which:

n, X and $R_1$ are as defined above,

Q is selected from the group consisting of phosphorus ligands such as phosphines, phosphonites, phosphinites, and N-heterocyclic carbenes such as 4-substituted-1,3-imidazolylidenes, 1,3-imidazolylidenes, 1,3-imidazolinylidenes, 1,2,4-triazolylidenes, 1,3-benzimidazolylidenes, 1,2,4-triazolylidenes and 1,3-thiazolylidenes, $M^{m+}$ is a metal in oxidation state m or a metal cluster comprising a plurality of metals in the oxidation state m, where m is 0, 1, 2, 3, 4 or 5, in particular 0, 1, 2 or 3, L is composed of one or more neutral or negatively charged ligands bound to the metal.

$M^{m+}$ L group in the complex may be in particular $Ru_3(CO)_{12}$, (norbornadiene)RhCl, (cyclooctadiene)RhCl, $RhCl_3$, $PdCl_2$, complex obtained from the $Pd(dba)_2$. Other transition metal complexes with phosphines or carbenes are known and can be prepared by the skilled person by applying the teaching of this application.

The present invention also relates to a compound of formula (IC):

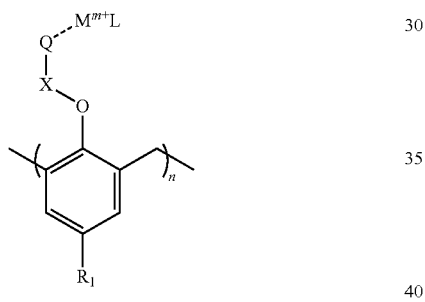

in which:

n, X, $R_1$ are as defined above,

Q is selected from the group consisting of phosphorus ligands such as phosphines, phosphonites, phosphinites, and N-heterocyclic carbenes such as 4-substituted-1,3-imidazolylidenes, 1,3-imidazolylidenes, 1,3-imidazolinylidenes, 1,2,4-triazolylidenes, 1,3-benzimidazolylidenes, 1,2,4-triazolylidenes and 1,3-thiazolylidenes, $M^{m+}$ is a metal in oxidation state m or a metal cluster comprising a plurality of metals in the oxidation state m, where m is 0, 1, 2, 3, 4 or 5, in particular 0, 1, 2 or 3 and in particular a transition metal group IB, IIB, IIIB, VA, IVB, VB, VIB, VIIB or VIIIB, in particular selected from the group consisting of Ni, Pd, Ru, Rh, Cu, Co or Pt, and L consists of one or more neutral ligands or negatively charged linked to the metal.

The present invention also relates to a compound of formula (IC) selected from compounds of the following formula:

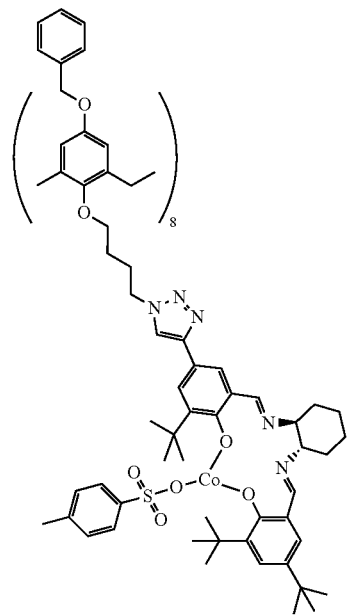

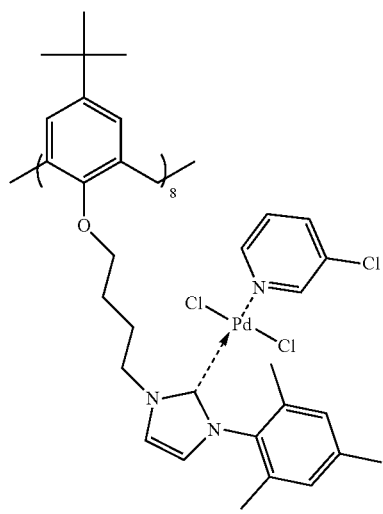

15
-continued
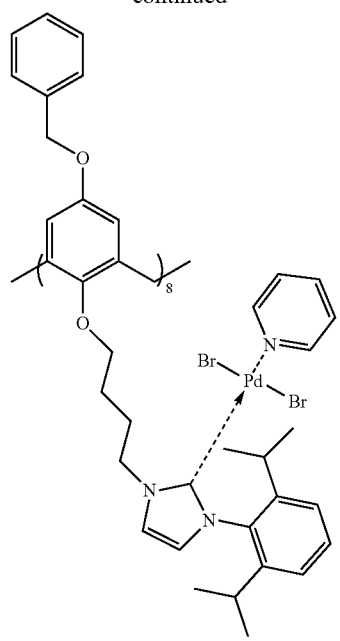
16
-continued
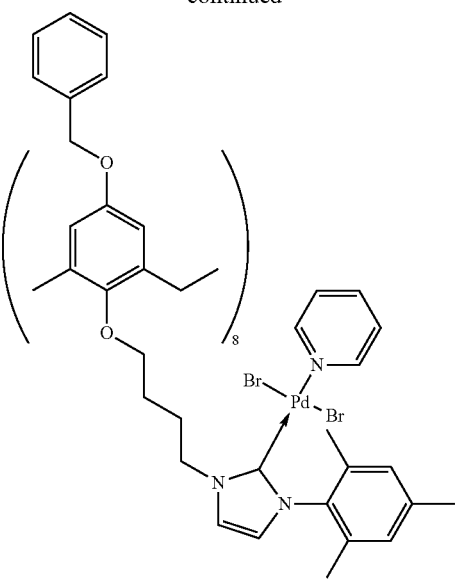
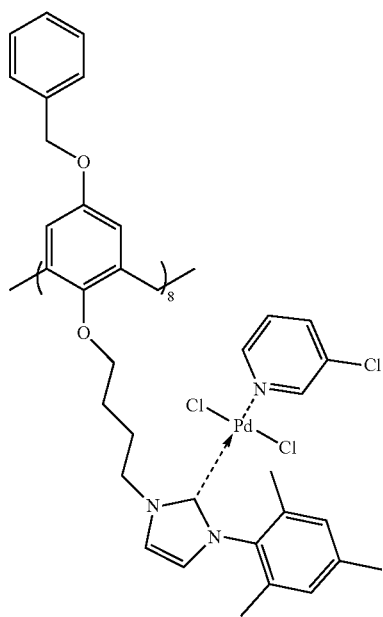
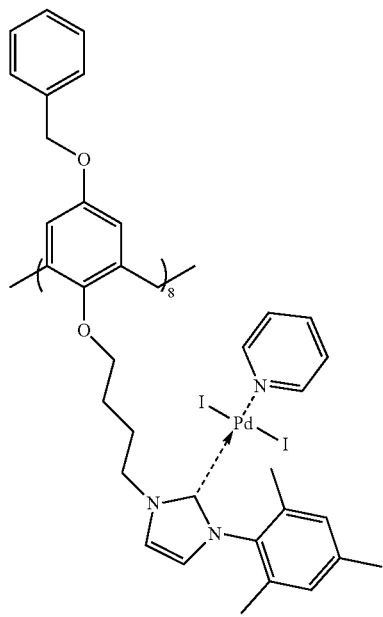

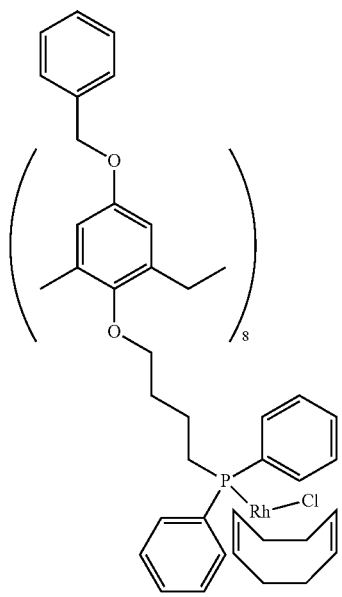
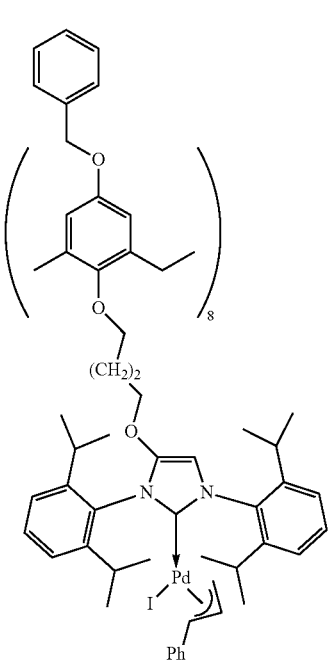
Cat 22
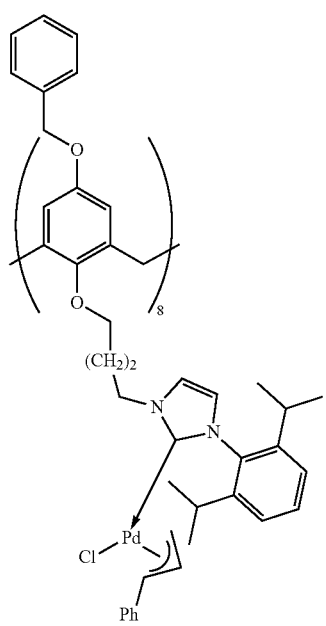
Cat 18
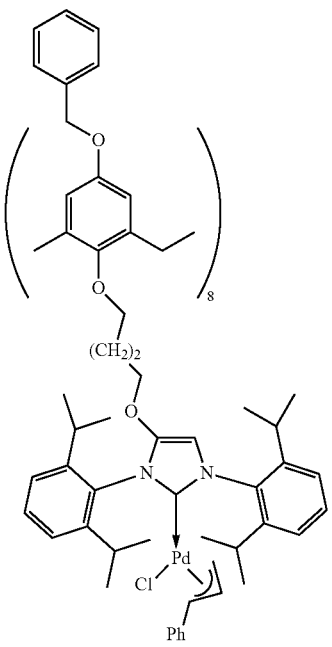
Cat 23

Cat 24
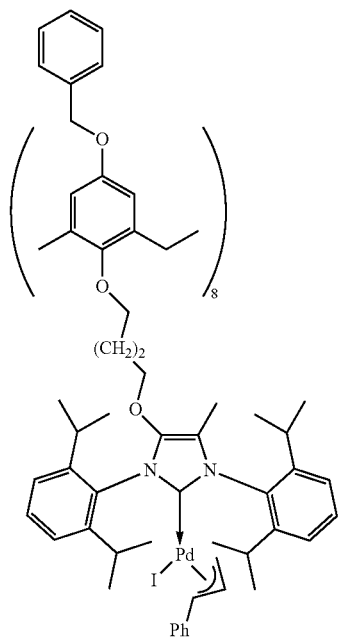
Cat 25
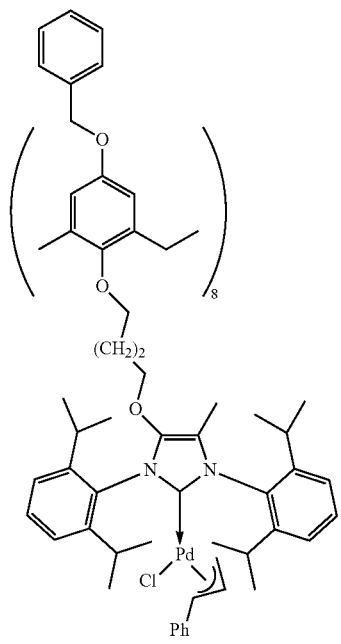
Cat 29
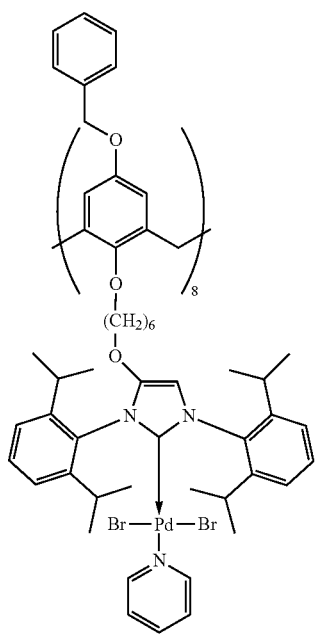
Cat 30
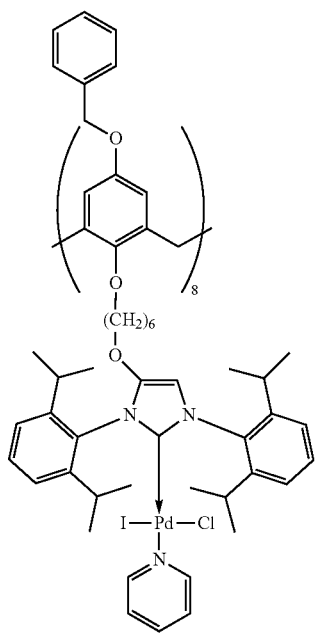

Cat 32

Cat 33

Cat 35

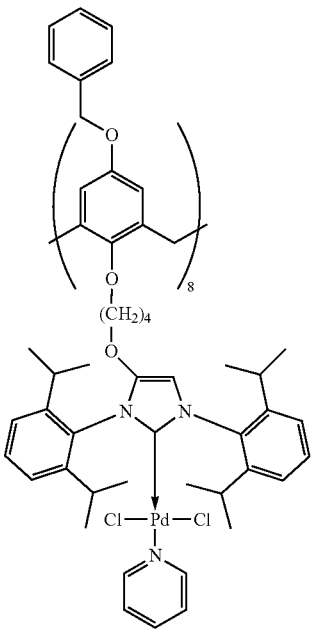

Cat 36

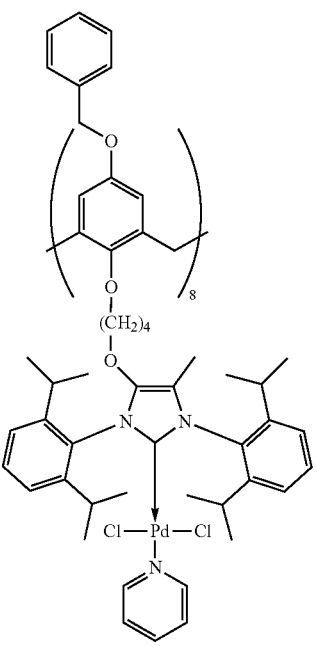

Said compound of formula (IC) may be in the form of a solution in a solvent chosen in particular from the group consisting of DMF, DMSO, THF, NMP, dioxane, toluene, chloroform and dichloromethane.

Said compound of formula (IC) may also be in the form of a suspension in a solvent chosen in particular from the group consisting of alcohols, such as methanol, ethanol, isopropanol and butanol, water or a mixture of these solvents.

The compound of formula (IC) may also be in the form of a dry solid.

In a first particular embodiment, the present invention relates to a compound of formula (IA1) wherein:

n represents an integer from 7 to 20,

X is a linear alkyl having 3 to 6 carbon atoms, t is 0 and Z represents a group Q selected from the group consisting of phosphorus ligands, in particular phosphonites and phosphinites, with the exception of phosphines and phosphine oxides and N-heterocyclic carbenes such as 4-substituted-1,3-imidazolylidenes, 1,3-imidazolylidenes, 1,3-imidazolinylidenes, 1,2,4-triazolylidenes, 1,3-benzimidazolylidenes, 1,2,4-triazolylidenes and 1,3-thiazolylidenes, preferably a phosphine or 1,3-imidazolylidene, $R_1$ represents n-octyl, t-butyl, O-benzyl or O-alkyl in particular O-methyl, O-ethyl, O-propyl or O-n-octyl preferably t-butyl or O-benzyl, or a precursor of said compound of formula (IA1) of formula (IB1) wherein Q' is selected from the group consisting of azoliums such as 1,3-imidazolium, 1,3-imidazolinium, 1,3-benzimidazolium, 1,2,4-triazolium, 1,3-thiazolium, precursors of phosphorus ligands with the exception of phosphines and phosphine oxides or chalcogenides, particularly phosphine sulfides, preferably 1,3-imidazolium or a phosphine oxide, or a metal complex comprising a compound of formula (IA1), in particular of formula (IC1) wherein:

$M^{m+}$ is a metal in oxidation state m or a metal cluster comprising a plurality of metals in the oxidation state m, where m is 0, 1, 2, 3, 4 or 5, in particular 0, 1, 2 or 3.

In a second particular embodiment, the present invention relates to a compound of formula (IA2) wherein:

n represents an integer from 7 to 20, X is a linear alkyl having 4 carbon atoms, t is 0 and Z represents a group Q selected from the group consisting of phosphorus ligands, in particular phosphonites and phosphinites, with the exception of phosphines and phosphine oxides and N-heterocyclic carbenes such as 4-substituted-1,3-imidazolylidenes, 1,3-imidazolylidenes, 1,3-imidazolinylidenes, 1,2,4-triazolylidenes, 1,3-benzimidazolylidenes, 1,2,4-triazolylidenes and 1,3-thiazolylidenes, preferably a phosphine or 1,3-imidazolylidene, $R_1$ represents n-octyl, t-butyl, O-benzyl or O-alkyl in particular O-methyl, O-ethyl, O-propyl or O-n-octyl preferably t-butyl or O-benzyl, or a precursor of said compound of formula (IA2) corresponding to formula (IB2) wherein Q' is selected from the group consisting of azoliums such as 1,3-imidazolium, 1,3-imidazolinium, 1,3-benzimidazolium, 1,2,4-triazolium, 1,3-thiazolium, precursors of phosphorus ligands with the exception of phosphines and phosphine oxides or chalcogenides, particularly phosphine sulfides, preferably 1,3-imidazolium or a phosphine oxide, or a metal complex comprising a compound of formula (IA2), in particular of formula (IC2) in which:

$M^{m+}$ is a metal in oxidation state m or a metal cluster comprising a plurality of metals in the oxidation state m, where m is 0, 1, 2, 3, 4 or 5, in particular 0, 1, 2 or 3.

In a third particular embodiment, the present invention relates to a compound of formula (IA3) below, wherein:

n is 8,

X is a linear alkyl having 4 carbon atoms, t is 0 and Z represents a group Q selected from the group consisting of phosphorus ligands, in particular phosphonites and phosphinites, with the exception of phosphines and phosphine oxides and N-heterocyclic carbenes such as 4-substituted-1,3-imidazolylidenes, 1,3-imidazolylidenes, 1,3-imidazolinylidenes, 1,2,4-triazolylidenes, 1,3-benzimidazolylidenes, 1,2,4-triazolylidenes and 1,3-thiazolylidenes, preferably a phosphine or 1,3-imidazolylidene, $R_1$ represents n-octyl, t-butyl, O-benzyl or O-alkyl in particular O-methyl, O-ethyl, O-propyl or O-n-octyl preferably t-butyl or O-benzyl, or a precursor of said compound of formula (IA3) of formula (IB3) in which Q' is selected from the group consisting of azoliums such as 1,3-imidazolium, 1,3-imidazolinium, 1,3-benzimidazolium, 1,2,4-triazolium, 1,3-thiazolium, precursors of phosphorus ligands with the exception of phosphines and phosphine oxides or chalcogenides, particularly phosphine sulfides, preferably 1,3-imidazolium or a phosphine oxide, or a metal complex comprising a compound of formula (IA3), in particular of formula (IC3) in which:

$M^{m+}$ is a metal in oxidation state m or a metal cluster comprising a plurality of metals in the oxidation state m, where m is 0, 1, 2, 3, 4 or 5, in particular 0, 1, 2 or 3.

A fourth object of the present invention relates to a compound of general formula (I):

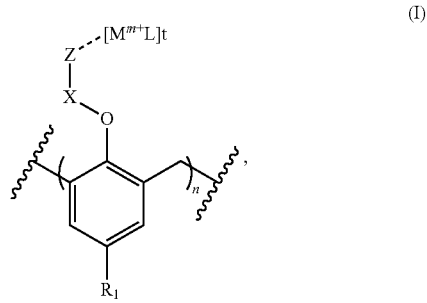

in which:

n represents an integer from 7 to 20 or greater than 20, in particular 21 to 220, X is:
  a linear or branched alkyl comprising 1 to 10 carbon atoms, or
  a polyethylene glycol comprising from 1 to 5 units of ethylene glycol, or
  a linear alkyl-O— comprising 1 to 10 carbon atoms, or
  a (linear or branched alkyl comprising from 0 to 10 carbon atoms)-aryl, the aryl being in particular selected from phenyl and naphthyl, $R_1$ represents:
  a linear or branched alkyl comprising 1 to 8 carbon atoms, or
  O-linear or branched alkyl comprising 1 to 8 carbon atoms or
  O-(straight or branched alkyl of 0-3 carbon atoms)-aryl, $M^{m+}$ is a metal in oxidation state m or a metal cluster comprising a plurality of metals in the oxidation state m, where m is 0, 1, 2, 3, 4 or 5, in particular 0, 1, 2 or 3, L consists of one or more neutral ligands or negatively charged linked to the metal, and said compound has the formula (IA) in which t is 0 and Z represents a group Q selected from the group consisting of salen ligands, in particular enantiopure salen ligands, in particular derivatives of cyclohexyldiamine and diphenylethylene and derivatives of the above salen ligands, or said compound has the formula (IB) in which t is 0 and Z represents a group Q', a precursor of a group Q selected from the group consisting of precursors of salen ligands, in particular derivatives of salicylaldehyde, or said compound has the formula (IC) wherein t is 1 and Z represents a group Q selected from the group consisting of salen ligands, in particular enantiopure salen ligands, in particular derivatives of cyclohexyldiamine and diphenylethylene and derivatives of the above salen ligands.

In an advantageous embodiment, the present invention relates to ligands based on a pattern calix[n]arene, said ligands having the general formula (IA) below:

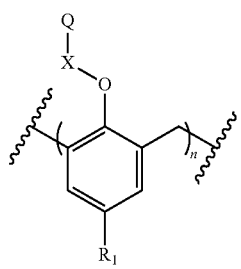

in which:

n, X, $R_1$ are as defined above, the Q moiety is selected from the group consisting of salen ligands, in particular enantiopure salen ligands, in particular derivatives of cyclohexyldiamine and diphenylethylene and derivatives of the above salen ligands.

In an advantageous embodiment, the present invention is a compound of formula (IB) below:

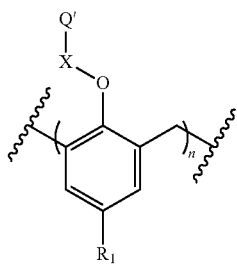

in which:

n, X and $R_1$ are as defined above, the group Q' is a precursor of a group Q selected from the group consisting of precursors of salen ligands, in particular derivatives of salicylaldehyde.

In an advantageous embodiment, the present invention is a compound of formula (IC) as follows:

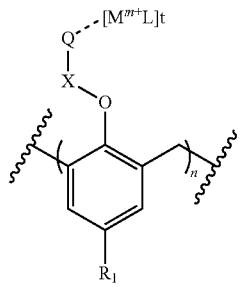

in which:

n, X, $M^{m+}$, $R_1$ and L are as defined above, t is 1,

Q is selected from the group consisting of salen ligands, in particular enantiopure salen ligands, in particular derivatives of cyclohexyldiamine and diphenylethylene and derivatives of the above salen ligands.

A fifth object of the present invention relates to the use of a compound of formula (IC) as defined above as a catalyst in an organic chemistry reaction.

The compounds according to the present invention, because of their particular solubility, may be used either as homogeneous catalysts or as heterogeneous catalysts.

The compounds of formula (IA), (IB) and (IC) as defined above are in fact soluble in certain solvents and are not in others.

In one embodiment, the compounds of formula (IC) may be employed as homogeneous catalysts in a solvent in which they are soluble. Mention may be made, as examples of usable solvents for homogeneous catalysis DMF, DMSO, THF, dioxane, NMP, toluene, chloroform and dichloromethane.

When used as homogeneous catalysts, the compounds of formula (IC) can be separated by filtration of the final product by adding to the reaction medium a solvent in which they are not soluble and wherein the product of the chemical reaction organic is soluble. Examples of such solvents are alcohols, water or a mixture of these solvents. The compound of formula (IC) may also be separated from the reaction product by washing said reaction product with a solvent in which the compound of formula (IC) is soluble and the reaction product is not.

In another embodiment, the compounds of formula (IC) may be used as heterogeneous catalyst in a solvent in which they are insoluble. Examples of such solvents are alcohols such as methanol, ethanol, isopropanol and butanol, water or a mixture of these solvents.

In the present invention, the compound of formula (IC) may be in the form of a suspension in the reaction medium. According to another embodiment, the compound of formula (IC) may be deposited on the walls of a reactor in which the organic chemical reaction is implemented, for example by evaporating a solution containing the compound of formula (IC), introduced into a cartridge for a continuous flow reactor or dispersed in an organic or inorganic material.

Advantageously, the present invention relates to the use of a compound of formula (IC) as defined above as a catalyst in a reaction selected from the group consisting of reduction reactions, in particular in the presence of $H_2$ such as the hydrogenation of carbonyl, alkene, alkyne or arene, the oxidation reactions, particularly in the presence of $O_2$, the carbon-carbon bond forming reactions such as the Suzuki reaction, Heck, Stille, Kumada and Sonogashira, the carbon-heteroatom bond forming reactions, notably carbon-nitrogen, carbon-oxygen, carbon-phosphorus, and carbon-sulfur bond formation, carbonylation reactions in the presence CO, such as Fischer-Tropsch, the gas phase carboxylation reactions in the presence of $CO_2$, and asymmetric catalysis reactions such as the epoxide opening reactions or asymmetric catalysis reactions allowing C—C or C—X bond formation.

The present invention therefore relates to the use of a compound of formula (IC) as defined above as a catalyst in an organic chemistry reaction, in particular selected from the group consisting of reduction reactions, in particular in the presence of $H_2$, such as hydrogenation of carbonyls, alkenes, alkynes and arenes, the oxidation reactions, particularly in the presence of $O_2$, the carbon-carbon bond forming reactions such as the reaction Suzuki, Heck, Stille, Kumada and Sonogashira, carbon-heteroatom bond forming reactions in particular carbon-nitrogen, carbon-oxygen, carbon-phosphorus, and carbon-sulfur bond formation, carbonylation reactions in the presence of CO, such as Fischer-Tropsch, the gas phase carboxylation reactions in the presence of $CO_2$, and asymmetric catalysis reactions such as the epoxide opening reactions or the reactions of asymmetric catalysis for C—C or C—X bond formation.

In one embodiment, the present invention relates to the use of a compound of formula (IC) as defined above wherein M is palladium in a carbon-carbon bond forming reaction, in particular in the Heck reaction or Suzuki reaction. Advantageously, using a compound wherein the group Q is a N-heterocyclic carbene, in particular an imidazolylidene. More advantageously, the compound of formula (IC) is a compound of formula (IC1), (IC2) or (IC3), in particular wherein Q is a N-heterocyclic carbene, in particular an imidazolylidene.

In another embodiment, the present invention relates to the use of a compound of formula (IC) as defined above, wherein M is rhodium in a hydrogenation reaction, in particular for hydrogenating a double bond and/or an aromatic ring, in particular an alkene. The selectivity of the rhodium complexes of the present vis-à-vis invention the aromatic ring or the double bond can be controlled by changing the temperature of the reaction. Advantageously, using a compound wherein the group Q is a phosphorus ligand, in particular a phosphine. More advantageously, the compound of formula (IC) is a compound of formula (IC1), (IC2) or (IC3), in particular wherein Q is a phosphorus ligand, in particular a phosphine.

In another embodiment, the present invention relates to the use of a compound of formula (IC) as defined above, wherein M is cobalt in an enantioselective reaction of epoxide opening. Advantageously, using a compound wherein the Q moiety is a salen ligand, in particular in particular enantiopure salen ligands, in particular derivatives of cyclohexyldiamine and diphenylethylene and derivatives of the above salen ligands. In another embodiment, the compounds of formula (IC) can be used as a catalyst wherein the metal leaching ratio of this catalyst is less than 10%, in particular less than 5% of the total weight of the metal content in this catalyst.

A sixth object of the present invention relates to a method for preparing a compound of formula (I) as defined above.

In one embodiment, the present invention relates to a method for preparing a compound of formula (IA) as defined above:

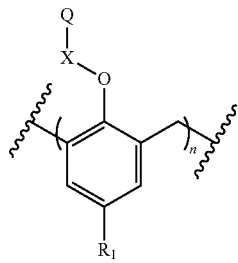

wherein Q is a phosphorus ligand, such as a secondary phosphonite, or a secondary phosphinite other than a phosphine and phosphine oxide, comprising a step of contacting a compound of formula (II):

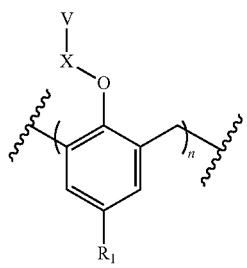

(II)

wherein:

n, X, $R_1$ are as defined above,

V represents a leaving group, in particular chosen from the group consisting of halogens such as Cl, Br and I and sulfonates such as $OSO_2Me$, $OSO_2(C_7H_7)$ et $OSO_2CF_3$, with a compound of formula QA wherein Q is selected from the group consisting of phosphorus ligands, such as a secondary phosphonite, or secondary phosphinite, with the exception of phosphines and phosphine oxides, and A represents an alkali metal selected from the group consisting of Na, K and Li or a is H and the reaction is carried out in the presence of a base.

In this embodiment, the Q group is introduced by a nucleophilic substitution reaction. When X represents a (linear or branched alkyl comprising 1 to 10 carbon atoms)-aryl, the Q group can be introduced on the aryl with a suitable metal catalyst. According to another embodiment, the compound of formula (IA) may be prepared by reacting the calix[n]arene having a free OH group of phenol with a compound of formula Q-XW wherein W represents a leaving group, in particular chosen from the group consisting of halogens such as Cl, Br and I and sulfonates such as $OSO_2Me$, $OSO_2(C_7H_7)$ et $OSO_2CF_3$.

In a second embodiment, the present invention relates to a method for preparing a compound of formula (IB) as defined above:

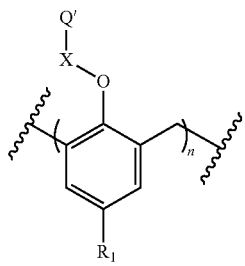

wherein Q is selected from phosphorus ligands with the exception of phosphines and phosphine oxides or chalcogenides, particularly phosphine sulfides, comprising a step of contacting a compound of formula (II):

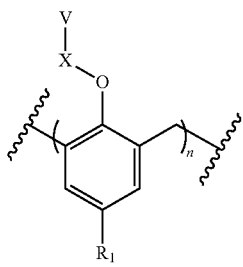

(II)

in which:
- n, X, $R_1$ are as defined above,
- V represents a leaving group, in particular chosen from the group consisting of halogens such as Cl, Br and I and sulfonates such as $OSO_2Me$, $OSO_2(C_7H_7)$ and $OSO_2CF_3$,
- with a compound of formula Q'-A wherein Q' is selected from the group consisting of a phosphorus ligand other than a phosphine and phosphine oxides, a chalcogenide, in particular a secondary phosphine sulfide, secondary phosphinate or secondary phosphonate and A represents an alkali metal selected from the group consisting of Na, K and Li or A is H and the reaction is carried out in the presence of a base.

Potassium salts, sodium and lithium phosphines, phosphinites and phosphonites are known compounds, commercially available.

According to another embodiment, the compound of formula (IB) may be prepared by reacting the calix[n]arene having an OH free phenol group with a compound of formula QXW wherein W represents a leaving group, in particular selected from the group consisting of halogen such as Cl, Br and I and sulfonates such as $OSO_2Me$, $OSO_2(C_7H_7)$ and $OSO_2CF_3$.

In a third embodiment, the present invention relates to a method for preparing a compound of formula (IB) as defined above:

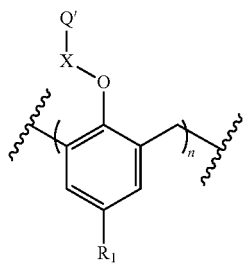

wherein Q' is selected from the group consisting of azoliums such as 1,3-imidazolium, 1,3-imidazolinium, 1,3-benzimidazolium, 1,2,4-triazolium, 1,3-thiazolium comprising a step of contacting a compound of formula (II):

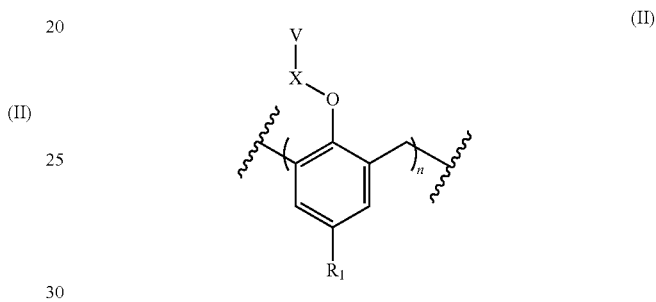

(II)

in which:
- n, X, $R_1$ are as defined above,
- V represents a leaving group, in particular chosen from the group consisting of halogens such as Cl, Br and I and sulfonates such as $OSO_2Me$, $OSO_2(C_7H_7)$ and $OSO_2CF_3$,
- with a compound of formula Q' selected from the group consisting of azoles such as 1,3-imidazoles, 1,3-imidazoline, 1,3-benzimidazoles, 1,2,4-triazoles and 1,3-thiazoles.

The preparation of compounds of formula (IB) wherein the moiety Q is an azolium may be embodied in other methodologies well known to the skilled person. This is for example a method wherein a compound of formula (II) wherein V represents an azole is alkylated with an alkylating agent such as an alkyl halide. According to another embodiment, the compound of formula (IB) may be prepared by reacting the calix[n]arene having a free OH group of phenol with a compound of formula Q'-XW wherein W represents a leaving group, in particular selected from the group consisting of halogens such as Cl, Br and I and sulfonates such as $OSO_2Me$, $OSO_2(C_7H_7)$ and $OSO_2CF_3$.

In a fourth embodiment, the present invention relates to a method for preparing a metal complex as defined above, in particular a compound of formula (IC).

Methods for the preparation of compounds of formula (IC) differ depending on the metal precursor used and the nature of the ligand. The skilled person will know, on the basis of this patent application, prepare the corresponding metal complexes.

The present invention therefore relates in one embodiment to a method for preparing a compound of formula (IC) as defined above:

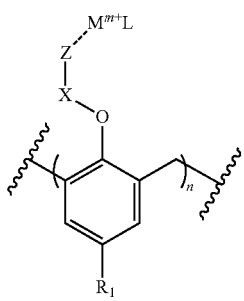

in which:
- n, X, L, $M^{m+}$ and $R_1$ are as defined above,
- Z represents a group Q selected from the group consisting of phosphines, phosphonites, phosphinites, and N-heterocyclic carbenes such as 1,3-imidazolylidenes, 1,3-imidazolinylidenes, 1,2,4-triazolylidenes, 1,3-benzimidazolylidenes, 1,2,4-triazolylidenes and 1,3-thiazolylidenes.

comprising a step of contacting a compound of formula I wherein t is 0 and Z represents a group Q selected from the group consisting of phosphorus ligands such as phosphines, phosphonites, phosphinites, and N-heterocyclic carbenes such as 1,3-imidazolylidenes, 1,3-imidazolinylidenes, 1,2,4-triazolylidenes, 1,3-benzimidazolylidenes, 1,2,4-triazolylidenes and 1,3-thiazolylidenes.

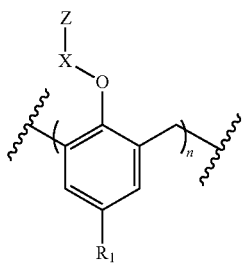

with a metal complex of formula $(L')M^{m+}$ where $M^{m+}$ is a metal in oxidation state m or a metal cluster comprising a plurality of metals in the oxidation state m, where m is 0, 1, 2, 3, 4 or 5, in particular 0, 1, 2 or 3, and L' is comprised of one or more neutral or negatively charged ligands bound to the metal.

The metal precursors used for the preparation of metal complexes, in particular of formula (IC) are for example in the case of rhodium alkene rhodium complexes such as [(norbornadiene)RhCl]$_2$, [(cyclooctadiene)RhCl]$_2$ or salts such as RhCl$_3$, in the case of palladium PdCl$_2$, (cyclooctadiene)PdCl$_2$, palladium complexes and dibenzylideneacetone such as Pd(dba)$_2$ and Pd$_2$(dba)$_3$, Pd(CH$_3$CN)$_2$Cl$_2$ or in the case of Cobalt COCl$_2$ or Co(OAc)$_2$.

The metal precursors used for the preparation of compounds of formula (IC) are well known to those skilled in the art will be able to select the precursor and appropriate reaction conditions to obtain the desired complex.

The compounds of formula (IC) wherein Q is an azolylidene can be prepared according to various methodologies known to the skilled person. When the metal precursor contains no ligand may lead to the formation of N-heterocyclic carbene (such as a basic ligand) can be prepared N-heterocyclic carbene or before preparing a complex for use in a transmetalation reaction (e.g., a complex with silver). The complex may also be prepared by in situ carbene generation, ie by reaction with a metal precursor containing a ligand capable of generating the carbene or in the presence of a base. In another embodiment, the present invention relates to a method for preparing a compound of preparing a compound of formula (IC) as defined above:

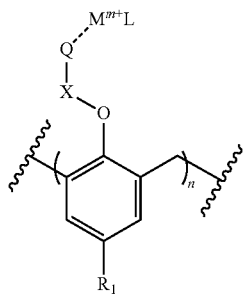

in which:
- n, X, L, $M^{m+}$ and $R_1$ are as defined above, comprising a step of contacting a compound of formula (IB)

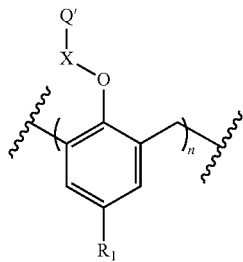

as defined above, wherein Q' is selected from the group consisting of azoliums such as 1,3-imidazolium, 1,3-imidazolinium, 1,3-benzimidazolium, 1,2,4-triazolium and 1,3-thiazolium, with a metal complex of formula $(L')M^{m+}$ where $M^{m+}$ is a metal in oxidation state m, where m is 0, 1, 2, 3, 4 or 5, in particular 0, 1, 2 or 3, and L' is comprised of one or more neutral or negatively charged ligands bound to the metal, optionally in the presence of a base. The present invention also relates to another method of preparation a compound of formula (IC) as defined above:

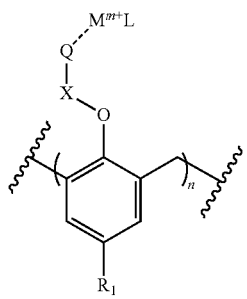

in which:

n, X, L, $M^{m+}$ and $R_1$ are as defined above, comprising the steps of:

(a) contacting a compound of formula (IB):

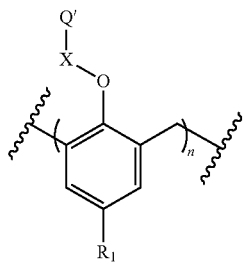

as defined above, wherein Q' is selected from the group consisting of azoliums such as 1,3-imidazolium, 1,3-imidazolinium, 1,3-benzimidazolium, 1,2,4-triazolium, the 1,3-thiazolium with a base, to give a N-heterocyclic carbene, such as a 1,3-imidazolylidene, a 1,3-imidazolinylidene, a 1,2,4-triazolylidene, a 1,3-benzimidazolylidene, a 1,2,4-triazolylidene or a 1,3-thiazolylidene of formula (IA) as defined above, (b) contacting the N-heterocyclic carbene obtained in step (a) with a metal complex of formula $(L')M^{m+}$ where $M^{m+}$ is a metal in oxidation state m or a metal cluster comprising a plurality of metals in the oxidation state m, where m is 0, 1, 2, 3, 4 or 5 in particular 0, 1, 2 or 3, and L' is comprised of one or more neutral or negatively charged ligands bound to the metal to give the compound of formula (IC).

A seventh object of the present invention is a compound of formula (IV):

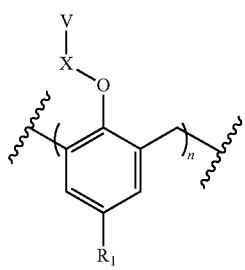

in which:

n and $R_1$ are as defined above,

X is a linear or branched alkyl containing from 4 to 8 carbon atoms, in particular 4 carbon atoms, V represents a leaving group, in particular chosen from the group consisting of halogens such as Cl, Br and I and sulfonates such as $SO_3Me$, $SO_3(C_7H_7)$ and $SO_3CF_3$.

An eighth object of the present invention is a method for preparing a compound of formula (IV) as defined above:

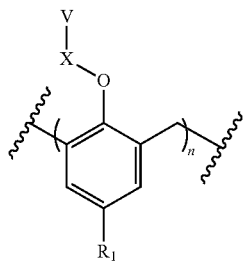

comprising a nucleophilic substitution reaction involving a compound of general formula

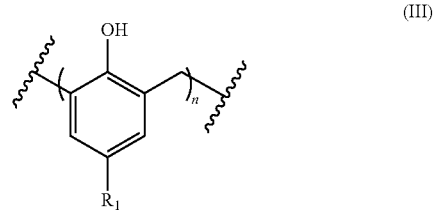

(III)

and a group precursor of general formula —X—V, wherein X and V are as defined above, such as alkyl dihalides, preferably the 1-bromo-4-chlorobutane, in the presence of a base, preferably sodium or potassium carbonate, hydride, and a solvent, preferably dimethylformamide (DMF) to give the compound of general formula (IV):

wherein $R_1$ and n are as defined above, n is preferably 7 to 20, in particular 8.

This methodology provides the calix[n]arena with a 90% efficiency (against 51% in the prior art).

Advantageously, said compound of formula (IV) is isolated by at least a pulping step in an alcohol, preferably methanol or ethanol, in the absence of another solvent. In an advantageous embodiment, the compound of formula (V) is isolated by a first trituration with methanol and a second trituration with ethanol.

Using this methodology, the product of formula (IV) is obtained in almost pure, that is to say a degree of purity greater than 95%, without chromatography step. The present invention further relates to a method for preparing a compound of formula (IA) as defined above:

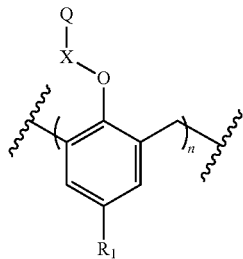

wherein Q is a phosphorus ligand such as a secondary phosphinite or secondary phosphonite, with the exception of a phosphine and phosphine oxide, or for preparing a compound of formula (IB) as defined above:

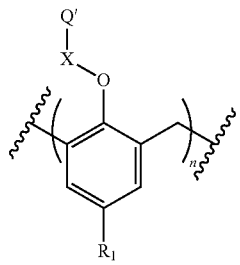

wherein Q' is selected from the group consisting of azoliums such as 1,3-imidazolium, 1,3-imidazolinium, 1,3-benzimidazolium, 1,2,4-triazolium, 1,3-thiazolium comprising a step of contacting a compound of formula (II):

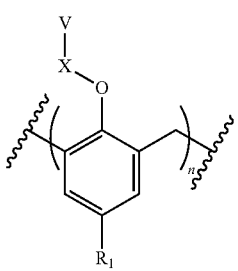

(II)

in which:

n, X, $R_1$ are as defined above,

V represents a leaving group, in particular chosen from the group consisting of halogens such as Cl, Br and I and sulfonates such as $OSO_2Me$, $OSO_2(C_7H_7)$ and $OSO_2CF_3$, with a compound of formula QA wherein Q is selected from the group consisting of phosphorus ligands such as a secondary phosphonite, or secondary, with the exception of phosphines and phosphine oxides and A represents an alkali metal selected from the group consisting of Na, K and Li or a is H and the reaction is carried out in the presence of a base, to give a compound of formula (IA), or with a compound of formula Q' selected from the group consisting of azoles such as 1,3-imidazoles, 1,3-imidazoline, 1,3-benzimidazoles, 1,2,4-triazoles and 1,3-thiazoles.

The present invention further relates to a method for preparing a compound of formula (IC):

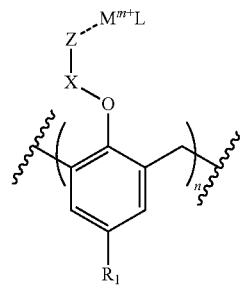

in which:

n, X, L, $M^{m+}$ and $R_1$ are as defined above,

Z represents a group Q selected from the group consisting of phosphines, phosphonites, phosphinites, and N-heterocyclic carbenes such as 1,3-imidazolylidenes, 1,3-imidazolinylidenes, 1,2,4-triazolylidenes, 1,3-benzimidazolylidenes, 1,2,4-triazolylidenes and 1,3-thiazolylidenes, comprising a step of contacting a compound of formula I wherein t is 0 and Z represents a group Q selected from the group consisting of phosphorus ligands such as phosphines, phosphonites, phosphinites, and N-heterocyclic carbenes such as 1,3-imidazolylidenes, 1,3-imidazolinylidenes, 1,2,4-triazolylidenes, 1,3-benzimidazolylidenes, 1,2,4-triazolylidenes and 1,3-thiazolylidenes,

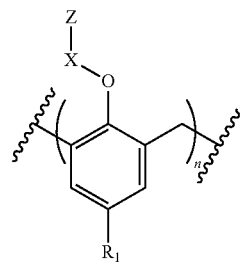

with a metal complex of formula $(L')M^{m+}$ where $M^{m+}$ is a metal in oxidation state m or a metal cluster comprising a plurality of metals in the oxidation state m, where m is 0, 1, 2, 3, 4 or 5, in particular 0, 1, 2 or 3, and L' is comprised of 0, one or more neutral or negatively charged ligands bound to the metal.

In one embodiment, the present invention relates to a method for preparing a compound of formula (IA) as defined above:

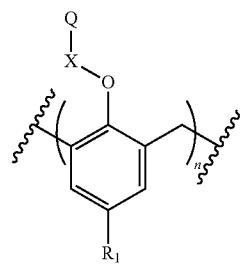

in which:
- n, X, R₁ are as defined above,
- Q is selected from the group consisting of salen ligands, in particular enantiopure salen ligands, in particular derivatives of cyclohexyldiamine and diphenylethylene and derivatives of the above salen ligands, comprising a step of contacting a compound of formula (IB):

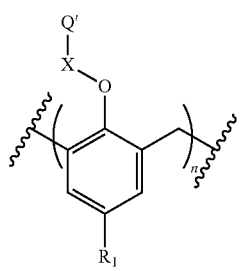
(IB)

in which:
- n, X, R₁ are as defined above,
- Q' represents a group precursor of the salen ligand, in particular derivatives of salicylaldehyde and in particular the 3-(tert-butyl)-5-triazol-2-hydroxybenzaldehyde,
- with another precursor group of the salen ligand, in particular salicylaldehyde derivatives and in particular the compound of formula VII.

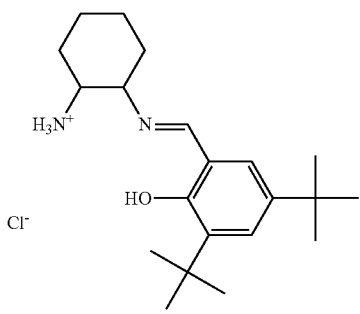
(VII)

In one embodiment, the present invention relates to a method for preparing a compound of formula (IB) as defined above:

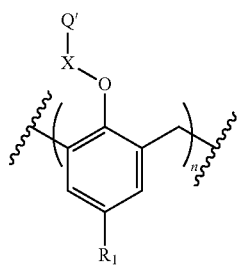

wherein Q' is selected from the salen ligand precursor group, in particular salicylaldehyde derivatives in particular 3-(tert-butyl)-5-triazol-2-hydroxybenzaldehyde, comprising a step of contacting a compound of formula (VIII):

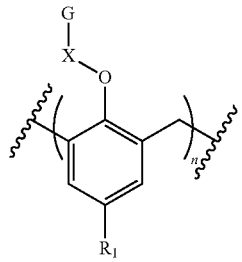
(VIII)

in which:
- n, X, R₁ are as defined above,
- G represents a grafting group of the group Q', in particular an N₃ group, with the group Q' selected from the salen ligand precursor group, in particular derivatives of salicylaldehyde and in particular the 3-(tert-butyl)-5 ethynyl-2-hydroxybenzaldehyde.

In one embodiment, the present invention relates to a method for preparing a compound of formula (VIII) as defined above:

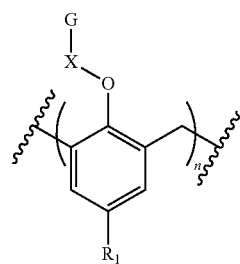

wherein G is selected as above, comprising a step of contacting a compound of formula (II):

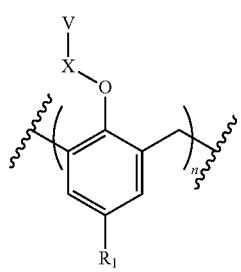
(II)

in which:
- n, X, R₁ are as defined above,
- V represents a leaving group, in particular chosen from the group consisting of halogens such as Cl, Br and I and sulfonates such as OSO₂Me, OSO₂(C₇H₇) et OSO₂CF₃,
- with a precursor of a grafting group of the group Q', in particular sodium azide, with Q' as defined above.

In another embodiment, the present invention relates to a method for preparing a compound of preparing a compound of formula (IC) as defined above:

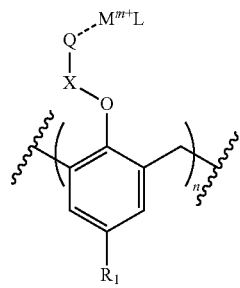

in which:
n, X, L, $M^{m+}$ and $R_1$ are as defined above,
wherein Q is selected from the group consisting of salen ligands, in particular enantiopure salen ligands, in particular derivatives of cyclohexyldiamine and diphenylethylene and derivatives of the above salen ligands comprising a step of contacting a compound of formula (IA):

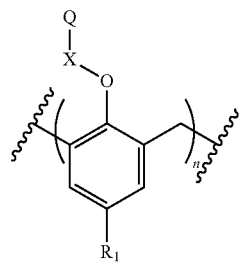

wherein Q is selected from the group consisting of salen ligands, in particular enantiopure salen ligands, in particular derivatives of cyclohexyldiamine and diphenylethylene and derivatives of the above salen ligands, with a metal complex of formula $LM^{m+}$, wherein $M^{m+}$ is a metal in oxidation state m, where m is 0, 1, 2, 3, 4 or 5, in particular 0, 1, 2 or 3, and L consists one or more neutral ligands or negatively charged linked to the metal, optionally in the presence of a base, in particular with cobalt acetate and paratoluenesulfonic acid.

In one embodiment, the present invention relates to a method for preparing a compound of formula (IC) as defined above:

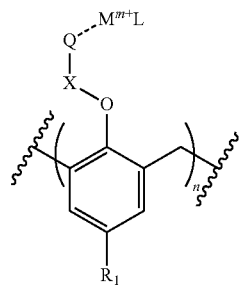

in which:
n, X, L, $M^{m+}$ and $R_1$ are as defined above,
and Q is selected from the group consisting of salen ligands, in particular enantiopure salen ligands, in particular derivatives of cyclohexyldiamine and diphenylethylene and derivatives of the above salen ligands, comprising a step of contacting a compound of formula (II):

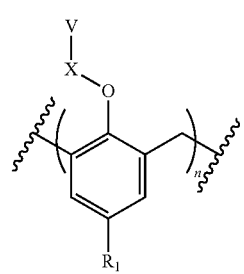

in which:
n, X, $R_1$ are as defined above,
V represents a leaving group, in particular chosen from the group consisting of halogens such as Cl, Br and I and sulfonates such as $OSO_2Me$, $OSO_2(C_7H_7)$ et $OSO_2CF_3$,
with a precursor of a grafting group of the group Q', particularly sodium azide,
Q' represents a group selected from the salen ligand precursor group, in particular derivatives of salicylaldehyde and in particular the 3-(tert-butyl)-5-triazol-2-hydroxybenzaldehyde,
to obtain a compound of formula (VIII)

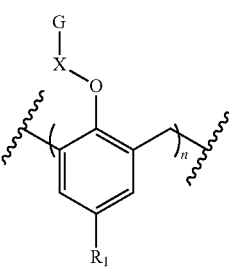

in which:
n, X, $R_1$ are as defined above,
G represents a group of said grafting group of the group Q, in particular a $N_3$ group, and comprising a step of contacting said compound of formula (VIII) with to give a compound of formula (IB)

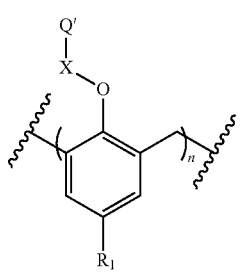

in which:
n, X, R and Q' are as defined above, then comprising a step of contacting said compound of formula (IB), with another precursor group of the salen ligand, in particular derivatives of salicylaldehyde and in particular the compound of formula (VII),

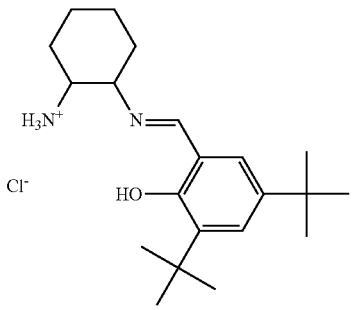

(VII)

to obtain a compound of formula (IA),

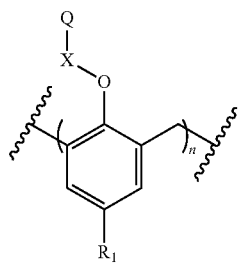

(IA)

in which:
n, X, R and Q are as defined above,
and comprising a step of contacting a compound of formula (IA),
with a metal complex of formula LM$^{m+}$, wherein M$^{m+}$ is a metal in oxidation state m, where m is 0, 1, 2, 3, 4 or 5, in particular 0, 1 or 2 or 3 and L consists of one or more neutral ligands or negatively charged linked to the metal, optionally in the presence of a base, in particular with cobalt acetate and para-toluenesulfonic acid, to obtain said compound of formula (IC).

The present invention relates, in particular embodiments, the following compounds:

| n | R1 | X | Q | Q' |
|---|---|---|---|---|
| 8 | OCH$_2$Ph | —(CH$_2$)$_3$— | Phosphine | — |
| 8 | OCH$_2$Ph | —(CH$_2$)$_4$— | Phosphine | — |
| 8 | OCH$_2$Ph | —(CH$_2$)$_5$— | Phosphine | — |
| 8 | OCH$_2$Ph | —(CH$_2$)$_6$— | Phosphine | — |
| 8 | OCH$_2$Ph | —(CH$_2$)$_7$— | Phosphine | — |
| 8 | OCH$_2$Ph | —(CH$_2$)$_8$— | Phosphine | — |
| 8 | OCH$_2$Ph | —(CH$_2$)$_3$— | NHC | — |
| 8 | OCH$_2$Ph | —(CH$_2$)$_4$— | NHC | — |
| 8 | OCH$_2$Ph | —(CH$_2$)$_5$— | NHC | — |
| 8 | OCH$_2$Ph | —(CH$_2$)$_6$— | NHC | — |
| 8 | OCH$_2$Ph | —(CH$_2$)$_7$— | NHC | — |
| 8 | OCH$_2$Ph | —(CH$_2$)$_8$— | NHC | — |
| 8 | OCH$_2$Ph | —(CH$_2$)$_3$— | — | Azolium |
| 8 | OCH$_2$Ph | —(CH$_2$)$_4$— | — | Azolium |
| 8 | OCH$_2$Ph | —(CH$_2$)$_5$— | — | Azolium |
| 8 | OCH$_2$Ph | —(CH$_2$)$_6$— | — | Azolium |
| 8 | OCH$_2$Ph | —(CH$_2$)$_7$— | — | Azolium |
| 8 | OCH$_2$Ph | —(CH$_2$)$_8$— | — | Azolium |
| 8 | t-Bu | —(CH$_2$)$_3$— | Phosphine | |
| 8 | t-Bu | —(CH$_2$)$_4$— | Phosphine | |
| 8 | t-Bu | —(CH$_2$)$_5$— | Phosphine | |
| 8 | t-Bu | —(CH$_2$)$_6$— | Phosphine | |
| 8 | t-Bu | —(CH$_2$)$_7$— | Phosphine | |
| 8 | t-Bu | —(CH$_2$)$_8$— | Phosphine | |
| 8 | t-Bu | —(CH$_2$)$_3$— | NHC | |
| 8 | t-Bu | —(CH$_2$)$_4$— | NHC | |
| 8 | t-Bu | —(CH$_2$)$_5$— | NHC | |
| 8 | t-Bu | —(CH$_2$)$_6$— | NHC | |
| 8 | t-Bu | —(CH$_2$)$_7$— | NHC | |
| 8 | t-Bu | —(CH$_2$)$_8$— | NHC | |
| 8 | t-Bu | —(CH$_2$)$_3$— | — | Azolium |
| 8 | t-Bu | —(CH$_2$)$_4$— | — | Azolium |
| 8 | t-Bu | —(CH$_2$)$_5$— | — | Azolium |
| 8 | t-Bu | —(CH$_2$)$_6$— | — | Azolium |
| 8 | t-Bu | —(CH$_2$)$_7$— | — | Azolium |
| 8 | t-Bu | —(CH$_2$)$_8$— | — | Azolium |
| 8 | n-octyl | —(CH$_2$)$_3$— | Phosphine | — |
| 8 | n-octyl | —(CH$_2$)$_4$— | Phosphine | — |
| 8 | n-octyl | —(CH$_2$)$_5$— | Phosphine | — |
| 8 | n-octyl | —(CH$_2$)$_6$— | Phosphine | — |
| 8 | n-octyl | —(CH$_2$)$_7$— | Phosphine | — |
| 8 | n-octyl | —(CH$_2$)$_8$— | Phosphine | — |
| 8 | n-octyl | —(CH$_2$)$_3$— | NHC | — |
| 8 | n-octyl | —(CH$_2$)$_4$— | NHC | — |
| 8 | n-octyl | —(CH$_2$)$_5$— | NHC | — |
| 8 | n-octyl | —(CH$_2$)$_6$— | NHC | — |
| 8 | n-octyl | —(CH$_2$)$_7$— | NHC | — |
| 8 | n-octyl | —(CH$_2$)$_8$— | NHC | — |
| 8 | n-octyl | —(CH$_2$)$_3$— | — | Azolium |
| 8 | n-octyl | —(CH$_2$)$_4$— | — | Azolium |
| 8 | n-octyl | —(CH$_2$)$_5$— | — | Azolium |
| 8 | n-octyl | —(CH$_2$)$_6$— | — | Azolium |
| 8 | n-octyl | —(CH$_2$)$_7$— | — | Azolium |
| 8 | n-octyl | —(CH$_2$)$_8$— | — | Azolium |
| 16 | OCH$_2$Ph | —(CH$_2$)$_3$— | Phosphine | — |
| 16 | OCH$_2$Ph | —(CH$_2$)$_4$— | Phosphine | — |
| 16 | OCH$_2$Ph | —(CH$_2$)$_5$— | Phosphine | — |
| 16 | OCH$_2$Ph | —(CH$_2$)$_6$— | Phosphine | — |
| 16 | OCH$_2$Ph | —(CH$_2$)$_7$— | Phosphine | — |
| 16 | OCH$_2$Ph | —(CH$_2$)$_8$— | Phosphine | — |
| 16 | OCH$_2$Ph | —(CH$_2$)$_3$— | NHC | — |
| 16 | OCH$_2$Ph | —(CH$_2$)$_4$— | NHC | — |
| 16 | OCH$_2$Ph | —(CH$_2$)$_5$— | NHC | — |
| 16 | OCH$_2$Ph | —(CH$_2$)$_6$— | NHC | — |
| 16 | OCH$_2$Ph | —(CH$_2$)$_7$— | NHC | — |
| 16 | OCH$_2$Ph | —(CH$_2$)$_8$— | NHC | — |
| 16 | OCH$_2$Ph | —(CH$_2$)$_3$— | — | Azolium |
| 16 | OCH$_2$Ph | —(CH$_2$)$_4$— | — | Azolium |
| 16 | OCH$_2$Ph | —(CH$_2$)$_5$— | — | Azolium |
| 16 | OCH$_2$Ph | —(CH$_2$)$_6$— | — | Azolium |
| 16 | OCH$_2$Ph | —(CH$_2$)$_7$— | — | Azolium |
| 16 | OCH$_2$Ph | —(CH$_2$)$_8$— | — | Azolium |
| 16 | t-Bu | —(CH$_2$)$_3$— | Phosphine | |
| 16 | t-Bu | —(CH$_2$)$_4$— | Phosphine | |
| 16 | t-Bu | —(CH$_2$)$_5$— | Phosphine | |
| 16 | t-Bu | —(CH$_2$)$_6$— | Phosphine | |
| 16 | t-Bu | —(CH$_2$)$_7$— | Phosphine | |
| 16 | t-Bu | —(CH$_2$)$_8$— | Phosphine | |
| 16 | t-Bu | —(CH$_2$)$_3$— | NHC | |
| 16 | t-Bu | —(CH$_2$)$_4$— | NHC | |
| 16 | t-Bu | —(CH$_2$)$_5$— | NHC | |
| 16 | t-Bu | —(CH$_2$)$_6$— | NHC | |
| 16 | t-Bu | —(CH$_2$)$_7$— | NHC | |
| 16 | t-Bu | —(CH$_2$)$_8$— | NHC | |
| 16 | t-Bu | —(CH$_2$)$_3$— | — | Azolium |
| 16 | t-Bu | —(CH$_2$)$_4$— | — | Azolium |
| 16 | t-Bu | —(CH$_2$)$_5$— | — | Azolium |
| 16 | t-Bu | —(CH$_2$)$_6$— | — | Azolium |
| 16 | t-Bu | —(CH$_2$)$_7$— | — | Azolium |
| 16 | t-Bu | —(CH$_2$)$_8$— | — | Azolium |
| 16 | n-octyl | —(CH$_2$)$_3$— | Phosphine | — |
| 16 | n-octyl | —(CH$_2$)$_4$— | Phosphine | — |
| 16 | n-octyl | —(CH$_2$)$_5$— | Phosphine | — |
| 16 | n-octyl | —(CH$_2$)$_6$— | Phosphine | — |
| 16 | n-octyl | —(CH$_2$)$_7$— | Phosphine | — |
| 16 | n-octyl | —(CH$_2$)$_8$— | Phosphine | — |

-continued

| n | R1 | X | Q | Q' |
|---|----|---|---|-----|
| 16 | n-octyl | —(CH$_2$)$_3$— | NHC | — |
| 16 | n-octyl | —(CH$_2$)$_4$— | NHC | — |
| 16 | n-octyl | —(CH$_2$)$_5$— | NHC | — |
| 16 | n-octyl | —(CH$_2$)$_6$— | NHC | — |
| 16 | n-octyl | —(CH$_2$)$_7$— | NHC | — |
| 16 | n-octyl | —(CH$_2$)$_8$— | NHC | — |
| 16 | n-octyl | —(CH$_2$)$_3$— | — | Azolium |
| 16 | n-octyl | —(CH$_2$)$_4$— | — | Azolium |
| 16 | n-octyl | —(CH$_2$)$_5$— | — | Azolium |
| 16 | n-octyl | —(CH$_2$)$_6$— | — | Azolium |
| 16 | n-octyl | —(CH$_2$)$_7$— | — | Azolium |
| 16 | n-octyl | —(CH$_2$)$_8$— | — | Azolium |
| 35 | OCH$_2$Ph | —(CH$_2$)$_3$— | Phosphine | — |
| 35 | OCH$_2$Ph | —(CH$_2$)$_4$— | Phosphine | — |
| 35 | OCH$_2$Ph | —(CH$_2$)$_5$— | Phosphine | — |
| 35 | OCH$_2$Ph | —(CH$_2$)$_6$— | Phosphine | — |
| 35 | OCH$_2$Ph | —(CH$_2$)$_7$— | Phosphine | — |
| 35 | OCH$_2$Ph | —(CH$_2$)$_8$— | Phosphine | — |
| 35 | OCH$_2$Ph | —(CH$_2$)$_3$— | NHC | — |
| 35 | OCH$_2$Ph | —(CH$_2$)$_4$— | NHC | — |
| 35 | OCH$_2$Ph | —(CH$_2$)$_5$— | NHC | — |
| 35 | OCH$_2$Ph | —(CH$_2$)$_6$— | NHC | — |
| 35 | OCH$_2$Ph | —(CH$_2$)$_7$— | NHC | — |
| 35 | OCH$_2$Ph | —(CH$_2$)$_8$— | NHC | — |
| 35 | OCH$_2$Ph | —(CH$_2$)$_3$— | — | Azolium |
| 35 | OCH$_2$Ph | —(CH$_2$)$_4$— | — | Azolium |
| 35 | OCH$_2$Ph | —(CH$_2$)$_5$— | — | Azolium |
| 35 | OCH$_2$Ph | —(CH$_2$)$_6$— | — | Azolium |
| 35 | OCH$_2$Ph | —(CH$_2$)$_7$— | — | Azolium |
| 35 | OCH$_2$Ph | —(CH$_2$)$_8$— | — | Azolium |
| 35 | t-Bu | —(CH$_2$)$_3$— | Phosphine | — |
| 35 | t-Bu | —(CH$_2$)$_4$— | Phosphine | — |
| 35 | t-Bu | —(CH$_2$)$_5$— | Phosphine | — |
| 35 | t-Bu | —(CH$_2$)$_6$— | Phosphine | — |
| 35 | t-Bu | —(CH$_2$)$_7$— | Phosphine | — |
| 35 | t-Bu | —(CH$_2$)$_8$— | Phosphine | — |
| 35 | t-Bu | —(CH$_2$)$_3$— | NHC | — |
| 35 | t-Bu | —(CH$_2$)$_4$— | NHC | — |
| 35 | t-Bu | —(CH$_2$)$_5$— | NHC | — |
| 35 | t-Bu | —(CH$_2$)$_6$— | NHC | — |
| 35 | t-Bu | —(CH$_2$)$_7$— | NHC | — |
| 35 | t-Bu | —(CH$_2$)$_8$— | NHC | — |
| 35 | t-Bu | —(CH$_2$)$_3$— | — | Azolium |
| 35 | t-Bu | —(CH$_2$)$_4$— | — | Azolium |
| 35 | t-Bu | —(CH$_2$)$_5$— | — | Azolium |
| 35 | t-Bu | —(CH$_2$)$_6$— | — | Azolium |
| 35 | t-Bu | —(CH$_2$)$_7$— | — | Azolium |
| 35 | t-Bu | —(CH$_2$)$_8$— | — | Azolium |
| 35 | n-octyl | —(CH$_2$)$_3$— | Phosphine | — |
| 35 | n-octyl | —(CH$_2$)$_4$— | Phosphine | — |
| 35 | n-octyl | —(CH$_2$)$_5$— | Phosphine | — |
| 35 | n-octyl | —(CH$_2$)$_6$— | Phosphine | — |
| 35 | n-octyl | —(CH$_2$)$_7$— | Phosphine | — |
| 35 | n-octyl | —(CH$_2$)$_8$— | Phosphine | — |
| 35 | n-octyl | —(CH$_2$)$_3$— | NHC | — |
| 35 | n-octyl | —(CH$_2$)$_4$— | NHC | — |
| 35 | n-octyl | —(CH$_2$)$_5$— | NHC | — |
| 35 | n-octyl | —(CH$_2$)$_6$— | NHC | — |
| 35 | n-octyl | —(CH$_2$)$_7$— | NHC | — |
| 35 | n-octyl | —(CH$_2$)$_8$— | NHC | — |
| 35 | n-octyl | —(CH$_2$)$_3$— | — | Azolium |
| 35 | n-octyl | —(CH$_2$)$_4$— | — | Azolium |
| 35 | n-octyl | —(CH$_2$)$_5$— | — | Azolium |
| 35 | n-octyl | —(CH$_2$)$_6$— | — | Azolium |
| 35 | n-octyl | —(CH$_2$)$_7$— | — | Azolium |
| 35 | n-octyl | —(CH$_2$)$_8$— | — | Azolium |
| 8 | OCH$_2$Ph | —(CH$_2$)$_4$— | salen Ligand | — |
| 8 | OCH$_2$Ph | —(CH$_2$)$_4$— | | Salicylaldehyde |
| 8 | OCH$_2$Ph | —(CH$_2$)$_3$—O— | NHC | — |
| 8 | OCH$_2$Ph | —(CH$_2$)$_4$—O— | NHC | — |
| 8 | OCH$_2$Ph | —(CH$_2$)$_5$—O— | NHC | — |
| 8 | OCH$_2$Ph | —(CH$_2$)$_6$—O— | NHC | — |
| 8 | OCH$_2$Ph | —(CH$_2$)$_7$—O— | NHC | — |
| 8 | OCH$_2$Ph | —(CH$_2$)$_8$—O— | NHC | — |

EXAMPLES

The seven schemes below illustrate the synthesis of the catalysts according to the present invention containing a N-heterocyclic carbene or phosphine:

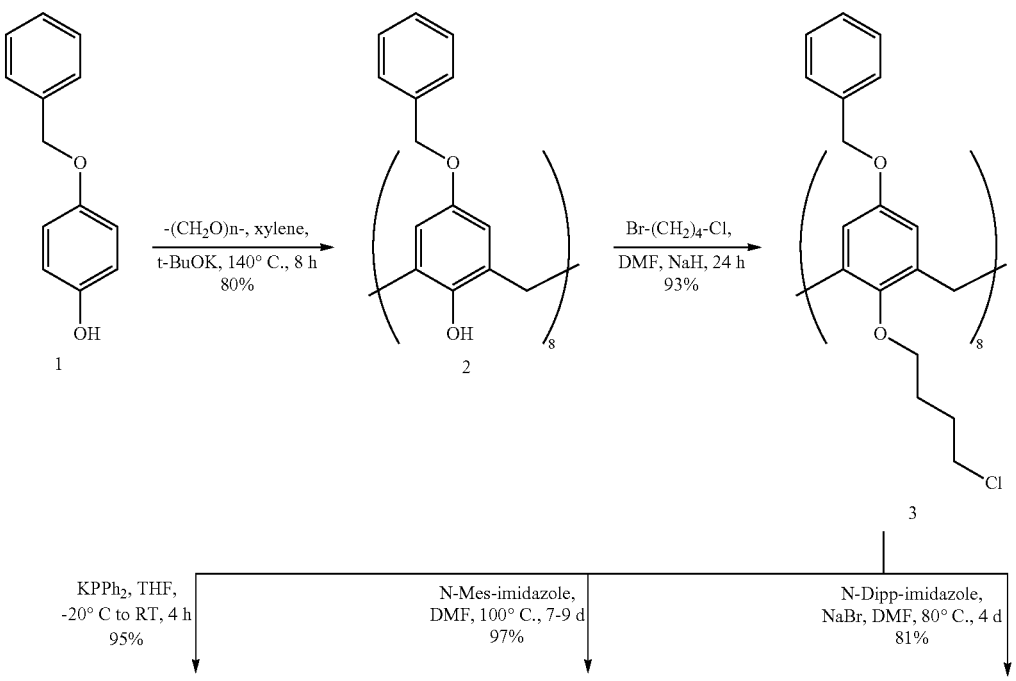

Scheme 1

-continued
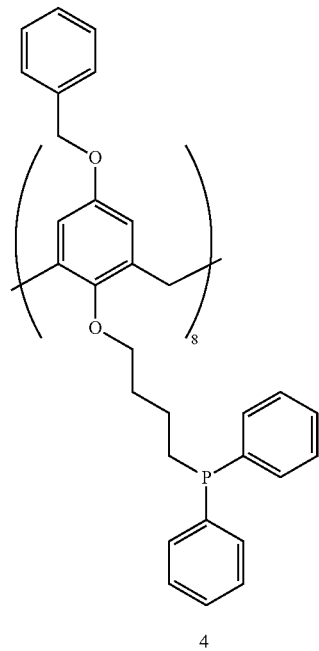
4
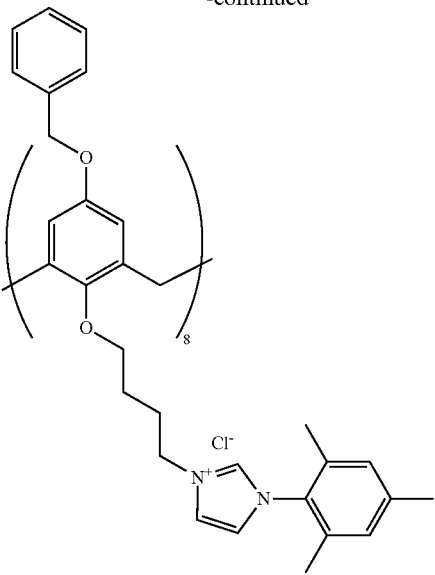
5
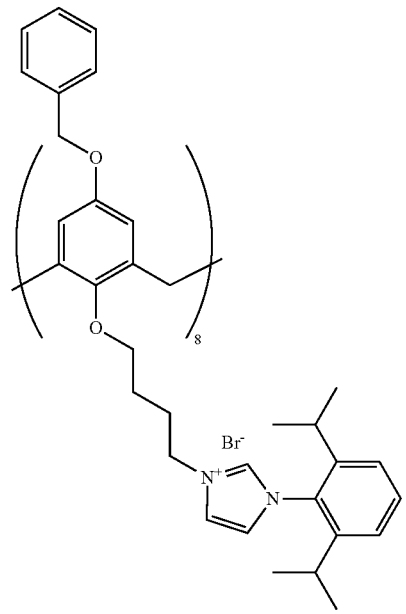
6
[Rh(COD)Cl]₂, DCM, RT, 2h | 80%
3-Chloropyridine, PdCl₂, K₂CO₃, 100° C., 48 h | 78%
Pyridine, PdBr₂, K₂CO₃, 100° C., 24 h | 79%
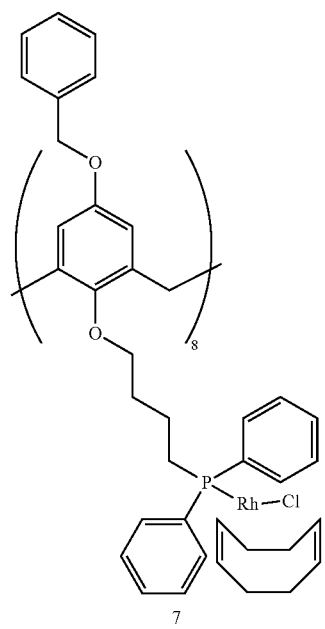
7
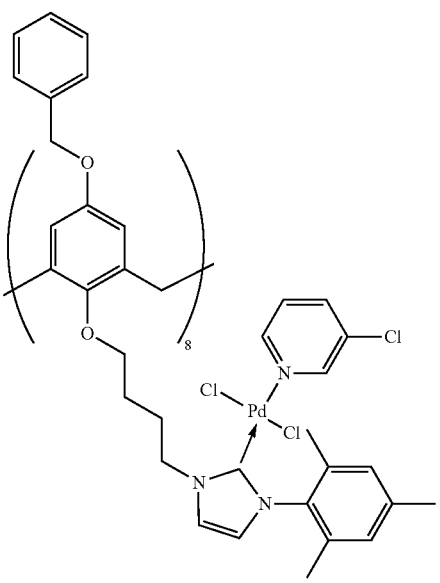
8
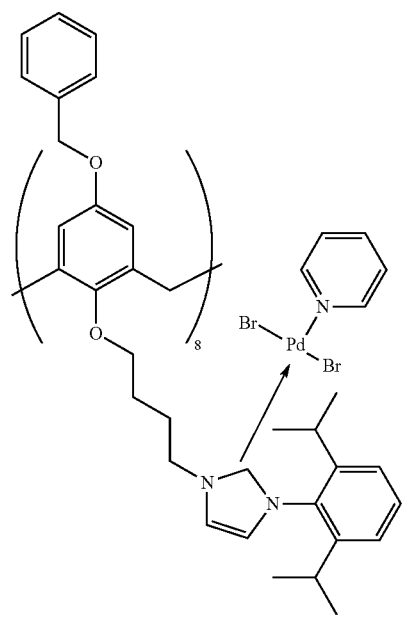
9

Scheme 2
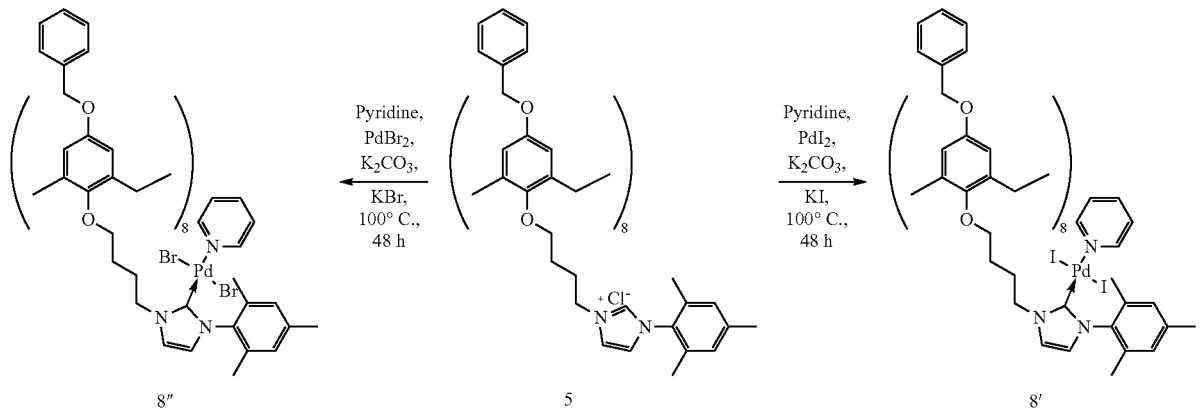
Scheme 3
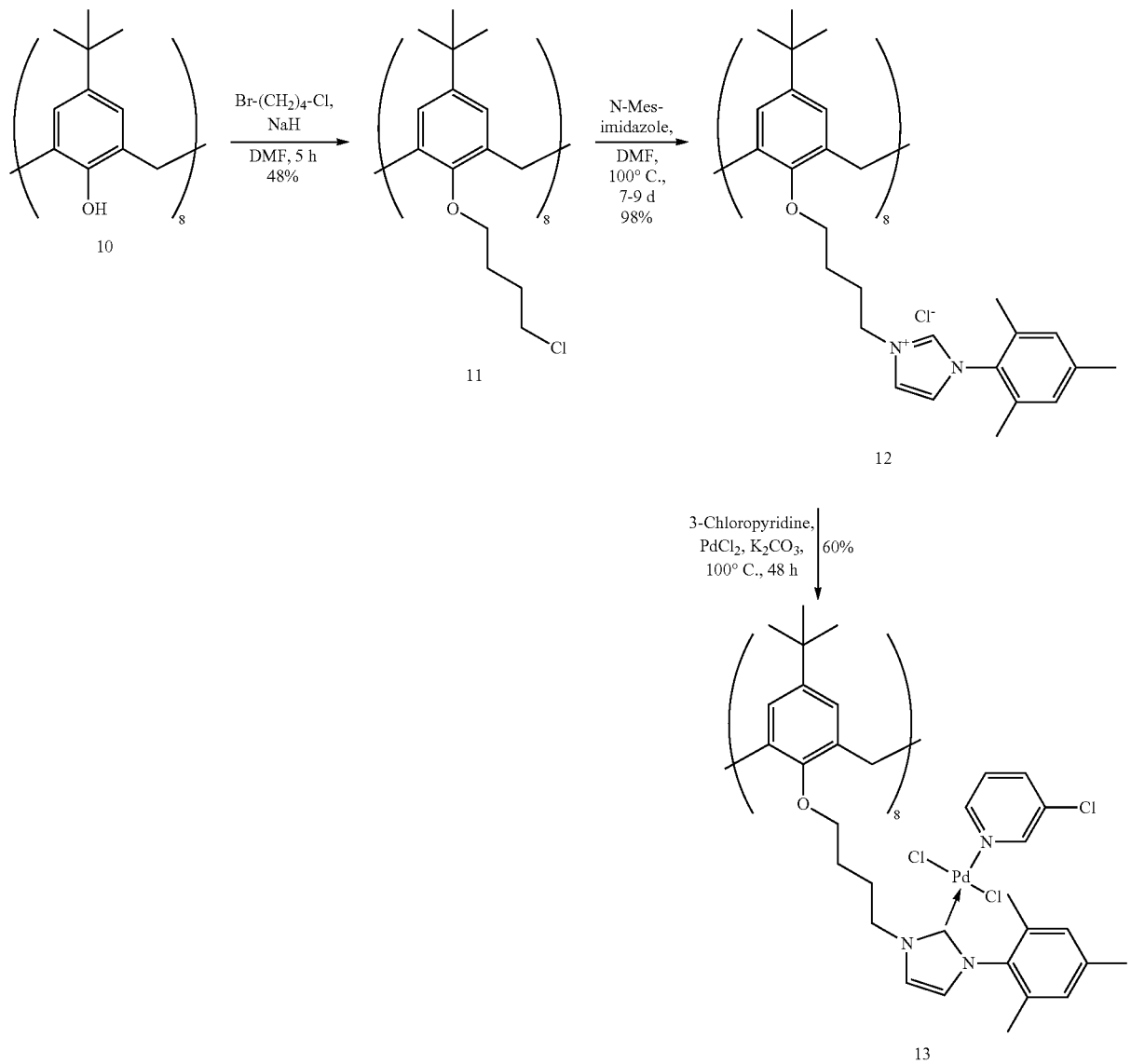

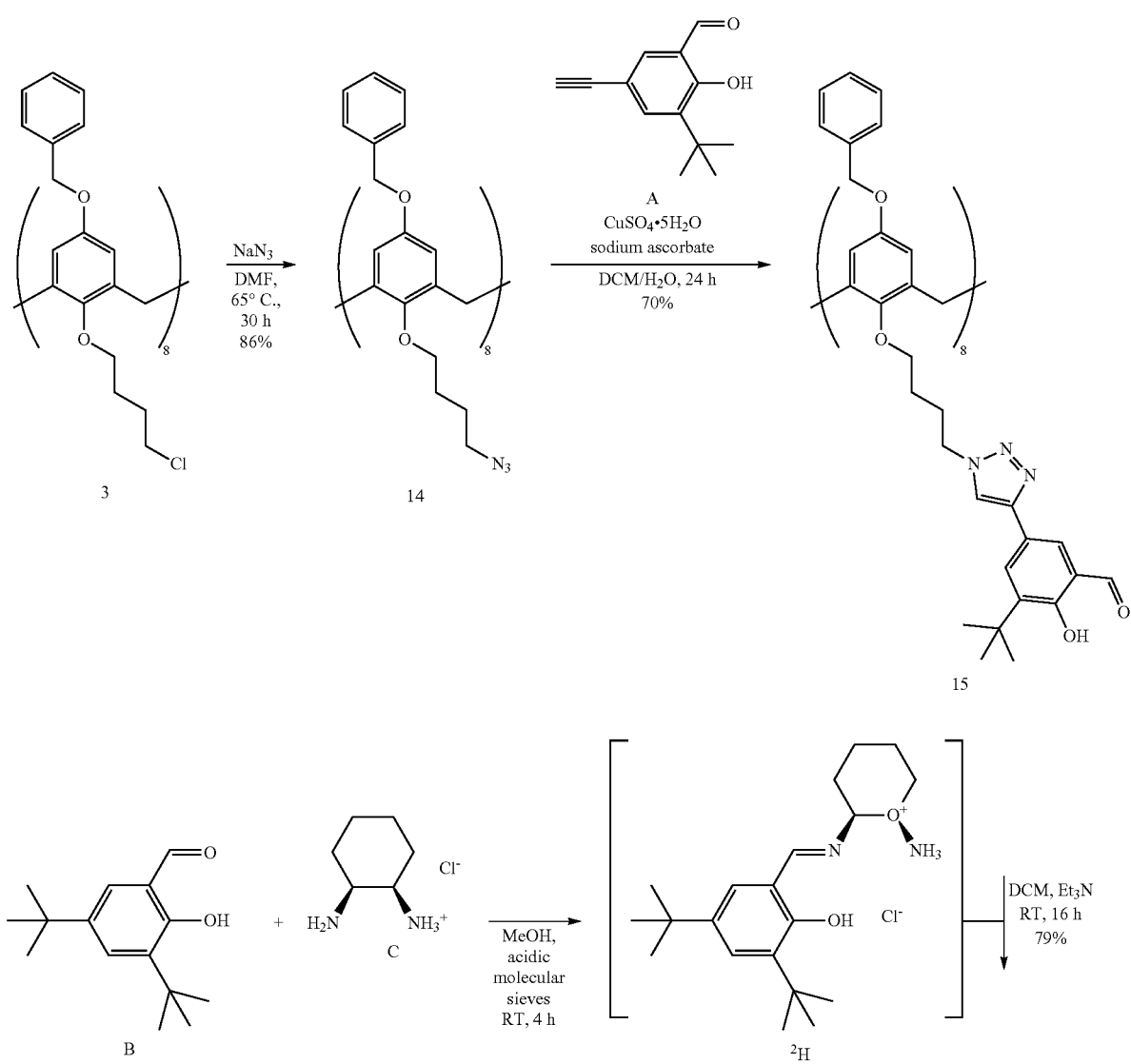

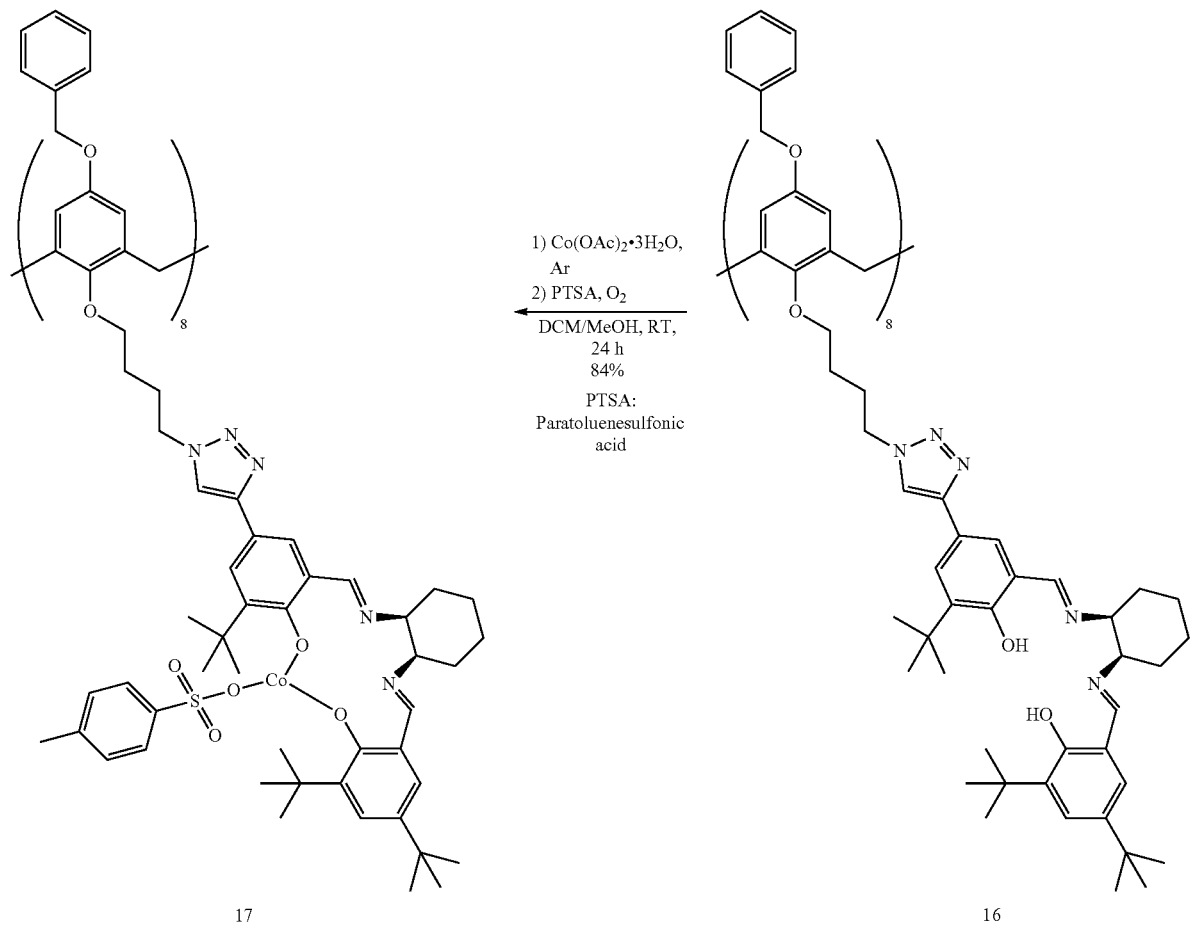
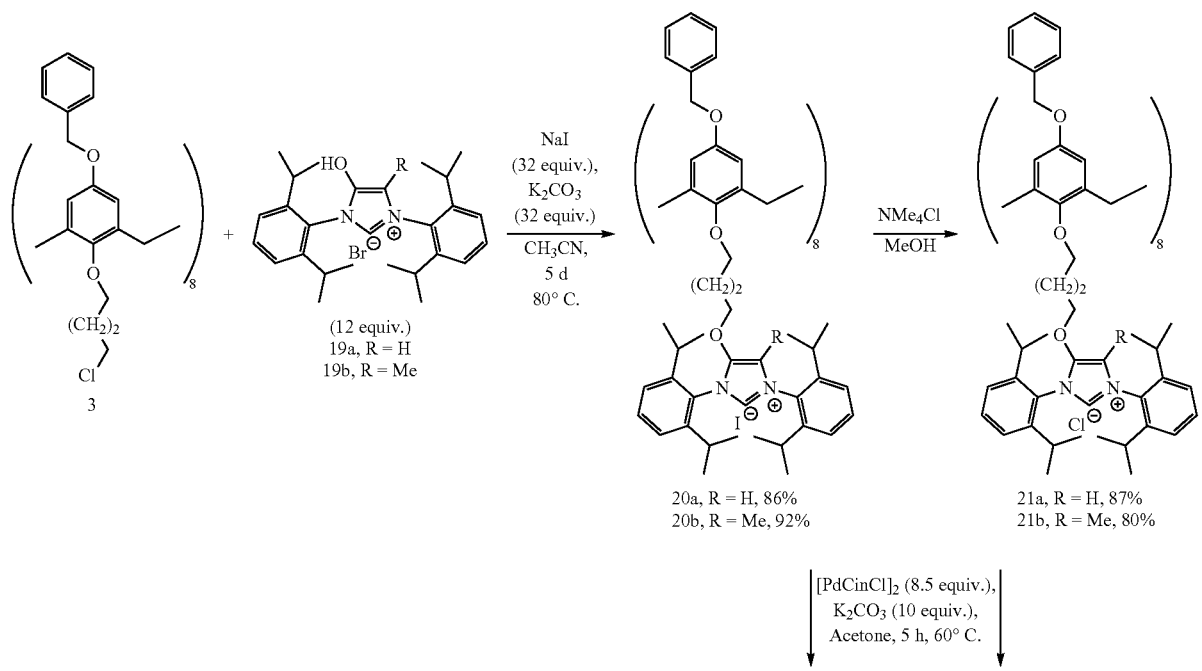

53 54
-continued
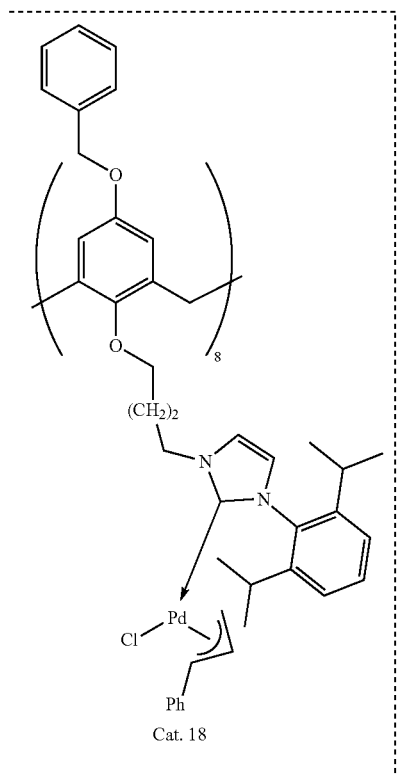
Cat. 18
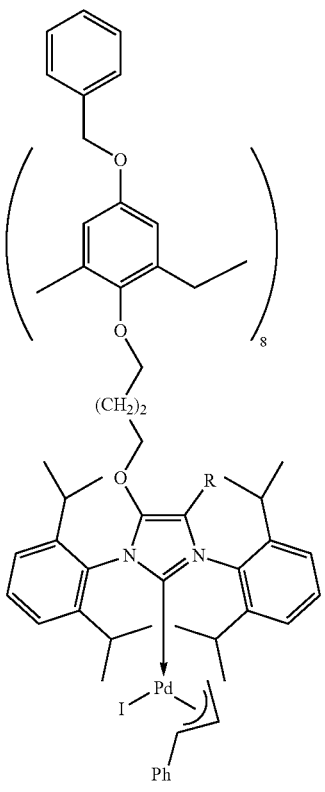
Cat. 22, R = H, 84%
Cat. 24, R = Me, 73%
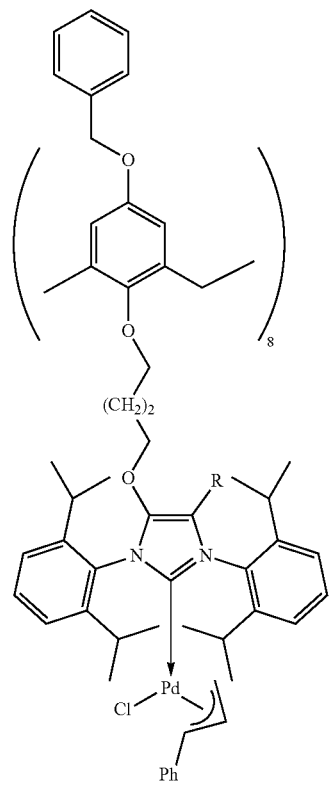
Cat. 23, R = H, 74%
Cat. 25, R = Me, 87%
Scheme 6
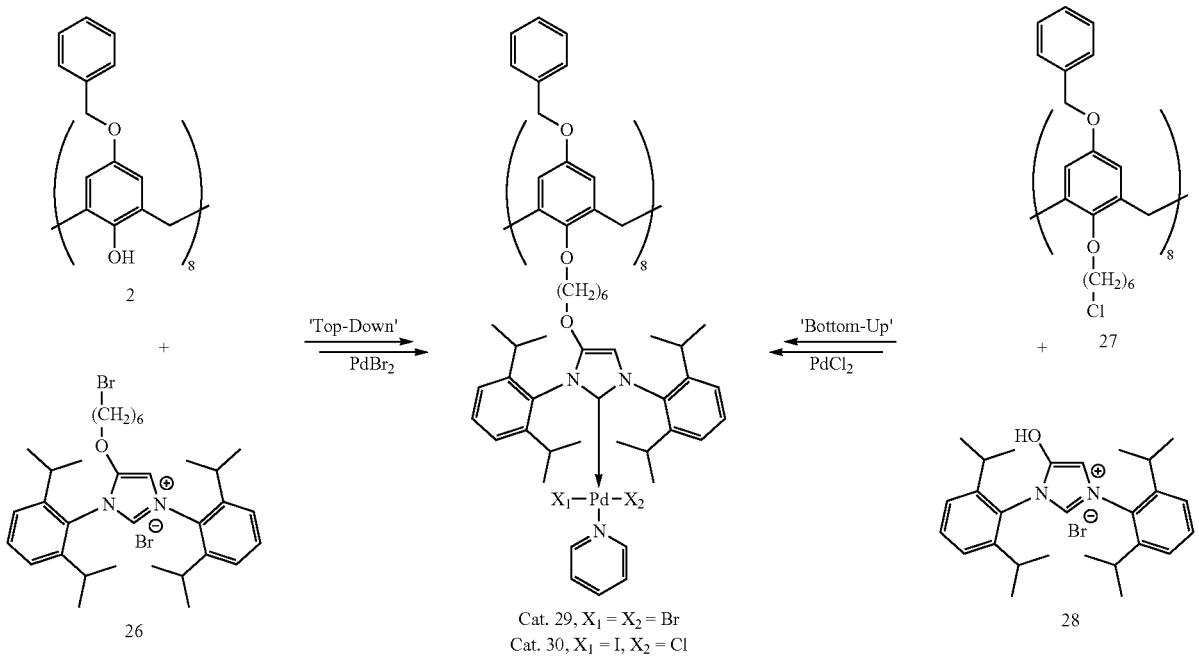
Cat. 29, $X_1 = X_2 = $ Br
Cat. 30, $X_1 = $ I, $X_2 = $ Cl Scheme 7
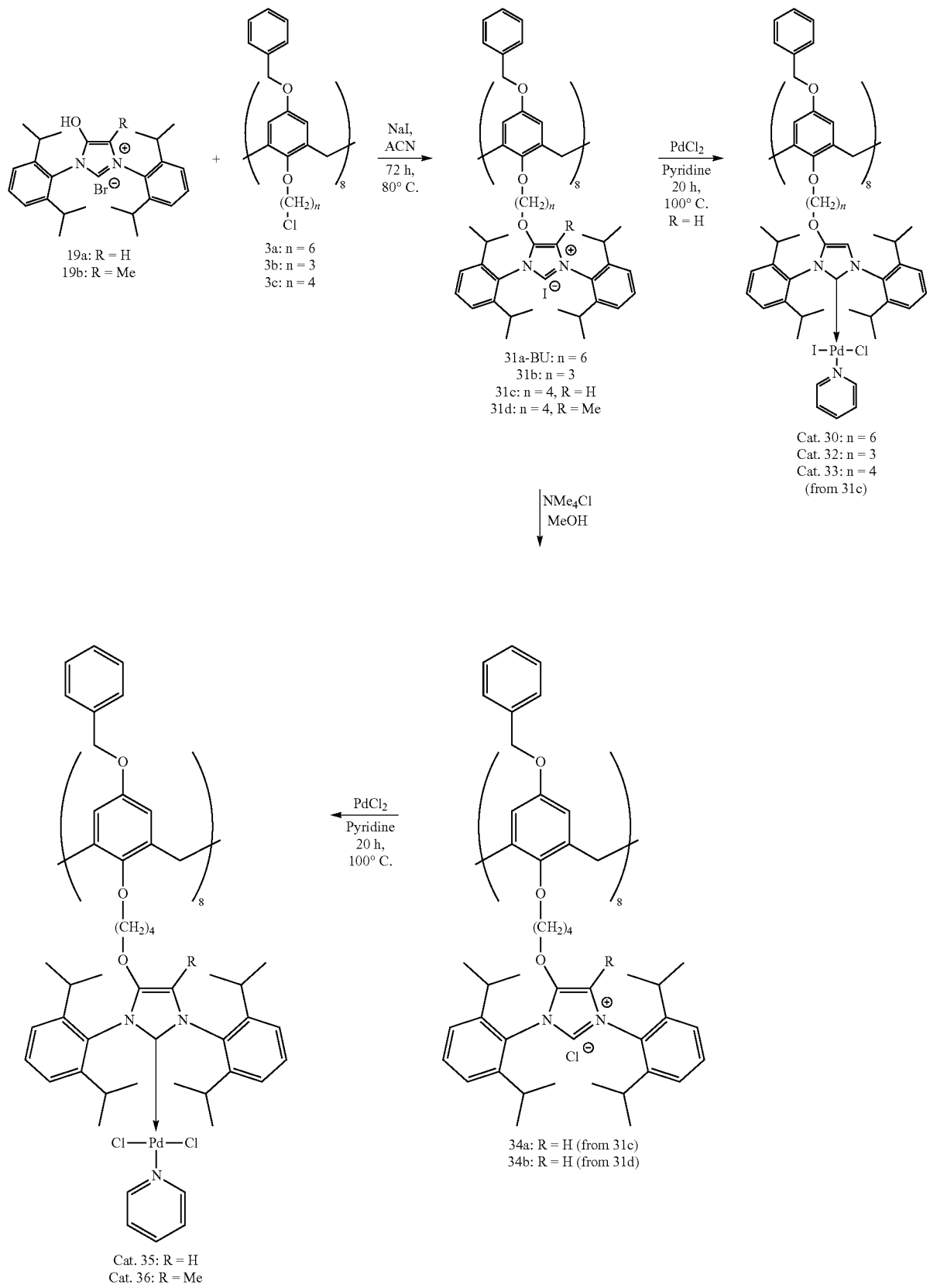

Example 1: Preparation of the Chlorinated Precursors

Preparation of Calixarene 2:

Benzyloxyphenol 1 (200 g, 1 mol), paraformaldehyde (78.7 g) and xylene (2 L) were loaded, and the medium was placed under argon. t-BuOK (7.39 g, 65.9 mmol) was loaded and vacuum-argon cycles were performed. The mixture was brought to reflux for 8 hours under strong stirring, collecting the water formed with a Dean-Stark water separating apparatus. The mixture was allowed to cool to room temperature and the xylene was evaporated under reduced pressure. The solid residue was heated at 45° C. in 3 L of THF under vigorous stirring, filtered and rinsed with 500 ml of THF. The cake was dispersed with vigorous stirring in 2.5 L of THF at 45° C. for 30 min. 1 L of THF was evaporated and a solution of THF/HCl (33%) (200/50 ml) was added. The mixture was stirred for 30 min at room temperature, filtered and rinsed with 250 ml of THF. The product was allowed to dry overnight under air and then a few hours using a rotary vane pump, after grinding. 169.5 g of very pure product was obtained (yield: 80%). $^1$H NMR (DMSO-d6, ppm): 8.67 (s, 8H), 7.30 (m, 40H), 6.58 (s, 16H), 4.80 (s, 16H); 3.77 (s, 16H). m/z (MALDI, matrice DHB): 1719.62 [M+Na$^+$] (calc=1697.67).

Preparation of Calixarene 3:

Ground benzyloxycalix[8]arene 2 (60 g, 35.3 mmol) was loaded, then, 1-bromo-4-chlorobutane (520 ml, 3 mol) and DMF (90 ml) were added under argon. The mixture was heated to 40° C., stirring was stopped and a third of the sodium hydride (22.6 g, 5.65·10$^{-1}$ mol) was added. The mixture was placed under argon and stirring was gradually started. The rest of the sodium hydride was added in two fractions, spacing each addition by 1 h30. The mixture was allowed to react at 30° C. until the next morning. 350 ml of dichloromethane was added, the mixture was filtered over Celite, rinsed with 200 ml of dichloromethane and the solvents are evaporated at 60° C. under reduced pressure. 2 L of methanol was added and the solid was dispersed with vigorous stirring for 24 hours. The mixture was filtered, and the cake was dried several hours in air and then to the vane pump. 2 L of ethanol is added and the solid is dispersed with vigorous stirring for 24 hours. The mixture was filtered, and the cake was dried several hours in air and then using a rotary vane pump. 80 g of a pure white solid was obtained (yield=93%). $^1$H NMR (DMSO-d6, ppm): 7.15 (m, 40H), 6.51 (s, 16H), 4.69 (s, 16H), 3.89 (s, 16H), 3.56 (m, 16H), 3.47 (t, 16H, $^3$J(H, H)=6.4 Hz), 1.75 (m, 16H), 1.65 (m, 16H). $^{13}$C NMR (DMSO-d6, ppm): 155.17, 149.83, 138.08, 135.67, 129.34, 128.74, 128.64, 115.75, 73.38, 70.26, 46.29, 30.91, 30.20, 28.35. m/z (ESI, DCM-isopropanol, positive mode): 2439.85 [M+Na$^+$].

Example 2: Preparation of Phosphorus Ligands

Phosphorus Ligand 4

Calixarene 3 (10 g, 4.13 mmol) was loaded in a reactor, dried under vacuum for 30 min, followed by addition of THF (17 ml) under argon. The solution was cooled to −20° C. and a solution of KPPh$_2$ (70.2 ml, 0.5 M in THF, 35.1 mmol) was slowly added. The solution was stirred at room temperature for 4 h, followed by addition of DCM (20 ml). The mixture was filtered through celite and rinsed with DCM. The filtrate is evaporated to dryness and the residue was triturated with diethyl ether and filtered. The cake was triturated with pentane and filtered. The product was dried under vacuum and to obtain 14.2 g of a pale yellow product (yield: 95%). $^1$H NMR (CDCl$_3$, ppm): 7.39 to 7.33 (m, 40H), 7.26 to 7.23 (m, 40H), 7.00 (s, 30H), 6.45 (s, 16H), 4.43 (s, 16H), 3.88 (s, 16H), 3.60 (m, 16H), 2.09 to 1.97 (m, 16H), 1.78 (m, 16H), 1.57 (m, 16H). $^{31}$P NMR (CDCl$_3$, ppm): −16.33 (s).

Example 3: Preparation of Imidazolium Salts (Precursors of Heterocyclic N-Carbene Ligands)

Ligand IMes.HCl 5:

Calixarene 3 (10.1 g, 4.2 mmol) and mesitylimidazole (25 g, 134.2 mmol) were loaded. The reactor was placed under an argon atmosphere and then anhydrous DMF was added (200 ml). 3 vacuum/argon were performed, and the mixture was heated for 7-9 days at 100° C. with stirring (the reaction was monitored by NMR). DMF was evaporated and the product is dissolved in DCM (200 ml) and precipitated with ether (300 ml). The resulting brown solid was washed with diethyl ether (300 ml), triturated with diethyl ether (100 ml) and filtered. 15.5 g of a brown solid were obtained (yield=97%). $^1$H NMR (DMSO-d6, ppm): 10.04 (s, 8H), 8.21 (s, 8H), 7.95 (s, 16H), 7.06 (s, 56H), 6.48 (s, 16H), 4.61 (s, 16H), 4.39 (s, 16H), 3.89 (s, 16H), 3.71 (s, 16H), 2.89 (s, 32H), 2.73 (s, 32H), 2.28 (s, 24H), 2.03 (s, 16H), 1.66 (s, 48H), 1.65 (s, 16H). m/z (ESI, positive mode): 942.49 [M+4Na$^+$]/4 (calc=942.50) 1268.31 [M+3Na$^+$]/3 (calc=1268.48), 1920.45 [M+2Na$^+$]/2 (calc=1920.45).

Ligand IPr.HBr 6:

Calixarene 3 (3 g, 1.24 mmol), diisopropylimidazole (4.24 g, 18.57 mmol) and sodium bromide (12.65 g, 124 mmol) were placed in a reactor under argon. 30 ml of anhydrous DMF was added. 3 vacuum/argon were performed, and the mixture was heated at 80° C. for 4 days. Dichloromethane (20 ml) was added and the mixture was filtered through celite. The solution was evaporated to dryness and the white solid obtained was solubilized in a minimum of dichloromethane. The product was precipitated with diethyl ether (80 ml), filtered, rinsed with ether and the cake was dried in vacuo. 4.62 g of white product was obtained (yield: 81%). $^1$H NMR (DMSO-d6, ppm): 9.87 (s, 8H), 8.21 (s, 8H), 8.12 (s, 8H), 7.61 (t, 8H), 7.42 (d, 16H), 7.02 (s, 40H), 6.52 (s, 16H), 4.56 (s, 16H), 4.42 (s, 16H), 3.79 to 3.87 (m, 32H), 2.19 (quintet, 16H), 2.07 (s, 16H), 1.71 (s, 16H), 1.08 (s, 96H). m/z (ESI, positive mode): 1071.29 [M−3Br]$^{3+}$/3 (calc=1071.03), 1455.03 [M−3Br]$^{3+}$/3 (calc=1454.68).

Example 4: Preparation of the Salen Ligands

Intermediate 14:

Calixarene 3 (10 g, 4.13 mmol) and sodium azide NaN$_3$ (6.8 g, 103 mmol) were introduced in a reactor. The mixture was dried under vacuum for 30 min and anhydrous DMF (50 ml) was added under argon, and three vacuum/argon cycles were applied to inert the medium. The solution was stirred at 65° C. for 30 h and allowed to cool to room temperature. A saturated NaCl solution was added to precipitate the product which was then filtered. The white solid obtained was washed several times with water, methanol and finally with pentane, dried under vacuum to give 8.8 g of a white powder (yield: 86%). $^1$H NMR (CDCl$_3$, ppm): 7.17 (s, 40H), 6.55 (s, 16H), 4.67 (s, 16H), 3.95 (s, 16H), 3.62 to 3.65 (m, 16H), 3.20 to 3.17 (m, 16H), 1.69 (bs, 32H). $^{13}$C NMR (CDCl$_3$, ppm): 154.7; 148.9; 137.0; 134.8; 128.3; 127.7; 127.5; 114.9; 72.9; 69.7; 51, 2; 30.2; 27.4; 25.8. m/z (ESI, positive mode): 2496.1626 [M+Na$^+$] (calc=2496.1710).

Intermediate 15:

Calixarene 14 (1.21 g, 0.49 mmol) and the alkyne A (0.894 g, 4.42 mmol) were placed in a reactor under an argon atmosphere and dichloromethane (15 ml) was added. An aqueous solution (15 ml) of copper sulphate pentahydrate $CuSO_4.5H_2O$ (0.11 g, 0.442 mmol) and sodium ascorbate (0.167 g, 0.88 mmol) was added to the reactor. The biphasic solution was stirred at room temperature under argon for 24 h. Dichloromethane (20 ml) was added and the biphasic solution was washed with a saturated solution of sodium bicarbonate $NaHCO_3$ (35 ml). The aqueous phase was extracted 3 times with dichloromethane (30 ml). The organic phase was dried over magnesium sulphate and evaporated. The solid obtained was solubilized in a minimum amount of dichloromethane, precipitated with ether, filtered and dried under vacuum. 5 g of a yellow solid was obtained (yield=75%). $^1H$ NMR (DMSO-$d_6$, ppm): 11.74 (s, 8H), 9.85 (s, 8H), 8.37 (s, 8H), 7.86 (s, 8H), 7.89 (s, 8H), 7.02 (s, 40H), 6.45 (s, 16H), 4.58 (bs, 16H), 4.27 (bs, 16H), 3.85 (bs, 16H), 3.55 (bs, 16H), 1, 91 (bs, 16H), 1.55 (bs, 16H), 1.30 (s, 72H). $^{13}C$ NMR (DMSO-$d_6$, ppm): 197.2; 158.4; 152.9; 147.5; 144.4; 136.7; 135.7; 133.5; 129.5; 127.4; 127.0; 126.4; 126.3; 121,3; 119.6; 119.5; 113.5; 71.3; 68.0; 48.3; 33.4; 27.8; 27.7; 25.6; 25.5. m/z (MALDI, DCTB matrix): 4223.01 [M+Cs$^+$] (calc=4222.88). Elemental analysis: C=72.7% (calc=72.3%), H=6.5% (calc=6.6%), N=8.2% (calc=7.7%), 0=12.5% (calc=11. 5%).

Ligand 16:

In a reactor under argon was charged the ammonium monochloride of cyclohexanediamine C (0.366 g, 2.43 mmol), 3,5-di-tert-butyl-2-hydroxybenzaldehyde B (0.569 g, 2.43 mmol) and 3 A molecular sieves (1 g), followed by anhydrous methanol (20 ml). The reaction was stirred at room temperature for 4 h and then a solution of calixarene 15 (1.1 g, 0.27 mmol) in anhydrous dichloromethane (30 ml) was added under argon. Triethylamine (0.965 ml, 7.02 mmol) was added under argon and the mixture was stirred for 16 h at room temperature. The solution was filtered through celite and evaporated. The solid obtained was washed with methanol and with ethanol. The yellow solid was dissolved in a minimum of diethyl ether and precipitated with ethanol. The solid was filtered and dried under vacuum to give 1.4 g of a yellow solid (yield: 79%). $^1H$ NMR (CDCl$_3$, ppm): 14.12 (s, 8H), 13.58 (s, 8H), 8.28 (s, 8H), 8.19 (s, 8H), 7.68 (s, 8H), 7.61 (s, 8H), 7.43 (s, 8H), 7.03 to 6.95 (m, 40H), 6.46 (s, 16H), 4.55 (bs, 16H), 4.13 (bs, 16H), 3.86 (bs, 16H), 3.54 (bs, 16H), 3.24 (bs, 16H), 1.79-1.88 (m, 48H), 1.79 (m, 48H, 1.38 (s, 72H), 1.36 (s, 72H), 1.20 (s, 72H) $^{13}C$ NMR (CDCl$_3$, ppm): 166.0; 165.3; 160.7; 158.0; 154.9; 149.0; 147.6; 140.1; 137, 9; 136.9; 136.5; 134.9; 128.4; 127.8; 127.6; 127.1; 127.0; 126.1; 120.7; 119.0; 118 8; 117.9; 115.2; 72.9; 72.6; 71.9; 69.9; 50.1; 35.1; 35.0; 34.13; 33.2; 33.1; 31.5; 30.3; 29.5; 29.4; 27.3; 24.3 m/z (MALDI, DCTB matrix.): 6724 [m+Cs$^+$] (calc=6721) Elemental analysis: C=75.7% (calc=74.5%), H=7.9% (calc=7.9%), N=8.3% (calc=8.5%), O=7.9% (calc=7.7%). [a]$_D^{20}$=+105.34 (c=0.002 M in CHCl$_3$).

Example 5: Preparation of the Catalysts

Preparation of Rhodium Catalyst 7:

Calixarene 3 (3.28 g, 0.9 mmol) and chloro(1,5-cyclooctadiene)rhodium(I) dimer (1.87 g, 3.8 mmol) were introduced in a reactor and dried in vacuo. Under argon was added 30 ml of anhydrous dichloromethane and the reaction medium was placed for 2 hours at room temperature. The mixture was filtered on filter paper and dichloromethane was evaporated. The residue was dissolved in a minimum amount of dichloromethane and precipitated with diethyl ether. 4.05 g of a yellow-orange powder was obtained (yield: 80%). $^1H$ NMR (CD$_2$Cl$_2$, ppm): 7.64 (m, 4H), 7.32 (m, 48H), 7.01 (s, 40), 6.56 (s, 16H), 5, 41 (s, 16H), 4.48 (s, 16H), 3.97 (s, 16H), 3.79 (s, 16H), 3.05 (s, 16H), 1.66-2.5 (m, 14H). $^{31}P$ NMR (CD$_2$Cl$_2$, ppm): 26.26 (d, J$_{P-Rh}$=148.9 Hz). Elemental analysis: C=62.38% (calc=62.36%), H=5.47% (calc=5.71%).

Preparation of Palladium Catalyst 8:

Calixarene 5 (3 g, 0.79 mmol), potassium carbonate (3 g, 21.7 mmol, dried under vacuum with heat for 30 min) and palladium chloride (1.5 g, 8.5 mmol) were introduced in a reactor. The mixture was dried under vacuum for 30 min and then 25 ml of 3-chloropyridine was added under argon. 3 vacuum/argon cycles were performed, and the mixture was heated with stirring at 100° C. for 48 h. The solution was diluted with 60 ml of dichloromethane and was centrifuged, the solid byproducts were separated by filtration and the dichloromethane and a portion of the chloropyridine were evaporated. Then, the complex was precipitated with diethyl ether. A white-brown solid was obtained, which was filtered and washed with diethyl ether. After drying in vacuo 3.61 g of product was obtained (yield: 78%). $^1H$ NMR (DMSO, ppm): 8.63 (s, 8H), 8.56 (d, 8H), 7.97 (d, 8H), 7.49 (s, 8H), 7.33 (s, 16H), 7.25 (s, 8H), 7.01 (s, 8H), 6.97 (s, 40H). Elemental analysis: C=55.2% (calc=56.5%), H=4.6% (calc=4.6%), N=5.6% (calc=5.7%).

Preparation of Palladium Catalyst 8':

Calixarene 5 (0.5 g, 0.13 mmol), potassium carbonate (0.72 g, 5.2 mmol, dried under heat and vacuum for 30 min), potassium iodide (0.863 g, 5.2 mmol, dried under heat and vacuum for 30 min) and palladium iodide (0.443 g, 1.23 mmol). Drying was performed for 30 min under vacuum and 5 ml of pyridine was added under argon. 3 vacuum/argon cycles were performed, and the mixture was heated with stirring at 100° C. for 48 h. The solution was diluted with 20 ml of dichloromethane and centrifuged. The solid byproducts were separated by filtration and the dichloromethane and pyridine was evaporated. The product was dissolved in a minimum amount of dichloromethane, and the complex was precipitated with diethyl ether, filtered and rinsed with diethyl ether. After drying under vacuum, 0.655 g of a yellow solid was obtained (yield: 71%). $^1H$ NMR (DMSO-$d_6$, ppm): 8.46 (d, J=4.3 Hz, 16H), 7.72 (m, 8H), 7.47 (s, 8H), 7.27 (s, 8H), 7.20-7.23 (m, 24H), 6.97 to 7.03 (m, 56H), (s, 40H), 6.54 (bs, 16H), 4.57 (bs, 32H), 3.98 (bs, 16H), 3.86 (bs, 16H), 2.28 (s, 24H), 2.19 (s, 48H), 1.79 (s, 16H). Elemental analysis: C=46.89% (calc=47.13%), H=4.03% (calc=4.18%) N=4.63% (calc=4.71%).

Preparation of Palladium Catalyst 8":

Calixarene 5 (0.5 g, 0.13 mmol), potassium carbonate (0.72 g, 5.2 mmol, dried under heat and for 30 min), potassium bromide (0.619 g, 5.2 mmol, dried under heat and vacuum for 30 min) and palladium bromide (0.33 g, 1.23 mmol) were introduced in a reactor. Drying was performed for 30 min under vacuum and 5 ml of pyridine was added under argon. 3 vacuum/argon cycles were performed, and the mixture was heated with stirring at 100° C. for 48 h. The solution was diluted with 20 ml of dichloromethane and centrifuged. The solid byproducts were separated by filtration the dichloromethane and pyridine were evaporated. The product was dissolved in a minimum amount of dichloromethane, and the complex was precipitated with diethyl ether, filtered and rinsed with diethyl ether. After drying in vacuo 0.431 g of a yellow solid was obtained (yield: 52%). $^1H$ NMR (DMSO-$d_6$, ppm): 8.51 (s, 16H), 7.77 (s, 8H), 6.98 to 7.24 (m, 88H), 6.53 (s, 16H), 4.63 (bs, 32H), 3.92 (bs, 32H), 2.28 (s, 24H), 2.13 (s, 48H), 1.91 (s, 16H).

Preparation of Palladium Catalyst 9:

Calixarene 6 (0.3 g, 6.5·10$^{-2}$ mmol), potassium carbonate (0.36 g, 2.6 mmol, dried under heat and vacuum for 30 min) and palladium bromide (0.15 g, 0.55 mmol) were introduced in a reactor. Drying was performed for 30 min under vacuum and 5 ml of pyridine was added under argon. 3 vacuum/argon cycles were performed, and the mixture was heated with stirring at 100° C. for 48 h. The solution was diluted with 20 ml of dichloromethane and centrifuged. The solid byproducts were separated by filtration the dichloromethane and pyridine were evaporated. The product was dissolved in a minimum amount of dichloromethane, and the complex was precipitated with diethyl ether, filtered and rinsed with diethyl ether. After drying in vacuo 0.35 g of a yellow solid was obtained (yield: 79%). $^1$H NMR (DMSO-d$_6$, ppm): 8.51 (s, 32H), 7.76 (s, 8H), 7.47 (s, 24H), 7.28-7.32 (m, 40H), 7.04 (s, 40H), 6.54 (s, 16H), 4.57 to 4.66 (m, 32H), 3.93 (s, 32H), 2.83 (s, 16H), 2.34 (s, 16H), 1.84 (s, 16H), 1.24 (s, 48H), 0.91 (s, 48H). Elemental analysis: C=54.46% (calc=54.27%), H=4.78% (calc=5.00%) N=5.19% (calc=5.27%).

Preparation of the Palladium Catalyst 13:

Potassium carbonate (586 mg, 4.24 mmol) was introduced in a reactor and dried with heating under vacuum. Palladium chloride (261 mg, 1.47 mmol), calixarene 12 (500 mg, 0.14 mmol) and 3-chloropyridine (3 ml) were added at room temperature. Three vacuum-argon cycles were carried out and the mixture was heated for 36 h at 100° C. The medium was diluted with dichloromethane (10 ml), centrifuged and filtered. The solvents were evaporated, and the product was dissolved in a minimum of dichloromethane. The product was precipitated with diethyl ether/pentane and filtered. After drying, 469 mg of product was obtained (60% yield). $^1$H NMR (DMSO-d$_6$, ppm): 8.65 (s, 8H), 8.57 (s, 8H), 8.01 (s, 8H), 7.54 (s, 8H), 7.40 (s, 8H), 7.31 (s, 8H), 6.97 (s, 16H), 6.91 (s, 16H), 4.68 (s, 16H), 4.00 (s, 16H), 3.80 (s, 16H), 2.28 (s, 40H), 2.08 (s, 48H), 1.81 (s, 16H), 0.96 (s, 72H). Elemental analysis: C=55.54% (calc=55.43%) H=5.70% (calc=5.52%) N=5.65% (calc=6.06%).

Preparation of the Cobalt Catalyst 17:

In a reactor under argon, were introduced calixarene 16 (0.5 g, 0.075 mmol) and dichloromethane (10 ml) and the mixture was stirred until completely dissolved. A solution of Co(OAc)$_2$·3H$_2$O (0.187 g, 0.75 mmol) in anhydrous methanol (6 ml) was added to the solution of calixarene 16 under argon. The reaction was allowed to stir for 4 h at room temperature. The mixture was cooled to 0° C. followed by addition of para-toluenesulfonic acid (0.143 g, 0.75 mmol) and additional 5 ml of dichloromethane was added. The reaction was placed under 1 atm of pure oxygen and stirred at room temperature for 16 h. The solution was evaporated and the solid was washed several times with methanol and dried under vacuum. A green solid was obtained 0.534 g (yield=84%). $^1$H NMR (DMSO-d$_6$, ppm): 8.37 (s, 8H); 8.03 (s, 8H); 7.91 (s, 8H); 7.81-7.83 (m, 16H); 7.46-7.48 (m, 32H); 7.03-7.08 (m, 56H); 6.54 (bs, 16H); 4.64 (bs, 16H); 4.51 (bs, 16H); 3.92 (bs, 8H); 3.61 (s, 24H); 3.05 (s, 16H); 2.25 (s, 24H); 1.89-1.94 (m, 48H), 1.73-1.74 (m, 144H), 1.46-1.56 (m, 48H), 1.30 (s, 72H). $^{13}$C NMR (DMSO-D$_6$, ppm): 165.2; 164.7; 164.6; 162.2; 154.4; 147.0; 146.4; 143.4; 142.1; 137.9; 137.2; 136.5; 130.8; 129.7; 129.4; 129.0; 128.4; 127.8; 125.9; 119.7; 119.0; 117.6; 69.8; 69.4; 49.7; 49.0; 36.2; 36.1; 34.0; 31, 9; 30.8; 30.6; 29.8; 27.2; 24.7; 21:1. Elemental analysis calculated for calixarene 17+5CH$_2$Cl$_2$: C=64.3% (calc=64.8%), H=6.5% (calc=6.5%), N=6.6% (calc=6.3%), S=2.3% (calc=2.9%). [α]D$^{20}$=+1020.4° (c=8·10$^{-5}$ M in DMF).

Example 6: Use of the Palladium Catalysts for the Suzuki Coupling Reaction

Example 6.1: Coupling Between Bromotoluene and Phenylboronic Acid

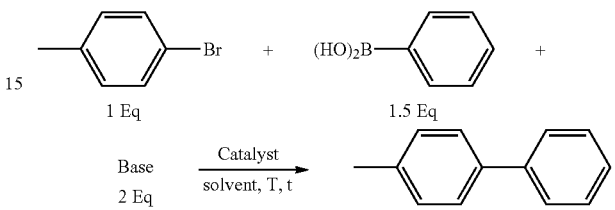

Standard protocol: Catalyst 8 (7.4 mg, 1·10$^{-5}$ mol, 1 mol %), phenylboronic acid (182.9 mg, 1.5·10$^{-3}$ mol, 1.5 eq) and potassium phosphate tribasic (424.5 mg, 2·10$^{-3}$ mol, 2 eq) were introduced in a reactor. The mixture was dried under vacuum for 10 min and bromotoluene (171 mg, 1·10$^{-3}$ mol, 1 eq) was added. The medium is placed under argon and anhydrous ethanol (2 ml) was added. 3 vacuum/argon cycles were carried out and the mixture heated with stirring at 40° C. for 2 h. The reaction was monitored by gas chromatography. When coupling dihalogenated substrates, the number of equivalents of boronic acid and base was modified/In the case of 1,2-dibromobenzene: 3 eq of base and boronic acid; in the case of 1,9-dibromoanthracene and 1,2-dichlobenzene: 3 eq of base, 2.5 eq of boronic acid.

The results of the Suzuki coupling with the catalysts 8 and 9, with respect to the temperature and loading of the catalyst are presented in Tables 1 and 1'.

The results of the Suzuki coupling with the catalysts 8 and 9, with respect to the solvent, are presented in Table 2.

The results of the Suzuki coupling with the catalysts 8 and 9, with respect to the base are shown in Table 3.

The results of the Suzuki coupling, with respect to the catalyst are presented in Tables 4 and 4'.

The results of the Suzuki coupling reactions, with respect to the concentration of reagents, are presented in Table 5.

TABLE 1

Temperature and catalyst loading. K$_3$PO$_4$, 0.5M in bromotoluene, 1 5 eq in boronic acid, ethanol, 2 h.

| T (° C.) | Pd (mol %) | Catalyst | Conversion (%) | Yield (%) |
|---|---|---|---|---|
| 27 | 0.1 | 8 | 98 | 90 |
|  |  | 9 | 91 (95/6 h) | 86 |
|  | 0.05 | 8 | 92 (99/22 h) | 81 |
|  | 0.01 | 8 | 70 (93/22) |  |
|  | 0.05 | 8 | 97 | 85 |
|  |  | 9 | 93 (97/23 h) | 84 |
| 40 | 0.01 | 8 | 91 (96/23 h) | 87 |
|  |  | 9 | 89 (95/23 h) | 82 |
|  | 0.005 | 8 | 81 (92/23 h) |  |
| 80 | 0.005 | 8 | 92 | 84 |
|  |  | 9 | 97 | 91 |
|  | 0.001 | 8 | 93 | 71 |
|  |  | 9 | 91 | 72 |

TABLE 1' temperature and catalyst loading. K₃PO₄, 0.25M in bromotoluene, isopropanol, catalyst 8, 23 h.

| T (° C.) | Pd (mol %) | Conversion (%) |
|---|---|---|
| 27 | 0.5 | 93 |
| 40 | 2 | 100 |
|  | 0.5 | 100 |
|  | 0.1 | 100 |
|  | 0.05 | 100 |
|  | 0.01 | 95 |
| 80 | 0.01 | 96 |
|  | 0.005 | 98 |
|  | 0.0025 | 74 |

TABLE 2

Nature of the solvent. K₃PO₄ 0.25M in bromotoluene, Pd = 0.5 mol %, 27° C., 2 h.

| Solvent | Conversion catalyst 8 (%) | Conversion catalyst 9 (%) |
|---|---|---|
| MeOH | 71 (76/6h) | 73 (81/6 h) |
| EtOH | 98 | 99 |
| EtOH anh | 99 |  |
| EtOH-H₂O 7/1 | 92 (99/6 h) |  |
| iPrOH | 74 (99/22 h) | 53 (91/22 h) |
| PrOH | 97 (99/4 h) | 95 (99/6 h) |
| t-BuOH | 6 (84/22 h) | 2 (66/22 h) |
| BuOH | 94 (100/6 h) | 95 (99/6 h) |
| Acetonitrile | 0 | 0 |
| DMF | 0 | 0 |
| DMF-H₂O 7/1 | 67 (99/23 h) |  |
| THF | 0 | 0 |
| THF-H₂O 7/1 | 10 (17/6 h) |  |
| Toluene | 22 (32/23 h) | 12 (26/23 h) |
| Toluene-H₂O 7/1 | 72 (90/22 h) |  |

TABLE 3

Nature of the base. Bromotoluene 0.25M in ethanol, Pd = 0.5 mol %, 27° C.

| Catalyst | Base | Conversion (%) t = 2 h | t = 23 h |
|---|---|---|---|
| 8 | K₃PO₄ | 98 |  |
|  | K₂CO₃ | 67 | 92 |
|  | AcONa | 15 | 29 |
|  | KOH | 53 | 64 |
| 9 | K₃PO₄ | 99 |  |
|  | K₂CO₃ | 59 | 95 |
|  | Bu₄N⁺OH⁻ | 3 | 64 |
|  | AcONa | 14 | 26 |
|  | KOH | 53 | 60 |

TABLE 4

Nature of the catalyst. Conditions 1: K₃PO₄, 0.5M in bromotoluene, ethanol, Pd = 0.005 mol %, 80° C., 2 h. Conditions 2: K₃PO₄ 0.25M in bromotoluene, ethanol, Pd = 0.5 mol %, 27° C., 2 h.

| Catalyst | Conditions 1, conversion (%) | Conditions 2, conversion (%) |
|---|---|---|
| 8 | 92 | 98 |
| 8' | 40 |  |
| 9 | 97 | 99 |
| 13 | 85 | 98 |

TABLE 4'

Nature of the catalyst. K₃PO₄, 0.25M in bromotoluene, isopropanol, Pd = 0.5 mol %, temperature, 23 h.

| Catalyst | T (° C.) | Pd mol % | Conversion (%) |
|---|---|---|---|
| 8 | 27 | 0.5 | 99 |
| 9 | 27 | 0.5 | 91 |
| 8 | 40 | 0.1 | 100 |
| 13 | 40 | 0.1 | 88 |

TABLE 5

Concentration of the mixture. K₃PO₄, ethanol, Pd = 0.5 mol %, catalyst 8, 27° C., 2 h.

| CSubstrate (M) | Conversion (%) |
|---|---|
| 0.125 | 93 (98/23 h) |
| 0.25 | 98 |
| 0.5 | 99 |

Example 6.2: Suzuki Coupling Between Various Brominated Substrates and Various Boronic Acids $$Ar_1\text{—}Br + (HO)_2B\text{—}Ar_2 \xrightarrow[\text{Catalyst, T, 2 h}]{\text{EtOH, K}_3\text{PO}_4} Ar_1\text{—}Ar_2$$

1 eq    1,5 eq

The results are presented in Table 6 below.

TABLE 6

Conversion, selectivity and yield of the Suzuki coupling reaction between various brominated substrates and boronic acids. K₃PO₄, ethanol, 2h.

| Halogen Ar₁—Br | Boronic acid (HO)₂B—Ar₂ | T (° C.) | Pd (mol %) | Cata. | C_Substrate (M) | Conversion (%) | Selectivite (%) | Isolated yield (%) |
|---|---|---|---|---|---|---|---|---|
| 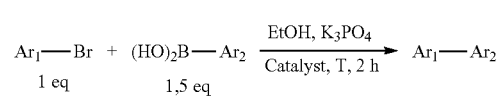 | (HO)₂B—⌬ | 27 | 0.05 | 8 | 0.25 | 100 |  |  |
|  |  |  | 0.01 | 8 | 0.25 | 74 |  |  |
|  |  |  |  | 9 | 0.25 | (100/5 h) 37 (100/23 h) |  |  |

TABLE 6-continued

Conversion, selectivity and yield of the Suzuki coupling reaction between various brominated substrates and boronic acids. $K_3PO_4$, ethanol, 2h.

| Halogen $Ar_1$—Br | Boronic acid $(HO)_2B$—$Ar_2$ | T (° C.) | Pd (mol %) | Cata. | $C_{Substrate}$ (M) | Conversion (%) | Selectivite (%) | Isolated yield (%) |
|---|---|---|---|---|---|---|---|---|
| 4-NC-C₆H₄-Br | (HO)₂B-C₆H₅ | 40 | 0.01 | 8 | 0.25 | 100 | 100 | 100 |
|  |  | 27 | 0.05 | 8 | 0.5 | 90 |  |  |
|  |  | 40 | 0.01 | 8 | 0.5 | (100/4 h) 81 (98/23 h) | 100 (100) |  |
| 4-H₂N-C₆H₄-Br | (HO)₂B-C₆H₅ | 80 | 0.01 | 8 | 0.5 | 100 | 100 |  |
|  |  |  |  | 9 | 0.5 | 100 | 99 |  |
| 2-CN-C₆H₄-Br | (HO)₂B-C₆H₅ | 80 | 0.1 | 8 | 0.5 | 100 |  |  |
| 4-MeO-C₆H₄-Br | (HO)₂B-C₆H₅ | 80 | 0.05 | 8 | 0.5 | 97 | 96 |  |
| 2-MeO-C₆H₄-Br | (HO)₂B-C₆H₅ | 80 | 1 | 8 | 0.5 | 94 | 97 |  |
|  |  |  |  | 9 | 0.5 | 98 | 98 |  |
| 2-Me-C₆H₄-Br | (HO)₂B-C₆H₅ | 80 | 1 | 8 | 0.5 | 99 | 100 |  |
|  |  |  |  | 9 | 0.5 | 100 | 100 |  |
| 3-HO-C₆H₄-Br | (HO)₂B-C₆H₅ | 80 | 0.5 | 9 | 0.5 | 90 | 100 |  |
| 2-Br-pyridine | (HO)₂B-C₆H₅ | 80 | 2 | 8 | 0.5 | 89 | 85 |  |
|  |  |  |  | 9 | 0.5 | 95 | 91 |  |
| 3-Br-pyridine | (HO)₂B-C₆H₅ | 80 | 2 | 8 | 0.5 | 100 | 99 |  |
| 2-Cl-C₆H₄-Br | (HO)₂B-C₆H₅ | 80 | 0.5 | 9 | 0.5 | 100 | 99 |  |
| 1,2-Br₂-C₆H₄ | (HO)₂B-C₆H₅ | 80 | 2 | 8 | 0.5 | 98 | 88 |  |
|  |  |  |  | 9 | 0.5 | 100 | 100 |  |
| 2-CHO-C₆H₄-Br | (HO)₂B-C₆H₅ | 80 | 0.5 | 9 | 0.5 | 100 | 100 |  |

TABLE 6-continued

Conversion, selectivity and yield of the Suzuki coupling reaction between various brominated substrates and boronic acids. $K_3PO_4$, ethanol, 2h.

| Halogen Ar₁—Br | Boronic acid (HO)₂B—Ar₂ | T (° C.) | Pd (mol %) | Cata. | $C_{Substrate}$ (M) | Conversion (%) | Selectivite (%) | Isolated yield (%) |
|---|---|---|---|---|---|---|---|---|
| 4-bromobenzaldehyde | phenylboronic acid | 80 | 0.05 | 8 | 0.5 | 100 | 100 | |
| 2-bromo-1,3-dimethylbenzene | phenylboronic acid | 80 | 2 | 9 | 0.5 | 100 | 98 | |
| 2-bromo-1,3-diisopropylbenzene | phenylboronic acid | 80 | 2 | 9 | 0.5 | 60 | 51 | |
| bromopentamethylbenzene | phenylboronic acid | 80 | 2 | 8 | 0.5 | 51 | 89 | |
| | | | | 9 | 0.5 | 74 | 89 | |
| 1-bromo-2-methoxynaphthalene | phenylboronic acid | 80 | 1 | 9 | 0.5 | 100 | 95 | 95 |
| 1-bromo-2-hydroxynaphthalene | phenylboronic acid | 80 | 2 | 9 | 0.5 | 73 | | |
| 1-bromo-4-fluoronaphthalene | phenylboronic acid | 80 | 0.01 | 8 | 0.5 | 98 | 100 | |
| 4-bromo-1-naphthoic acid | phenylboronic acid | 80 | 0.05 | 8 | 0.5 | 100 | | |

TABLE 6-continued

Conversion, selectivity and yield of the Suzuki coupling reaction between various brominated substrates and boronic acids. $K_3PO_4$, ethanol, 2h.

| Halogen Ar₁—Br | Boronic acid (HO)₂B—Ar₂ | T (° C.) | Pd (mol %) | Cata. | $C_{Substrate}$ (M) | Conversion (%) | Selectivite (%) | Isolated yield (%) |
|---|---|---|---|---|---|---|---|---|
| 9-bromoanthracene | phenylboronic acid | 80 | 0.01 | 9 | 0.25 | 97 | 94 | |
| 9,10-dibromoanthracene | phenylboronic acid | 80 | 0.2 | 8 | 0.25 | 17 | | |
| | | | | 9 | 0.25 | 99 | 95 | |
| 4-bromotoluene | 3,5-bis(trifluoromethyl)phenylboronic acid | 80 | 0.5 | 8 | 0.5 | 98 | 99 | |
| 4-bromotoluene | quinolin-8-ylboronic acid | 80 | 2 | 8 | 0.5 | 97 | 98 | |
| 4-bromotoluene | 1,3-phenylenebis(pinacol boronate) | 80 | 0.5 | 8 | 0.5 | 100 | 85 | |
| 2-bromobenzonitrile | 4-methylphenylboronic acid | 80 | 0.1 | 8 | 0.5 | 100 | 95 | 95 |
| ethyl 2-bromobenzoate | 4-(trifluoromethyl)phenylboronic acid | 80 | 1 | 8 | 0.5 | 19 (90/96 h) | 91 (98) | |

Example 6.3: Suzuki Coupling Between Various Chlorinated Substrates and Phenylboronic Acid

The results are presented in Table 7 below.

TABLE 7

Conversion and selectivity of the Suzuki coupling reaction between various chlorinated substrates and phenylboronic acid. $K_3PO_4$, solvent, temperature, 2 h.

| Halogen | T (° C.) | Pd (mol %) | Cat. | Base | Solvent | $C_{Substrate}$ (1 eq) (M) | Conversion (%) | Selectivity (%) |
|---|---|---|---|---|---|---|---|---|
| 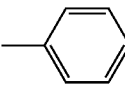 | 80 | 2 | 8 | $K_3PO_4$ | EtOH | 0.5 | 57 | 74 |
|  |  | 2 | 9 | $K_3PO_4$ | EtOH | 0.5 | 43 | 83 |
|  | 100 |  | 8 | $K_3PO_4$ | BuOH | 0.5 | 44 |  |
|  |  |  |  | $Cs_2CO_3$ | $DMF/H_2O$ 70/30 | 0.25 | 70 (93/23 h) |  |
|  |  |  |  | $Cs_2CO_3$ | $NMP/H_2O$ 70/30 | 0.25 | 49 (76/24 h) |  |
| 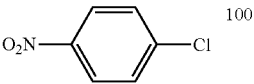 | 100 | 0.5 | 8 | $K_3PO_4$ | BuOH | 0.5 | 99 |  |
|  | 100 | 1 | 8 | $K_3PO_4$ | BuOH | 0.5 | 54 |  |
| 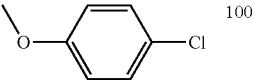 | 100 | 1 | 8 | $K_3PO_4$ | BuOH | 0.25 | 23 |  |
| 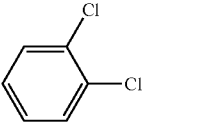 | 80 | 2 | 9 | $K_3PO_4$ | EtOH | 0.5 | 63 | 68M, 32 D |
|  |  | 1 | 9 | $K_3PO_4$ | EtOH | 0.5 | 50 | 77M, 24 D |
| 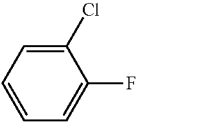 | 80 | 2 | 8 | $K_3PO_4$ | EtOH | 0.5 | 47 | 95 |

Example 6.4: Studies on the Residual Palladium Content in the Products Obtained from the Suzuki Coupling All glassware used was subsequently washed with nitric acid and rinsed with ultrapure water. Suzuki couplings were performed according to the protocol presented in Example 6.1, starting from 1 mmol. After 2 h of reaction, the reaction medium was cooled and left for 30 min at room temperature without stirring. The medium was then filtered on grade 5 filter paper and the cake was rinsed with ethanol. The filtrate was condensed under vacuum and diethyl ether or ethyl acetate (10 ml) was added followed by water. The aqueous phase was then extracted with 3×10 ml of diethyl ether or ethyl acetate. After combining, drying and condensing under vacuum of the organic phases, the product was evaporated under vacuum at 200° C. for one hour. The residue was mineralized in a flask fitted with a reflux condenser by adding 4 ml of concentrated nitric acid which was brought at reflux with stirring for 1 hour until a clear and homogeneous solution was obtained. The solution was then analyzed by ICP-MS. A metal content, expressed in milligrams of palladium per kilogram of product derived from the Suzuki coupling, was obtained.

The results obtained as a function of the catalyst loading are presented in Tables 8 and 8':

TABLE 8

Residual palladium content in the products obtained from the Suzuki coupling.
K₃PO₄ 0.5M substrate, ethanol, 80° C., 2 h.

| Substrate Ar₁—Br | Boronic acid (HO)₂B—Ar₂ | Pd (mol %) | Catalyst | Conversion (%) | $[Pd]_{product}$ (ppm) | Palladium non-leached (%) |
|---|---|---|---|---|---|---|
| 4-bromotoluene | phenylboronic acid | 0.5 | 8 | 100 | 10.6 | 99.7 |
|  |  |  | 9 | 100 | 50.8 | 98.6 |
|  |  |  | 13 | 100 | 161.6 | 95.4 |
| 4-bromotoluene | 3,5-bis(trifluoromethyl)phenylboronic acid | 0.5 | 8 | 100 | 66.3 | 98.1 |
| 3-bromopyridine | phenylboronic acid | 2 | 8 | 100 | 78.7 | 99.4 |
| 4-bromo-1-naphthoic acid | phenylboronic acid | 0.05 | 8 | 100 | 13.4 | 97.2 |
| 1-bromo-2-methoxynaphthalene | phenylboronic acid | 1 | 9 | 100 | 31.5 | 99.6 |

TABLE 8'

Residual palladium content in the products obtained from the Suzuki coupling. K₃PO₄, 0.25M bromotoluene, 1.5 eq phenylboronic acid, imidazoleanol, catalyst 8, 40° C., 23 h.

| Pd (mol %) | ppm (mg · kg⁻¹) |
|---|---|
| 1 | 10.8 |
| 0.5 | 7.2 |
| 0.1 | 7.9 |
| 0.05 | 4.4 |

Example 7.1: Use of the Rhodium Catalyst in a Hydrogenation Reaction

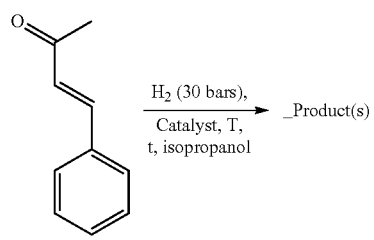

Standard Protocol:

Calixarene 7 (3.36 mg, 5.5·10⁻⁷ mol, 0.3 mol %), benzylideneacetone (214.3 mg, 1.467·10⁻³ mol) and isopropanol (10 ml) were introduced in an autoclave. The reactor was placed under dihydrogen atmosphere by performing two compression (10 bar)/decompression cycles and injecting 30 bars. The medium was stirred at room temperature and its composition was analyzed with gas chromatography coupled to electrospray mass spectrometry. The results are shown in the Table 9 below.

TABLE 9

Use of the rhodium catalyst 7 for the hydrogenation reaction.
Solvent: isopropanol

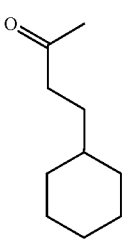

| Catalyst loading | T | t | Conversion | | | | |
|---|---|---|---|---|---|---|---|
| 1% | 100° C. | 2 h | 100% | 88.6% | | 11.4% | |
| 0.05% | 100° C. | 2 h | 60% | 3.7% | | 3% | 52.6% |
| 1.5% | TA | 22 h | 100% | 1.2% | | 2.3% | 96.5% |
| 0.3% | TA | 22 h | 18% | | | | |
| | | 72 h | 100% | 5.6% | | 2.5% | 92.1% |

Example 7.2: Use of the Palladium Catalysts in the Heck Coupling

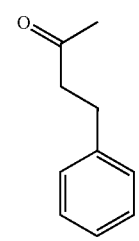

Standard protocol: Catalyst 8 (7.4 mg, 1.25·10⁻³, mmol) and potassium phosphate tribasic (424 mg, 2 mmol) were introduced in a reactor and dried under vacuum for 10 min. Bromobenzene (105 μl, 1 mmol), butyl acrylate (213 μl, 1.5 mmol) and anhydrous dimethylformamide (4 ml) were added under an argon atmosphere. 3 vacuum/argon cycles were performed, and the mixture was stirred at 100° C. for 18 h, giving 57% conversion.

The results are presented in the following table 10:

TABLE 10

Conversions obtained in the Heck coupling. K₃PO₄, 0.25M of butyl acrylate, 2 h.

| Substrate | T (° C.) | Pd (mol %) | Catalyst | Solvent | Conversion (%) |
|---|---|---|---|---|---|
| 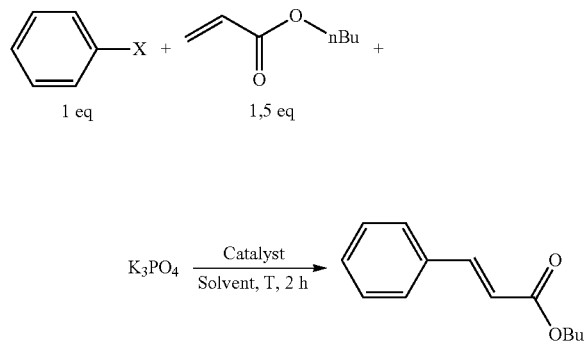 | 100 | 1 | 8 | DMF | 57 (18 h) |
| | 130 | 1 | 9 | DMF | 6 (13/18 h) |
| | | 2 | 8 | NMP | 62 (22 h) |
| | | | 9 | DMF | 62 (22 h) |
| | | | 8 | DMF | 86 (24 h) |
| | | | | DMF | 56 (18 h) |
| 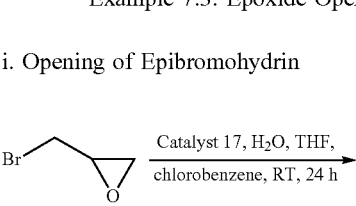 | 80 | 1 | 9 | DMF | 92 (100/4 h) |
| | 100 | 1 | 8 | DMF | 100 |
| | | | 9 | DMF | 100 |

Example 7.3: Epoxide Opening Reaction i. Opening of Epibromohydrin

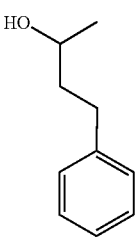

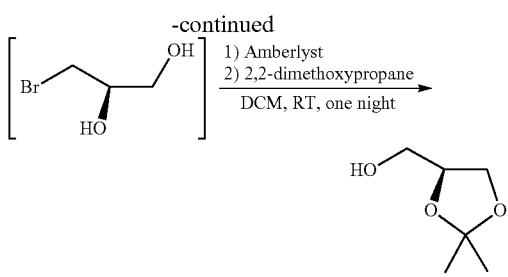

Catalyst 17 (32 mg, 0.034 mmol, 2 mol %), epibromohydrin (0.141 ml. 1.7 mmol), chlorobenzene (0.05 ml, 0.5 mmol) and 0.197 ml of THF were introduced in a reactor. Water (0.044 ml, 2.5 mmol) was added with stirring. The reaction was allowed to stir for 24 h at room temperature and 5 ml of dichloromethane, Amberlyst 15 (16 mg) and 2,2-dimethoxypropane (0.418 ml, 3.4 mmol) were added. Stirring was continued for 18 h at room temperature. The reaction was monitored by gas chromatography: the use of an achiral column provides access to the conversion and that of a chiral column to the enantiomeric excess (ee). After a first catalytic reaction, the catalyst 17 was precipitated with diethyl ether, filtered and reengaged in a new catalytic reaction with a new batch of products and solvents. The catalyst 17 was thus evaluated through three catalytic cycles.

The results are presented in Table 11 below.

TABLE 11

Conversion and enantiomeric excesses obtained in the epoxide opening reaction

| | Catalyst loading (mol %) | Conversion (%) | e.e. (%) |
|---|---|---|---|
| Cycle 1 | 2 | 100 | 94 |
| Cycle 2 | 2 | 100 | 94 |
| Cycle 3 | 2 | 43 | 94 |

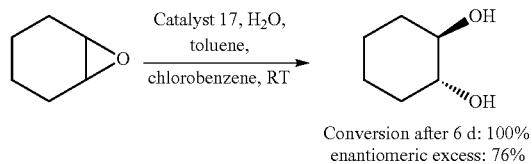 [SMILES: C1CCC2OC2C1 ; O[C@@H]1CCCC[C@H]1O]

Conversion after 6 d: 100%
enantiomeric excess: 76%

Catalyst 17 (17 mg, 0.020 mmol, 2 mol %), cyclohexene oxide (0.100 ml. 0.99 mmol), chlorobenzene (0.025 ml. 0.25 mmol) and 0.210 ml of toluene were introduced in a reactor. Water (0.021 ml, 1.18 mmol) was added with stirring. The reaction was allowed to stir for 6 days at room temperature. The reaction was monitored by gas chromatography: using an achiral column provides access to the conversion and using a chiral column to enantiomeric excess. 100% conversion was obtained after 6 days, with an enantiomeric excess of 76%.

Example 7.4: Residual Content of Cobalt in the Product Resulting from the Opening of Epibromohydrin At the end of the reaction, the dichloromethane solution was evaporated, and the product was extracted with ether. The suspension was filtered through filter paper and the filtrate was evaporated under reduced pressure. The residue obtained was evaporated under vacuum at 200° C. for 1 h, 4 ml of concentrated nitric acid was added which was brought to reflux with stirring for 1 h until a clear and homogeneous solution was obtained. The solution was then analyzed by ICP-MS. A metal content expressed in milligrams of cobalt per kilogram of product resulting from the opening of epibromohydrin was obtained.

The result obtained is shown in Table 12:

TABLE 12

Residual cobalt content in the reaction product.

| Substrate $Ar_1$—Br | Co (mol %) | Conversion (%) | $[Co]_{Prod.}$ (ppm) |
|---|---|---|---|
| Br—⟨epoxide⟩ | 1 | 100 | 1.2 |

Example 7.5: Residual Rhodium Content in the Products of the Hydrogenation Reaction At the end of the reaction, the reaction medium was left for 30 min at room temperature, filtered, and a mineralization protocol and analysis identical to that described in the example 5.4 was used.

TABLE 13

Residual rhodium content in the hydrogenation reaction products.

| Substrate | Rh (mol %) | T (° C.) | t (h) | Conv. (%) | $[Rh]_{Prod.}$ (ppm) |
|---|---|---|---|---|---|
| cinnamaldehyde | 0.3 | RT | 49 | 98.3 | 6.2 |
| cinnamaldehyde | 0.05 | 100 | 3 | 100 | 2.4 |

Example 8: General Procedure for the Synthesis of Catalysts 18, 22, 23, 24 and 25

Prepared according to a slightly modified synthetic procedure described in the literature (C. M. Zinser, F. Nahra, M. Brill, R. E. Meadows, D. B. Cordes, A. M. Z. Slawin, S. P. Nolan and C. S. J. Cazin, Chem. Commun. 2017, 53, 7990)

In a Schlenk tube equipped with a magnetic stirring bar and a septum were introduced the supported imidazolium precursor (20a, 20b, 21a, 21b or the precursor of Cat 18, 1 equiv.), palladium (π-cinnamyl) chloride dimer (4.25 equiv.) and potassium carbonate (10 equiv.). The solids were dried under vacuum for 5 minutes, then the Schlenk tube was evacuated and backfilled with argon 3 times. Anhydrous acetone was then added under argon and the reaction mixture was stirred for 5 hours at 60° C. The mixture was allowed to cool under argon and the solvent was evaporated. DCM was added, the mixture was centrifuged (20 min, 20° C., 9000 rpm). The supernatant was then filtered on a Dicalite™ pad, and the pad was washed with DCM. The solvent was evaporated, then the residue was dissolved in a minimum of DCM and precipitated by a dropwise addition at room temperature in a flask containing diethyl ether, under vigorous stirring. The heterogeneous solution was stirred under argon 15 min at room temperature, then 15 min at 0° C. In the case of Cat 18, Cat 22 and Cat 23, the product precipitated as a fine powder, which was filtered on a fritted glass filter, washed 3 times with diethyl ether and dried under vacuum overnight. In the case of Cat 24 and Cat 25, the product precipitated as a sticky residue which stayed on the sides of the flask. The supernatant was slowly removed, and the sticky residue was washed 2 times with diethyl ether, each time removing the supernatant slowly while keeping the sticky solid inside the flask. The solid was then dried under vacuum overnight. In each of the two cases, the procedure allowed to obtain the expected product as a pure solid in good yield.

Example 8.1: Procedure for the Synthesis of Cat 18

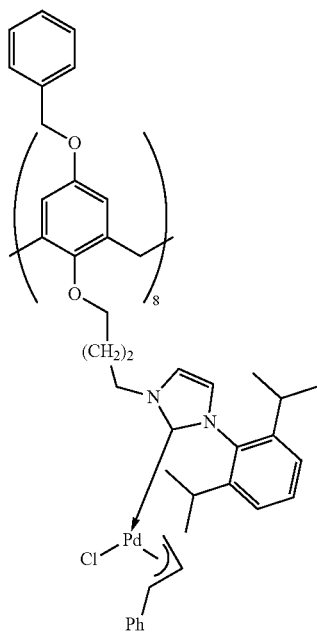

Cat 18

This compound was synthesised according to the general procedure described above in example 8, using the corresponding imidazolium chloride (795 mg, 0.187 mmol), palladium (π-cinnamyl) chloride dimer (412 mg, 0.795 mmol), potassium carbonate (258 mg, 1.87 mmol) and 6 mL of anhydrous acetone. The product was precipitated using 2 mL DCM in 150 mL of diethyl ether. Cat 18 was obtained as a yellow solid in 56% yield (630 mg).

$^1$H NMR (360 MHz; DMSO-d$_6$): δ for one repeating unit: 7.66-7.34 (m, 5H), 7.34-7.21 (m, 3H), 7.21-7.01 (m, 6H), 7.01-6.92 (m, 3H), 6.55 (br. s, 2H), 5.35-5.20 (m, 1H), 4.53 (br. s, 2H), 4.44-4.28 (m, 3H), 3.92 (br. s, 2H), 3.82 (br. s, 2H), 2.61 (br. s, 2H), 2.01 (br. s, 2H), 1.68 (br. s, 2H), 1.14 (d, J=6.8 Hz, 6H), 0.96 (d, J=6.8 Hz, 6H).

$^{13}$C NMR (90 MHz; DMSO-d$_6$): δ for one repeating unit: 179.0, 154.2, 148.1, 145.7 (2C), 138.1, 136.7, 136.0, 135.0, 129.6 (2C), 128.7, 128.1, 128.0 (2C), 127.4, 127.2, 127.1 (2C), 126.3, 124.8, 123.4 (2C), 121.8, 114.1 (2C), 112.9, 108.9, 89.5, 73.1, 68.8, 49.6, 44.8, 29.4, 27.7 (2C), 26.9, 26.4, 25.7 (2C), 22.6 (2C).

XPS: Calculated (%) for $C_{336}Cl_8N_{16}Pd_8$. C: 91.3; Cl: 2.2; N: 4.3; Pd: 2.2. Found (%): C: 90.5; Cl: 2.1; N: 4.6; Pd: 2.6. Only residual traces of bromide anions were detected (less than 0.2%).

IR (ATR-GE): ū (cm$^{-1}$)=2977, 2940, 2879, 1719, 1642, 1602, 1462, 1415, 1389, 1389, 1254, 1212, 1147, 1059, 1031, 980, 940, 854, 803, 761.

Example 8.2: Procedure for the Synthesis of Imidazolium Iodides 20a and 20b

In a three-necked round bottom flask equipped with a magnetic stirring bar, a reflux condenser and an argon inlet were introduced compound 19a (12 equiv.), 3 (1 equiv.), sodium iodide (32 equiv.) and potassium carbonate (32 equiv.). The solids were dried under vacuum for 5 minutes, then the flask was evacuated and backfilled with argon 3 times. Distilled acetonitrile (C=0.02 M) was added under argon and the reaction mixture was stirred for 5 days at 80° C. The mixture was allowed to cool to room temperature under argon, then DCM was added, and the suspension was filtered on a Dicalite™ pad and washed with DCM. The filtrate was evaporated, and the resulting residue was dissolved in a minimum of DCM and precipitated in diethyl ether at room temperature under vigorous stirring. The heterogeneous solution was then stirred under argon for 15 minutes at room temperature, then for 15 minutes at 0° C. The solid was then filtered on a fritted glass filter, washed 3 times with diethyl ether and dried under vacuum overnight. The resulting yellow powder was dissolved in a minimum of DCM and precipitated in ethyl acetate following the procedure described above, to ensure an important removal of the impurities. This time the product precipitated as a sticky residue which stayed on the sides of the flask. The supernatant was slowly removed, and the sticky residue was washed 2 times with ethyl acetate and 2 times with diethyl ether, each time removing the supernatant slowly while keeping the sticky solid inside the flask. The solid was then dried under vacuum for 1 hour, then dissolved in a minimum of DCM and precipitated in diethyl ether following the procedure described previously, in order to obtain the product in a powdery form. This powder was filtered over a fritted glass filter, washed 3 times with diethyl ether and dried under vacuum overnight, to afford the expected product as a pure solid.

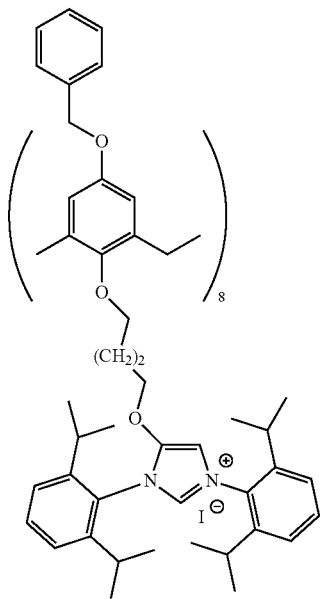

20a

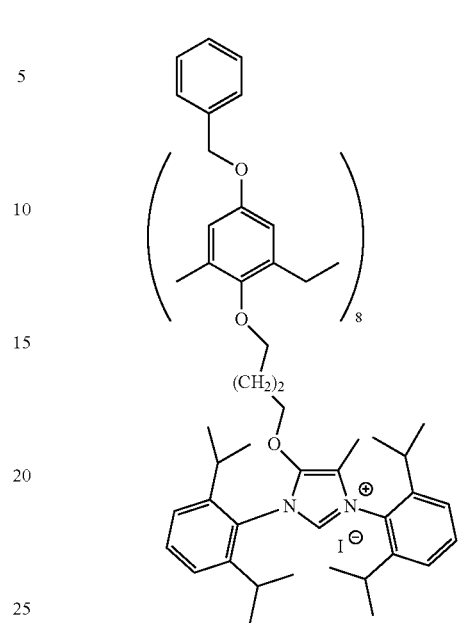

20b

This compound was synthesised according to the general procedure described above in example 8.2, using potassium carbonate (132.1 mmol, 18.26 g), sodium iodide (132.1 mmol, 19.8 g), 3 (4.13 mmol, 10 g), 19a (49.5 mmol, 24.05 g) and 200 mL of distilled acetonitrile. The product was precipitated using 50 mL of DCM, and 600 mL of diethyl ether or 700 mL of ethyl acetate for each precipitation described in the general procedure, respectively. The target compound 20a was obtained as a light yellow solid in 86% yield (22.7 g).

$^1$H NMR (400 MHz; 60° C.; DMSO-$d_6$): δ for one repeating unit: 9.79 (s, 1H), 8.09 (s, 1H), 7.69 (dd, J=6.4 Hz and 6.4 Hz, 1H), 7.53-7.46 (m, 3H), 7.39-7.33 (m, 2H), 7.03-6.86 (m, 5H), 6.41 (s, 2H), 4.48 (br. s, 2H), 4.33-4.21 (m, 2H), 3.71 (br. s, 2H), 3.66-3.54 (m, 2H), 2.49-2.35 (m, 4H), 1.86-1.75 (m, 2H), 1.73-1.60 (m, 2H), 1.28 (d, J=7.1 Hz, 6H), 1.19 (d, J=7.1 Hz, 6H), 1.15 (d, J=7.1 Hz, 6H), 1.13 (d, J=7.1 Hz, 6H).

$^{13}$C NMR (100 MHz, DMSO-$d_6$): δ for one repeating unit: 154.0, 147.9, 147.5, 145.2 (2C), 144.7 (2C), 136.8, 134.8 (2C), 133.2, 131.9, 130.4, 128.1, 127.9 (2C), 127.3, 127.0 (2C), 126.1, 124.6 (2C), 124.5 (2C), 114.2 (2C), 103.3, 73.7, 73.1, 68.6, 29.2, 28.8 (2C), 28.5 (2C), 26.0, 24.9, 24.3 (2C), 23.8 (2C), 23.2 (2C), 22.7 (2C).

HRMS [ESI(+)]: m/z [M−4I]$^{+4}$/4 calculated for [$C_{360}H_{440}I_4N_{16}O_{24}$]$^{+4}$/4: 1469.7465, found: 1469.7407.

IR (ATR-GE): ū (cm$^{-1}$)=2966, 2931, 2872, 1617, 1543, 1463, 1387, 1330, 1308, 1279, 1213, 1199, 1145, 1048, 945, 857, 803, 754, 698, 667, 646, 606.

This compound was synthesised according to the general procedure described above in example 8.2, using potassium carbonate (58.9 mmol, 8.12 g), sodium iodide (58.9 mmol, 8.81 g), 3 (1.84 mmol, 4.45 g), 19b (22 mmol, 11 g) and 90 mL of distilled acetonitrile. The product was precipitated using 20 mL of DCM, and 200 mL of diethyl ether or 200 mL of ethyl acetate for each precipitation described in the general procedure, respectively. The target compound 20b was obtained as a beige solid in 92% yield (11.0 g).

$^1$H NMR (400 MHz; 40° C.; DMSO-$d_6$): δ for one repeating unit: 9.80 (s, 1H), 7.71 (dd, J=8.1 Hz and 8.1 Hz, 1H), 7.58-7.53 (m, 2H), 7.48 (dd, J=8.1 Hz and 8.1 Hz, 1H), 7.40-7.32 (m, 2H), 7.13-6.82 (m, 5H), 6.43 (br. s, 2H), 4.50 (br. s, 2H), 4.33-4.16 (m, 2H), 3.70 (br. s, 2H), 3.64-3.45 (m, 2H), 2.48-2.41 (m, 2H), 2.40-2.33 (m, 2H), 2.07 (s, 3H), 1.76-1.64 (m, 2H), 1.63-1.51 (m, 2H), 1.25 (d, J=6.5 Hz, 6H), 1.19 (d, J=6.5 Hz, 6H), 1.14 (d, J=6.5 Hz, 6H), 1.10 (d, J=6.5 Hz, 6H).

$^{13}$C NMR (100 MHz, DMSO-$d_6$): δ for one repeating unit: 154.0, 147.9, 145.3 (2C), 145.2 (2C), 142.7, 136.7, 134.9 (2C), 132.2, 132.1, 131.9, 128.1, 127.9 (2C), 127.7, 127.3, 127.1, 126.5, 125.0 (2C), 124.5 (2C), 115.1 (2C), 114.2, 75.7, 73.0, 68.7, 29.3, 28.6 (2C), 28.4 (2C), 26.0, 25.9, 24.7 (2C), 24.6 (2C), 22.7 (2C), 22.5 (2C), 7.8.

HRMS [ESI(+)]: m/z [M−4I]$^{+4}$/4 calculated for [$C_{368}H_{456}I_4N_{16}O_{24}$]$^{+4}$/4: 1497.7778, found: 1497.7834.

IR (ATR-GE): ū (cm$^{-1}$)=2964, 2929, 2871, 1639, 1598, 1537, 1462, 1387, 1367, 1329, 1211, 1143, 1048, 1030, 993, 940, 859, 805, 741, 698.

Example 8.3: Procedure for the Synthesis of Cat 22 and Cat 24

Cat 22

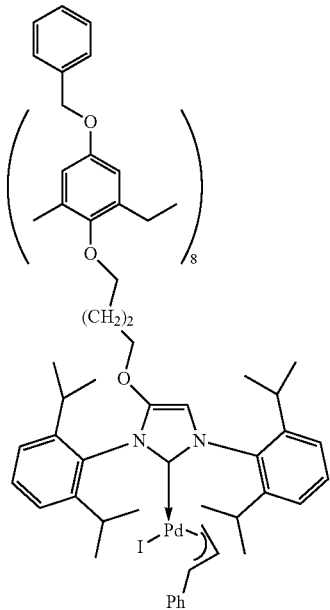

Cat 24

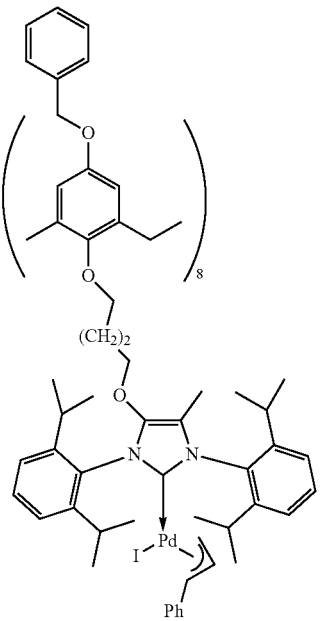

This compound was synthesised according to the general procedure described above in example 8, using 20a (0.047 mmol, 300 mg), palladium (π-cinnamyl) chloride dimer (0.2 mmol, 103.5 mg), potassium carbonate (0.47 mmol, 65 mg) and 2.5 mL of anhydrous acetone. The product was precipitated using 1 mL of DCM in 50 mL of diethyl ether. Cat 22 was obtained as a yellow solid in 84% yield (321 mg).

$^1$H NMR (400 MHz; 40° C.; CDCl$_3$): δ for one repeating unit: 7.42 (dd, J=7.9 Hz and 7.9 Hz, 1H), 7.34 (dd, J=7.9 Hz and 7.9 Hz, 1H), 7.25-7.24 (m, 1H), 7.23-7.12 (m, 5H), 7.11-7.03 (m, 3H), 7.02-6.91 (m, 2H), 6.90-6.76 (m, 3H), 6.43 (br. s, 1H), 6.38 (br. s, 2H), 5.19-5.03 (m, 1H), 4.38 (br. s, 2H), 4.18 (d, J=11.5 Hz, 1H), 3.93-3.82 (m, 2H), 3.72 (br. s, 2H), 3.64-3.50 (m, 2H), 3.47 (d, J=7.4 Hz, 1H), 3.37-3.28 (m, 1H), 3.27-3.21 (m, 1H), 3.20-3.11 (m, 1H), 2.99-2.86 (m, 1H), 1.88 (d, J=11.5 Hz, 1H), 1.83-1.72 (m, 2H), 1.71-1.53 (m, 2H), 1.43-1.28 (m, 12H), 1.18-1.03 (m, 12H).

$^{13}$C NMR (400 MHz; CDCl$_3$): δ for one repeating unit: 180.9, 154.9, 149.9, 148.2, 147.2, 147.0, 145.9, 145.8, 138.6, 136.9, 136.6, 135.2 (2C), 132.7, 130.1, 129.9, 129.2, 128.3, 128.2, 128.1, 127.8, 127.6, 127.5, 127.4, 127.3, 126.8, 124.3, 124.1, 123.9, 123.8, 115.0 (2C), 108.5, 102.2, 87.8, 73.5, 71.5, 69.5, 53.1, 29.7, 28.8 (2C), 26.9 (2C), 26.3, 25.8 (2C), 25.4, 25.3, 23.8 (2C), 23.6, 23.3 (2C).

XPS: Calculated (%) for C$_{432}$I$_8$N$_{16}$Pd$_8$. C: 93.1; I: 1.72; N: 3.45; Pd: 1.72. Found (%): C: 92; I: 2; N: 3; Pd: 2.

IR (ATR-GE): ū (cm$^{-1}$)=2964, 2931, 2869, 1631, 1598, 1462, 1384, 1362, 1315, 1204, 1143, 1049, 956, 858, 802, 755, 696, 663.

This compound was synthesised according to the general procedure described above in example 8, using 20b (0.0925 mmol, 602 mg), palladium (π-cinnamyl) chloride dimer (0.393 mmol, 203.7 mg), potassium carbonate (0.925 mmol, 127.9 mg) and 3.7 mL of anhydrous acetone. The product was precipitated using 0.3 mL of DCM in 200 mL of diethyl ether. Cat 24 was obtained as an orange solid in 73% yield (560 mg).

$^1$H NMR (400 MHz; 55° C.; CDCl$_3$): δ for one repeating unit: 7.46 (dd, J=8.1 Hz and 8.1 Hz, 1H), 7.33-7.27 (m, 3H), 7.20-7.14 (m, 4H), 7.13-7.06 (m, 3H), 7.02-6.91 (m, 2H), 7.90-6.74 (m, 3H), 6.44 (br. s, 2H), 5.17-5.06 (m, 1H), 4.36 (br. s, 2H), 4.23 (d, J=12.4 Hz, 1H), 3.91-3.82 (m, 2H), 3.75 (br. s, 2H), 3.67-3.52 (m, 2H), 3.28-2.84 (m, 5H), 1.98 (br. s, 3H), 1.80-1.64 (m, 3H), 1.63-1.52 (m, 2H), 1.40 (d, J=7.4 Hz, 6H), 1.38 (d, J=7.4 Hz, 6H), 1.16 (d, J=7.4 Hz, 6H), 1.14 (d, J=7.4 Hz, 6H).

$^{13}$C NMR (400 MHz; CDCl$_3$): δ for one repeating unit: 178.5, 155.0, 148.3, 146.7 (4C), 145.9, 138.5, 137.0, 135.4 (2C), 135.1, 133.0, 130.1, 129.7, 128.9, 128.6, 128.4, 128.3, 128.1 (2C), 128.0 (2C), 127.6, 127.5, 127.4, 126.8, 124.6, 124.3, 114.9 (2C), 114.1, 108.1, 88.9, 74.5, 73.9, 69.5, 53.0, 29.9, 28.7 (2C), 28.4 (2C), 26.8 (2C), 25.3 (4C), 25.1 (2C), 24.9 (2C), 10.5.

IR (ATR-GE): ū (cm$^{-1}$)=2969, 2932, 2871, 1663, 1599, 1460, 1382, 1363, 1306, 1206, 1143, 1049, 996, 959, 853, 806, 750, 695.

Example 8.4: Procedure for the Synthesis of Imidazolium Chlorides 21a and 21b In a one-necked round bottom flask, NMe$_4$Cl (650 equiv.) was dissolved in MeOH (C[NMe$_4$Cl]=2.5 M) using manual stirring. Compound 20a or 20b (1 equiv., C=3.8·10$^{-3}$ M) was then added to the homogeneous solution, leading to the precipitation of a solid. The solvent was concentrated under reduced pressure at 40° C. until dryness. Then a limpid solution of NMe$_4$Cl (650 equiv.) dissolved in MeOH (C[NMe$_4$Cl]=2.5 M) was added to the residual solid, and the heterogeneous solution was concentrated under reduced pressure at 40° C. until dryness. Chloroform was then added to dissolve the product, and the ammonium salts were filtered on a Dicalite™ pad and washed with chloroform. The filtrate was concentrated under reduced pressure, and chloroform was added to the residue. After a second filtration on a Dicalite™ pad (washed with chloroform), the filtrate was transferred into an extraction funnel, and cold water was added. The organic layer was collected, and the aqueous phase was extracted two times with chloroform. The combined organic layers were washed with cold water, dried over $MgSO_4$ and filtered over a Dicalite™ pad (washed with chloroform) to obtain efficient removal of $MgSO_4$ salts. The solvent was evaporated, then the residue was dissolved in a minimum of DCM and precipitated by a dropwise addition at room temperature in a flask containing diethyl ether, under vigorous stirring. The heterogeneous solution was stirred under argon 15 min at room temperature, then 15 min at 0° C. The solid was then filtered on a fritted glass filter, washed 3 times with diethyl ether and finally dried under vacuum overnight, to afford the desired product as a pure powder.

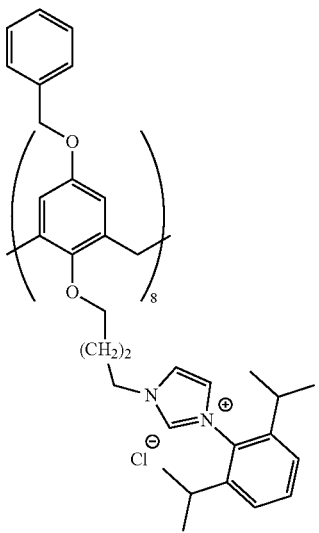

This compound was synthesised according to the general procedure described above in example 8.2, using the corresponding imidazolium bromide (Prepared following a procedure described in the following I. Abdellah, et al., *Dalton Trans.* 2018, 47, 13843) (1 equiv., 0.217 mmol, 1.00 g), $NMe_4Cl$ (650 equiv., 141 mol, 15.47 g) and 57 mL of MeOH ($C=3.8 \cdot 10^{-3}$ M). The residue was washed with 75 mL of cold water and extracted with 3×70 mL of chloroform, then combined organic layers were washed with 75 mL of cold water. The product was precipitated using 4 mL of DCM in 200 mL of diethyl ether. The expected product, precursor of Cat 18, was obtained as an off-white solid in 90% yield (833 mg).

$^1$H NMR (300 MHz; DMSO-$d_6$): δ for one repeating unit: 10.22 (s, 1H), 8.30 (br. s, 1H), 8.11 (s, 1H), 7.61 (dd, J=7.8 Hz and 7.8 Hz, 1H), 7.41 (d, J=7.5 Hz, 2H), 7.04 (br. s, 5H), 6.50 (br. s, 2H), 4.59 (br. s, 2H), 4.45 (br. s, 2H), 3.90 (br. s, 2H), 3.78 (br. s, 2H), 2.19 (quint, J=6.9 Hz, 2H), 2.07 (br. s, 2H), 1.69 (br. s, 2H), 1.08 (d, J=6.9 Hz, 6H), 1.05 (d, J=6.9 Hz, 6H).

$^{13}$C NMR (75 MHz; DMSO-$d_6$): δ for one repeating unit: 154.1, 148.2, 144.9 (2C), 138.0, 136.7, 134.9, 131.4 (2C), 130.4, 128.0 (2C), 127.4, 127.3 (2C), 125.0, 124.3 (2C), 123.3, 114.3 (2C), 72.7, 68.8, 48.8, 29.4, 28.1 (2C), 26.2, 26.1, 23.8 (2C), 23.4 (2C).

HRMS [ESI(+)]: m/z [M−6Cl]$^{+6}$/6 calculated for $[C_{264}H_{312}Cl_2N_{16}O_{16}]^{+6}$/6: 672.0573, found: 672.0601.

IR (ATR-GE): ū ($cm^{-1}$)=2966, 2933, 2871, 2362, 2337, 1596, 1542, 1459, 1386, 1315, 1198, 1144, 1048, 958, 758.

21a

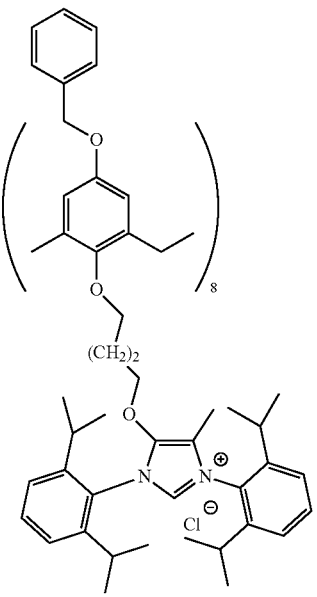

This compound was synthesised according to the general procedure described above in example 8.2, using 20a (1 equiv., 1.7 mmol, 10.92 g), $NMe_4Cl$ (650 equiv., 1.11 mol, 121.73 g) and 450 mL of MeOH ($C=3.8 \cdot 10^{-3}$ M). The residue was washed with 600 mL of cold water and extracted with 3×400 mL of chloroform, then combined organic layers were washed with 600 mL of cold water. The organic residue was precipitated using 30 mL of DCM in 320 mL of diethyl ether. The target compound 21a was obtained as an off-white solid in 87% yield (8.44 g).

$^1$H NMR (400 MHz, 40° C., DMSO-$d_6$): δ for one repeating unit: 9.92 (br. s, 1H), 8.16 (br. s, 1H), 7.68 (dd, J=7.6 Hz and 7.6 Hz, 1H), 7.54-7.47 (m, 3H), 7.38-7.31 (m, 2H), 7.08-6.84 (m, 5H), 6.40 (s, 2H), 4.48 (br. s, 2H), 4.36-4.21 (m, 2H), 3.01 (br. s, 2H), 3.65-3.48 (m, 2H), 2.49-2.43 (m, 2H), 2.42-2.35 (m, 2H), 1.81-1.71 (m, 2H), 1.70-1.56 (m, 2H), 1.26 (d, J=6.7 Hz, 6H), 1.17 (d, J=6.7 Hz, 6H), 1.14 (d, J=6.7 Hz, 6H), 1.12 (d, J=6.7 Hz, 6H).

$^{13}$C NMR (100 MHz, DMSO-$d_6$): δ for one repeating unit: 154.0, 147.9, 147.5, 145.2 (2C), 144.7 (2C), 136.8, 134.8 (2C), 133.4, 131.9, 130.5, 128.1, 127.9 (2C), 127.3, 127.1, 127.0, 126.1, 124.6 (2C), 124.5 (2C), 114.2 (2C), 103.5, 73.7, 73.0, 68.6, 29.2, 28.8 (2C), 28.6 (2C), 26.0, 24.9, 24.3 (2C), 23.8 (2C), 23.2 (2C), 22.7 (2C).

HRMS [ESI(+)]: m/z [M−3Cl]$^{+3}$/3 calculated for $[C_{360}H_{440}Cl_5N_{16}O_{24}]^{+3}$/3: 1848.7376, found: 1848.7913.

IR (ATR-GE): ū ($cm^{-1}$)=2965, 2930, 2870, 1617, 1542, 1462, 1387, 1367, 1330, 1308, 1256, 1049, 959, 861, 803, 754, 697.

XPS: Calculated (%) for $C_{360}Cl_8N_{16}O_{24}$: C: 88.2; Cl: 1.96; N: 3.92; O: 5.88. Found (%): C: 87; Cl: 2; N: 4; O: 7. Only residual traces of iodide anions were detected (less than 0.1%).

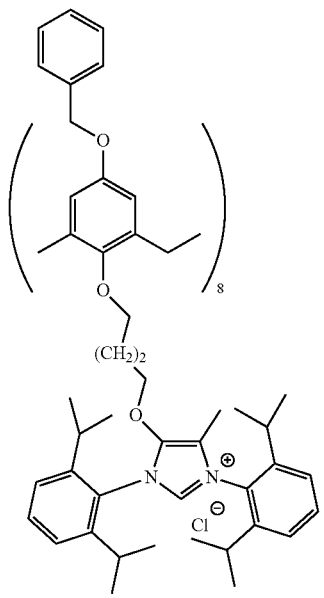

21b

This compound was synthesised according to the general procedure described above in example 8.2, using 20b (1 equiv., 1.57 mmol, 10.17 g), NMe$_4$Cl (650 equiv., 1.02 mol, 111.41 g) and 410 mL of MeOH (C=3.8·10$^{-3}$ M). The residue was washed with 600 mL of cold water and extracted with 3×400 mL of chloroform, then combined organic layers were washed with 600 mL of cold water. The organic residue was precipitated using 30 mL of DCM in 320 mL of diethyl ether. The target compound 21b was obtained as a beige solid in 80% yield (7.21 g).

$^1$H NMR (400 MHz; DMSO-d$_6$): δ for one repeating unit: 9.94 (br. s, 1H), 7.71 (dd, J=8.4 Hz and 8.4 Hz, 1H), 7.59-7.52 (m, 2H), 7.47 (dd, J=8.4 Hz and 8.4 Hz, 1H), 7.39-7.31 (m, 2H), 7.11-6.80 (m, 5H), 6.44 (br. s, 2H), 4.50 (br. s, 2H), 4.32-4.11 (m, 2H), 3.68 (br. s, 2H), 3.64-3.46 (m, 2H), 2.47-2.39 (m, 2H), 2.38-2.30 (m, 2H), 2.05 (s, 3H), 1.71-1.62 (m, 2H), 1.60-1.48 (m, 2H), 1.25 (d, J=6.5 Hz, 6H), 1.19 (d, J=6.5 Hz, 6H), 1.14 (d, J=6.5 Hz, 6H), 1.10 (d, J=6.5 Hz, 6H).

$^{13}$C NMR (100 MHz, DMSO-d$_6$): δ for one repeating unit: 154.1, 148.0, 145.3 (4C), 142.7, 136.7, 134.8 (2C), 132.3, 132.2, 131.8, 128.2, 127.9 (2C), 127.7, 127.3, 127.1, 126.5, 125.0 (2C), 124.4 (2C), 115.2 (2C), 114.2, 75.7, 73.0, 68.7, 29.4, 28.6 (2C), 28.5 (2C), 26.0, 25.9, 24.7 (2C), 24.6 (2C), 22.6 (2C), 22.4 (2C), 7.7.

HRMS [ESI(+)]: m/z [M−5Cl]$^{+5}$/5 calculated for [C$_{368}$H$_{456}$Cl$_3$N$_{16}$O$_{24}$·]$^{+5}$/5: 1118.6820, found: 1118.6866.

IR (ATR-GE): 2966, 2931, 2871, 1639, 1598, 1536, 1462, 1330, 1300, 1257, 1214, 1143, 1049, 1030, 941, 858, 805, 744, 698.

Example 8.5: Procedure for the Synthesis of Cat 23 and Cat 25

Cat 23

This compound was synthesised according to the general procedure described in part II, using 21a (0.143 mmol, 810 mg), palladium (π-cinnamyl) chloride dimer (0.608 mmol, 315.2 mg), potassium carbonate (1.43 mmol, 197.8 mg) and 5.7 mL of anhydrous acetone. The product was precipitated using 1.6 mL of DCM in 150 mL of diethyl ether. Cat 23 was obtained as a yellow solid in 74% yield (790 mg).

$^1$H NMR (400 MHz; 55° C.; CDCl$_3$): δ for one repeating unit: 7.42 (dd, J=8.1 Hz and 8.1 Hz, 1H), 7.33 (dd, J=8.1 Hz and 8.1 Hz, 1H), 7.28-7.27 (m, 1H), 7.25-7.24 (m, 1H), 7.21-7.18 (m, 2H), 7.15-7.09 (m, 5H), 6.98-6.91 (m, 2H), 6.90-6.81 (m, 3H), 6.49-6.31 (m, 3H), 5.08-4.98 (m, 1H), 4.37 (br. s, 2H), 4.31 (d, J=12.1 Hz, 1H), 3.91-3.83 (m, 2H), 3.71 (br. s, 2H), 3.61-3.46 (m, 2H), 3.20-3.09 (m, 2H), 3.08-2.85 (m, 3H), 1.87-1.70 (m, 3H), 1.68-1.58 (m, 2H), 1.37 (d, J=7.1 Hz, 6H), 1.35-1.31 (m, 6H), 1.13 (d, J=7.1 Hz, 6H), 1.08 (d, J=7.1 Hz, 6H).

$^{13}$C NMR (100 MHz, CDCl$_3$): δ for one repeating unit: 180.8, 154.9, 149.7, 148.2, 147.0 (2C), 146.0 (2C), 138.0, 137.0, 136.5, 135.2 (2C), 132.5, 130.1, 129.9, 128.7, 128.5, 128.3, 128.2, 127.9, 127.8, 127.6, 127.5, 127.3, 126.8, 124.0 (2C), 123.7 (2C), 114.9 (2C), 108.8, 101.7, 90.2, 73.5, 71.7, 69.5, 46.7, 29.8, 28.8 (2C), 28.7 (2C), 27.0, 26.8, 26.4 (2C), 26.0, 25.8, 25.2 (2C), 23.3 (2C).

XPS: Calculated (%) for C$_{432}$Cl$_8$N$_{16}$Pd$_8$. C: 93.1; Cl: 1.72; N: 3.45; Pd: 1.72. Found (%): C: 93.6; Cl: 1.5; N: 3; Pd: 1.6. Residual traces of iodide anions were detected (0.3%).

IR (ATR-GE): 2964, 2931, 2869, 1629, 1598, 1463, 1362, 1316, 1204, 1049, 1002, 957, 856, 802, 756, 696.

Cat 25

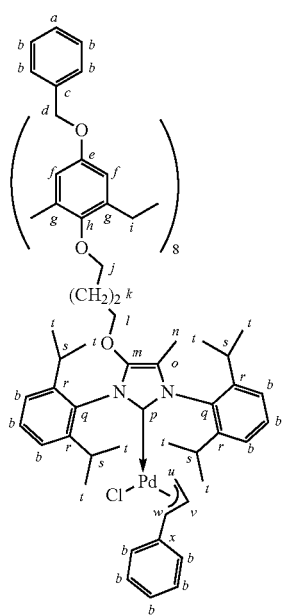

This compound was synthesised according to the general procedure described in part II, using 21b (1.2 mmol, 6.92 g), palladium (π-cinnamyl) chloride dimer (5.1 mmol, 2.64 g), potassium carbonate (12 mmol, 1.66 g) and 60 mL of anhydrous acetone. The product was precipitated using 0.5 mL of DCM in 200 mL of diethyl ether. Cat 25 was obtained as a yellow solid in 87% yield (7.9 g).

$^1$H NMR (360 MHz; CDCl$_3$): δ for one repeating unit: 7.46 (dd, J=7.6 Hz and 7.6 Hz, 1H$_a$), 7.33-7.27 (m, 3H$_b$), 7.20-7.09 (m, 7H$_b$), 7.02-6.72 (m, 5H$_b$), 6.43 (br. s, 2H$_f$), 5.14-5.01 (m, 1H$_v$), 4.50-4.21 (m, 3H$_{d+w}$), 3.85-3.77 (m, 2H$_l$), 3.73 (br. s, 2H$_i$), 3.67-3.50 (m, 2H$_j$), 3.11-2.77 (m, 5H$_{s+u}$), 1.94 (br. s, 3H$_n$), 1.81-1.55 (m, 5H$_{k+u}$), 1.38 (d, J=6.6 Hz, 6H$_t$), 1.35 (d, J=6.6 Hz, 6H$_t$), 1.20-1.07 (m, 12H$_t$).

$^{13}$C NMR (100 MHz, CDCl$_3$): δ for one repeating unit: 178.1 (C$_e$), 155.0 (C$_p$), 148.3 (C$_h$), 146.7 (4C$_r$), 145.4 (C$_m$), 137.8 (C$_x$), 136.9 (C$_e$), 135.4 ($^2$C$_g$), 134.9 (C$_q$), 132.8 (C$_q$), 130.1 (C$_a$), 129.7 (C$_b$), 128.6 (C$_b$), 128.4 (2C$_b$), 128.3 (C$_b$), 128.2 (C$_b$), 128.0 (C$_b$), 127.6 (2C$_b$), 127.5 (C$_b$), 127.4 (C$_b$), 126.9 (C$_b$), 126.8 (C$_b$), 124.3 (C$_b$), 124.1 (C$_b$), 114.9 (2C$_f$), 114.1 (C$_o$), 108.4 (C$_v$), 91.3 (C$_w$), 74.9 (C$_i$), 73.9 (C$_j$), 69.4 (C$_d$), 46.7 (C$_u$), 29.5 (C$_l$), 28.8 (2C$_s$), 28.5 (2C$_s$), 26.8 (2C$_k$), 25.2 (2C$_t$), 24.9 (4C$_t$), 24.4 (2C$_t$), 10.0 (C$_n$).

XPS: Calculated (%) for C$_{440}$Cl$_8$N$_{16}$Pd$_8$. C: 93.22; Cl: 1.69; N: 3.39; Pd: 1.69. Found (%): C: 93.1; Cl: 2; N: 3.1; Pd: 1.9. Only residual traces of iodide anions were detected (less than 0.1

IR (ATR-GE): ū (cm$^{-1}$)=2966, 2932, 2870, 1664, 1599, 1460, 1382, 1363, 1307, 1206, 1142, 1049, 1031, 960, 857, 806, 750, 695.

Example 9.1: Synthesis of "Top-Down" Supported Imidazolium Bromide (31a-TD)

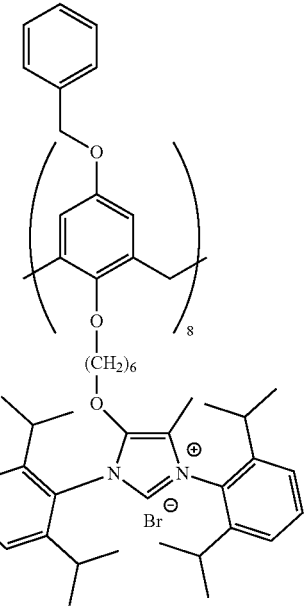

31a-TD

In a Schlenk-tube equipped with a magnetic stirring bar were introduced benzyloxycalix[8]arene 2 (1 equiv., 0.59 mmol, 1 g), the imidazolium salt 26 (9 equiv., 5.3 mmol, 3.44 g) and K$_2$CO$_3$ (9 equiv., 5.3 mmol, 0.732 g). The tube was flushed with three vacuum/argon cycles. Distilled acetonitrile (C=0.03 M, V=20 mL) was added under argon using a syringe. The reaction mixture was stirred for 18 h at 78° C. Evolution of the reaction was monitored by $^1$H NMR analysis of dried samples of the reaction mixture. At completion, the reaction was allowed to cool down to room temperature under argon, and the insoluble salts were removed by filtration on a Whatman® grade 5 filter paper. The solvent was evaporated, and the residue was dissolved in DCM and filtered on a Dicalite™ pad to ensure the removal of the salts. The Dicalite™ pad was then washed with DCM and the solvent was evaporated. The solid was then stirred under argon in ethyl acetate (30 mL) at 80° C. for 15 minutes to remove the excess of 26. The hot supernatant containing 26 was removed out of the flask, while the sticky residue remained on the sides of the flask. This residue was then stirred in diethyl ether (20 mL) to afford a beige solid, which was filtered on a Whatman® grade 5 filter paper and rinsed with diethyl ether (20 mL), to afford the product 31a-TD as a beige solid (3.1 g, 84% yield).

$^1$H NMR (400 MHz, DMSO-d$_6$): δ for one repeating unit: 10.00-9.64 (m, 1H), 8.18-7.95 (m, 1.5H), 7.82-7.61 (m, 2.5H), 7.58-6.96 (m, 14H), 6.93-6.04 (m, 3H), 5.17-4.52 (m, 3H), 4.38-3.67 (m, 5.5H), 2.48-2.10 (m, 6H), 1.78-1.42 (m, 5H), 1.35-0.8 (m, 45H). The integration is not in accordance with the one expected, which is probably due to the complexity of the $^1$H NMR analysis as mentioned in the article.

$^{13}$C NMR (100 MHz, DMSO-d$_6$): δ for one repeating unit: Compared to the "bottom-up" supported imidazolium salt 31a-BU, the overall spectrum displays more peaks than expected. 153.8 (1 peak expected for 1C, 5 peaks found), 147.6, 147.5, 145.3-144.6 (2 peaks expected for 4C, 3 peaks found), 136.7 (1 peak expected for 1C, 5 peaks found), 134.6 (1 peak expected for 2C, 3 peaks found), 133.1, 131.9 (1 peak expected for 1C, 5 peaks found), 130.4, 128.3, 128.2, 127.6, 127.5, 126.1 (1 peak expected for 1C, 3 peaks found), 125.1, 124.6, 114.3 (1 peak expected for 2C, 5 peaks found), 103.3 (1 peak expected for 1C, 3 peaks found), 73.7 (1 peak expected for 1C, 3 peaks found), 73.1 (1 peak expected for 1C, 2 peaks found), 68.8 (1 peak expected for 1C, 4 peaks found), 29.4, 28.8, 28.5, 28.0 (1 peak expected for 1C, 4 peaks found), 25.1 (1 peak expected for 1C, 3 peaks found), 24.8, 24.3, 23.8, 23.2, 22.7 (1 peak expected for 1C, 3 peaks found).

Synthesis of Alkylated Benzyloxycalix[8]Arene (27)

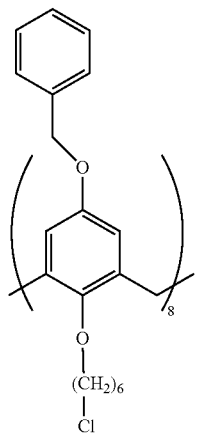

A Schlenk flask equipped with a magnetic stirring bar was charged with benzyloxycalix[8]arene 2 (1 equiv., 2.95 mmol, 5 g). The flask was flushed with three vacuum/argon cycles. 1-bromo-6-chlorohexane (86 equiv., 253.2 mmol, 37.7 ml) and anhydrous DMF (33 equiv., 96.9 mmol, 7.5 mL) were added under argon via syringe.[1] The reaction mixture was heated at 40° C., then sodium hydride (60% w/w in oil, 16 equiv., 47.1 mmol, 1.88 g) was added in three equal portions, with intervals of 60 minutes between each addition. The mixture was stirred at 30° C. overnight, then DCM (40 mL) was added, and the suspension was filtered on a Dicalite™ pad (rinsed with DCM). The filtrate was evaporated under reduced pressure. The resulting solid residue was stirred in EtOH under argon overnight at room temperature, and then filtered on a fritted glass filter (rinsed with 3×40 mL of diethyl ether). The resulting solid was then stirred again for 2 hours at 80° C. in EtOH under argon, and the hot supernatant was removed from the flask, while the sticky residue remained on the sides of the flask. Drying under vacuum finally afforded compound 27 as a pure white solid in 79% yield (6.2 g).

$^1$H NMR (400 MHz, CDCl$_3$): δ for one repeating unit: 7.19-7.10 (m, 5H), 6.52 (s, 2H), 4.62 (s, 2H), 3.94 (s, 2H), 3.63 (t, J=6.2 Hz, 2H), 3.40 (t, J=6.3 Hz, 2H), 1.72-1.61 (m, 4H), 1.46-1.33 (m, 4H).

$^{13}$C NMR (400 MHz, CDCl$_3$): δ for one repeating unit: 154.7, 149.3, 137.2, 135.1 (2C), 128.4 (2C), 127.8, 127.7 (2C), 115.0 (2C), 73.6, 69.8, 45.1, 32.7 (2C), 30.3, 26.9, 25.7.

HRMS [ESI(+)]: m/z [M+Na]$^+$ calculated for [C$_{160}$H$_{184}$Cl$_8$NaO$_{16}$]$^+$: 2664.0985, found: 2664.0896.

IR (ATR-GE): ū (cm$^{-1}$)=2937, 2865, 2361, 1601, 1591, 1497, 1460, 1382, 1323, 1308, 1204, 1143, 1050, 843,735, 698.

The preparation of alkylated benzyloxycalix[8]arenes 3b and 3c has been described previously (I. Abdellah, et al. *Dalton Trans.* 2018, 47, 13843-13848, and V. Huc, K. Pelzer, *J. Colloid Interface Sci.* 2008, 318, 1-4).

Example 9.2: Synthesis of "Bottom-Up" Supported Imidazolium Iodides (31a-BU, 31b, 31c and 31d)

General procedure: In a three-necked round bottom flask equipped with a magnetic stirring bar, a reflux condenser and an argon inlet were introduced compound 19a or 19b (12 equiv.), alkylated benzyloxycalix[8]arene (3a, 3b or 3c, 1 equiv.), sodium iodide (32 equiv.) and potassium carbonate (32 equiv.). The solids were dried under vacuum for 5 minutes, then the flask was evacuated and backfilled with argon 3 times. Distilled acetonitrile (C=0.02 M) was added under argon and the reaction mixture was stirred at 80° C. for 3 to 5 days. The mixture was allowed to cool down to room temperature under argon, then DCM was added, and the suspension was filtered on a Dicalite™ pad. The pad was washed with DCM. The filtrate was evaporated, and the resulting residue was dissolved in a minimum of DCM and precipitated in diethyl ether at room temperature under vigorous stirring. The heterogeneous solution was then stirred under argon for 15 minutes at room temperature, then for 15 minutes at 0° C. The solid was then filtered on a fritted glass filter, washed 3 times with diethyl ether and dried under vacuum overnight. The resulting yellow powder was dissolved in a minimum of DCM and precipitated in ethyl acetate following the procedure described above, to ensure an important removal of the impurities. This time the product precipitated as a sticky residue which stayed on the sides of the flask. The supernatant was slowly removed, and the sticky residue was washed 2 times with ethyl acetate and 2 times with diethyl ether, each time removing the supernatant slowly while keeping the sticky solid inside the flask. The solid was then dried under vacuum for 1 hour, then dissolved in a minimum of DCM and precipitated in diethyl ether following the procedure described previously, in order to obtain the product in a powdery form. This powder was filtered over a fritted glass filter, washed 3 times with diethyl ether and dried under vacuum overnight, to afford the expected product as a pure solid.

C₆-Supported Imidazolium Iodide (31a-BU)

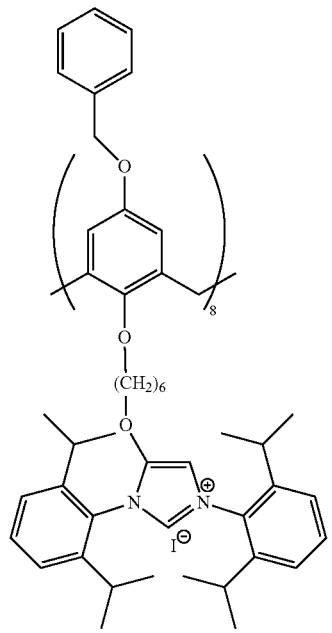

This compound was synthesized according to the general procedure described previously, using 19a (12 equiv., 6.12 mmol, 2.98 g), alkylated benzyloxycalix[8]arene 3a (1 equiv., 0.51 mmol, 1.35 g), sodium iodide (32 equiv., 16.3 mmol, 2.44 g) and potassium carbonate (32 equiv., 16.3 mmol, 2.25 g), in 25 mL of distilled acetonitrile. The product was precipitated using 15 mL of DCM, and 120 mL of diethyl ether or 120 mL of ethyl acetate for each precipitation described in the general procedure, respectively. The target compound 31a-BU was obtained as a light-yellow solid in 62% yield (2.1 g).

$^1$H NMR (400 MHz, DMSO-d$_6$): δ for one repeating unit: 9.84 (s, 1H), 8.09 (s, 1H), 7.69 (dd, J=7.1 Hz and 7.1 Hz, 1H), 7.59-7.50 (m, 3H), 7.47-7.40 (m, 2H), 7.15-6.95 (m, 5H), 6.46 (s, 2H), 4.55 (br. s, 2H), 4.29-4.13 (m, 2H), 3.81 (br. s, 2H), 3.67-3.43 (m, 2H), 2.49-2.35 (m, 4H), 1.67-1.45 (m, 4H), 1.29 (d, J=6.5 Hz, 6H), 1.24-1.10 (m, 22H).

$^{13}$C NMR (100 MHz, DMSO-d$_6$): δ for one repeating unit: 153.9, 148.4, 147.5, 145.2 (2C), 144.7 (2C), 136.7, 134.6 (2C), 133.1, 131.9, 130.4, 128.1, 127.9 (2C), 127.3, 127.2 (2C), 126.1, 124.6 (2C), 124.5 (2C), 114.3 (2C), 103.3, 73.8, 73.1, 68.8, 29.5, 28.8 (2C), 28.5 (2C), 27.8, 25.0, 24.8 (2C), 24.3 (2C), 23.8 (2C), 23.2 (2C), 22.7 (2C).

HRMS [ESI(+)]: m/z [M−4I]$^{+4}$/4 calculated for [C$_{376}$H$_{472}$I$_4$NO$_{16}$O$_{24}$]$^{+4}$/4: 1526.8125, found: 1526.8101.

IR (ATR-GE): ū (cm$^{-1}$)=2947, 2872, 2779, 2361, 1718, 1636, 1506, 1456, 1396, 1209, 1057, 918, 654.

C₃-Supported Imidazolium Iodide (31b)

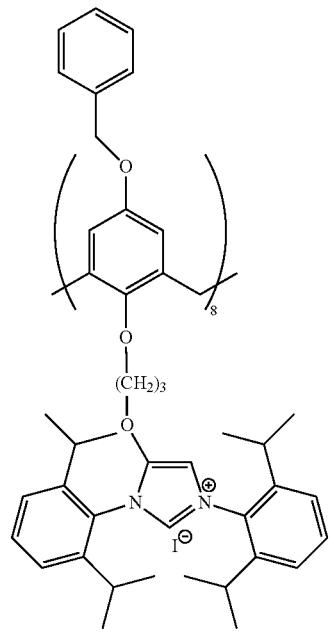

This compound was synthesized according to the general procedure described previously, using 19a (12 equiv., 6.23 mmol, 3.02 g), alkylated benzyloxycalix[8]arene 3b (1 equiv., 0.52 mmol, 1.2 g), sodium iodide (32 equiv., 16.6 mmol, 2.5 g) and potassium carbonate (32 equiv., 16.6 mmol, 2.3 g), in 25 mL of distilled acetonitrile. The product was precipitated using 15 mL of DCM, and 120 mL of diethyl ether or 120 mL of ethyl acetate for each precipitation described in the general procedure, respectively. The target compound 31b was obtained as a light-yellow solid in 65% yield (2.1 g).

$^1$H NMR (400 MHz, DMSO-d$_6$): δ for one repeating unit: 9.85 (s, 1H), 8.14 (s, 1H), 7.69 (dd, J=7.5 Hz and 7.5 Hz, 1H), 7.58-7.49 (m, 3H), 7.44-7.38 (m, 2H), 7.23-6.81 (m, 5H), 6.32 (s, 2H), 4.70-4.18 (m, 4H), 3.86-3.46 (m, 4H), 2.48-2.34 (m, 4H), 2.29-1.94 (m, 2H), 1.21 (d, J=6.4 Hz, 6H), 1.17-1.07 (m, 18H).

$^{13}$C NMR (100 MHz, DMSO-d$_6$): δ for one repeating unit: 154.1, 147.7, 147.3, 145.2 (2C), 144.7 (2C), 136.6, 134.5 (2C), 133.1, 131.9, 130.3, 128.2, 127.9 (2C), 127.2, 126.9 (2C), 126.0, 124.6 (4C), 114.1 (2C), 103.6, 71.1, 69.8, 69.1, 68.7, 29.0, 28.8 (2C), 28.5 (2C), 24.3 (2C), 23.8 (2C), 23.1 (2C), 22.7 (2C).

HRMS [ESI(+)]: m/z [M−4I]$^{+4}$/4 calculated for [C$_{352}$H$_{424}$I$_4$N$_{16}$O$_{24}$]$^{+4}$/4: 1442.4675, found: 1442.4671.

IR (ATR-GE): ū (cm$^{-1}$)=2945, 2872, 2770, 2361, 1717, 1684, 1616, 1540, 1457, 1395, 1305, 1213, 1083, 1044, 946, 801, 739, 700.

C₄-Supported Imidazolium Iodide (31c)

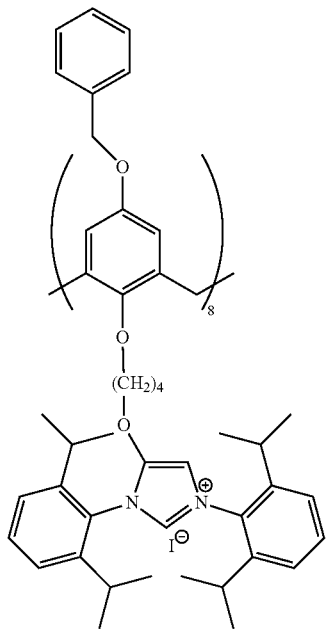

This compound was synthesized according to the general procedure described previously, using 19a (12 equiv., 8.92 mmol, 4.3 g), alkylated benzyloxycalix[8]arene 3c (1 equiv., 0.74 mmol, 1.8 g), sodium iodide (32 equiv., 23.8 mmol, 3.56 g) and potassium carbonate (32 equiv., 23.8 mmol, 3.3 g) in 36 mL of distilled acetonitrile. The product was precipitated using 15 mL of DCM, and 150 mL of diethyl ether or 150 mL of ethyl acetate for each precipitation described in the general procedure, respectively. The target compound 31c was obtained as a light-yellow solid in 76% yield (3.6 g).

$^1$H NMR (400 MHz, DMSO-d$_6$): δ for one repeating unit: 9.82 (s, 1H), 8.08 (s, 1H), 7.69 (dd, J=6.4 Hz and 6.4 Hz, 1H), 7.55-7.47 (m, 3H), 7.39-7.32 (m, 2H), 7.13-6.82 (m, 5H), 6.41 (s, 2H), 4.48 (br. s, 2H), 4.35-4.19 (m, 2H), 3.92-3.51 (m, 4H), 2.48-2.43 (m, 2H), 2.42-2.34 (m, 2H), 1.92-1.57 (m, 4H), 1.27 (d, J=7.1 Hz, 6H), 1.18-1.09 (m, 18H).

$^{13}$C NMR (100 MHz, DMSO-d$_6$): δ for one repeating unit: 154.0, 147.9, 147.5, 145.2 (2C), 144.7 (2C), 136.8, 134.8 (2C), 133.2, 131.9, 130.4, 128.1, 127.9 (2C), 127.3, 127.0 (2C), 126.1, 124.6 (2C), 124.5 (2C), 114.2 (2C), 103.3, 73.7, 73.1, 68.6, 29.2, 28.8 (2C), 28.5 (2C), 26.0, 24.9, 24.3 (2C), 23.8 (2C), 23.2 (2C), 22.7 (2C).

HRMS [ESI(+)]: m/z [M−4I]$^{+4}$/4 calculated for [C$_{360}$H$_{440}$I$_4$N$_{16}$O$_{24}$]$^{+4}$/4: 1470.7498, found: 1470.7459.

IR (ATR-GE): ū (cm$^{-1}$)=2966, 2931, 2872, 1617, 1543, 1463, 1387, 1330, 1308, 1279, 1213, 1199, 1145, 1048, 945, 857, 803, 754, 698, 667, 646, 606.

C₄—Supported Modified Imidazolium Iodide (31d)

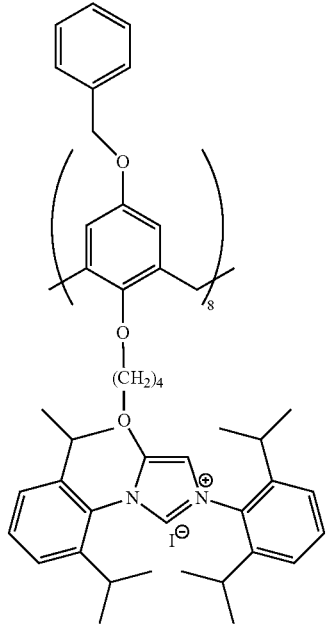

This compound was synthesized according to the general procedure described previously, using 19b (12 equiv., 22 mmol, 11 g), alkylated benzyloxycalix[8]arene 3c (1 equiv., 1.84 mmol, 4.45 g), sodium iodide (32 equiv., 58.8 mmol, 8.81 g) and potassium carbonate (32 equiv., 58.8 mmol, 8.12 g) in 89 mL of distilled acetonitrile. The product was precipitated using 20 mL of DCM, and 200 mL of diethyl ether or 200 mL of ethyl acetate for each precipitation described in the general procedure, respectively. The target compound 31d was obtained as a beige solid in 92% yield (11 g).

$^1$H NMR (400 MHz, 40° C., DMSO-d$_6$): δ for one repeating unit: 9.80 (s, 1H), 7.71 (dd, J=8.1 Hz and 8.1 Hz, 1H), 7.58-7.53 (m, 2H), 7.48 (dd, J=8.1 Hz and 8.1 Hz, 1H), 7.40-7.32 (m, 2H), 7.13-6.82 (m, 5H), 6.43 (br. s, 2H), 4.50 (br. s, 2H), 4.33-4.16 (m, 2H), 3.70 (br. s, 2H), 3.64-3.45 (m, 2H), 2.48-2.41 (m, 2H), 2.40-2.33 (m, 2H), 2.07 (s, 3H), 1.76-1.64 (m, 2H), 1.63-1.51 (m, 2H), 1.25 (d, J=6.5 Hz, 6H), 1.19 (d, J=6.5 Hz, 6H), 1.14 (d, J=6.5 Hz, 6H), 1.10 (d, J=6.5 Hz, 6H).

$^{13}$C NMR (100 MHz, DMSO-d$_6$): δ for one repeating unit: 154.0, 147.9, 145.3 (2C), 145.2 (2C), 142.7, 136.7, 134.9 (2C), 132.2, 132.1, 131.9, 128.1, 127.9 (2C), 127.7, 127.3, 127.1, 126.5, 125.0 (2C), 124.5 (2C), 115.1 (2C), 114.2, 75.7, 73.0, 68.7, 29.3, 28.6 (2C), 28.4 (2C), 26.0, 25.9, 24.7 (2C), 24.6 (2C), 22.7 (2C), 22.5 (2C), 7.8.

HRMS [ESI(+)]: m/z [M−4I]$^{+4}$/4 calculated for [C$_{368}$H$_{456}$I$_4$N$_{16}$O$_{24}$:]$^{+4}$/4: 1497.7778, found: 1497.7834.

IR (ATR-GE): ū (cm$^{-1}$)=2964, 2929, 2871, 1639, 1598, 1537, 1462, 1387, 1367, 1329, 1211, 1143, 1048, 1030, 993, 940, 859, 805, 741, 698.

Example 9.3: Synthesis of "Bottom-Up" Supported Imidazolium Chlorides (34a and 34b)

General procedure: In a one-necked round bottom flask, NMe$_4$Cl (650 equiv.) was dissolved in MeOH (C[NMe$_4$Cl]=2.5 M) using manual stirring. Compound 31c or 31d (1 equiv., C=3.8·10$^{-3}$ M) was then added to the homogeneous solution, leading to the precipitation of a solid. The solvent was concentrated under reduced pressure at 40° C. until dryness. Then a limpid solution of NMe$_4$Cl (650 equiv.) dissolved in MeOH (C[NMe$_4$Cl]=2.5 M) was added to the residual solid, and the heterogeneous solution was concentrated under reduced pressure at 40° C. until dryness. Chloroform was then added to dissolve the product, and the ammonium salts were filtered on a Dicalite™ pad and washed with chloroform. The filtrate was concentrated under reduced pressure, and chloroform was added to the residue. After a second filtration on a Dicalite™ pad (washed with chloroform), the filtrate was transferred into an extraction funnel, and cold water was added. The organic layer was collected, and the aqueous phase was extracted two times with chloroform. The combined organic layers were washed with cold water, dried over MgSO$_4$ and filtered over a Dicalite™ pad (washed with chloroform) to obtain efficient removal of MgSO$_4$ salts. The solvent was evaporated, then the residue was dissolved in a minimum of DCM and precipitated by a dropwise addition at room temperature in a flask containing diethyl ether, under vigorous stirring. The heterogeneous solution was stirred under argon 15 min at room temperature, then 15 min at 0° C. The solid was then filtered on a fritted glass filter, washed 3 times with diethyl ether and finally dried under vacuum overnight, to afford the desired product as a pure powder.

C$_4$-Supported Imidazolium Chloride (34a)

This compound was synthesized according to the general procedure described previously, using 31c (1 equiv., 1.7 mmol, 10.92 g) and NMe$_4$Cl (650 equiv., 1.11 mol, 121.73 g) in 450 mL of MeOH (C=3.8·10$^{-3}$ M). The residue was washed with 600 mL of cold water and extracted with 3×400 mL of chloroform, then combined organic layers were washed with 600 mL of cold water. The organic residue was precipitated using 30 mL of DCM in 320 mL of diethyl ether. The target compound 34a was obtained as an off-white solid in 87% yield (8.44 g).

$^1$H NMR (400 MHz, 40° C., DMSO-d$_6$): δ for one repeating unit: 9.92 (br. s, 1H), 8.16 (br. s, 1H), 7.68 (dd, J=7.6 Hz and 7.6 Hz, 1H), 7.54-7.47 (m, 3H), 7.38-7.31 (m, 2H), 7.08-6.84 (m, 5H), 6.40 (s, 2H), 4.48 (br. s, 2H), 4.36-4.21 (m, 2H), 3.01 (br. s, 2H), 3.65-3.48 (m, 2H), 2.49-2.43 (m, 2H), 2.42-2.35 (m, 2H), 1.81-1.71 (m, 2H), 1.70-1.56 (m, 2H), 1.26 (d, J=6.7 Hz, 6H), 1.17 (d, J=6.7 Hz, 6H), 1.14 (d, J=6.7 Hz, 6H), 1.12 (d, J=6.7 Hz, 6H).

$^{13}$C NMR (100 MHz, DMSO-d$_6$): δ for one repeating unit: 154.0, 147.9, 147.5, 145.2 (2C), 144.7 (2C), 136.8, 134.8 (2C), 133.4, 131.9, 130.5, 128.1, 127.9 (2C), 127.3, 127.1, 127.0, 126.1, 124.6 (2C), 124.5 (2C), 114.2 (2C), 103.5, 73.7, 73.0, 68.6, 29.2, 28.8 (2C), 28.6 (2C), 26.0, 24.9, 24.3 (2C), 23.8 (2C), 23.2 (2C), 22.7 (2C).

HRMS [ESI(+)]: m/z [M–3Cl]$^{+3}$/3 calculated for [C$_{360}$H$_{440}$Cl$_5$N$_{16}$O$_{24}$]$^{+3}$/3: 1848.7376, found: 1848.7913.

IR (ATR-GE): ū (cm$^{-1}$)=2965, 2930, 2870, 1617, 1542, 1462, 1387, 1367, 1330, 1308, 1256, 1049, 959, 861, 803, 754, 697.

XPS: Calculated (%) for C$_{360}$Cl$_8$N$_{16}$O$_{24}$. C: 88.2; Cl: 1.96; N: 3.92; O: 5.88. Found (%): C: 87; Cl: 2; N: 4; O: 7. Only residual traces of iodide anions were detected (less than 0.1%).

C$_4$-Supported Modified Imidazolium Chloride (34b)

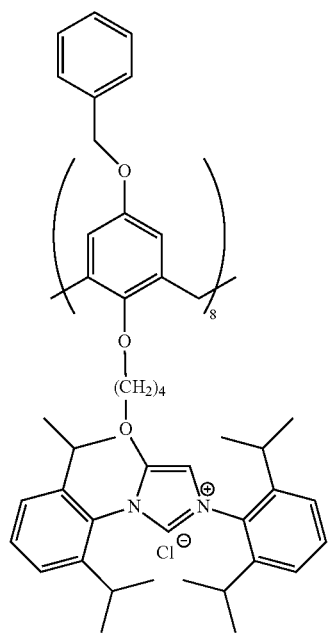

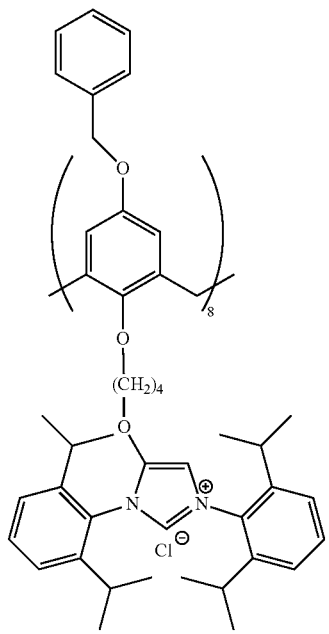

This compound was synthesized according to the general procedure described previously, using 31d (1 equiv., 1.57 mmol, 10.17 g) and NMe$_4$Cl (650 equiv., 1.02 mol, 111.41 g) in 410 mL of MeOH (C=3.8·10$^{-3}$ M). The residue was washed with 600 mL of cold water and extracted with 3×400 mL of chloroform, then combined organic layers were washed with 600 mL of cold water. The organic residue was precipitated using 30 mL of DCM in 320 mL of diethyl ether. The target compound 34b was obtained as a beige solid in 80% yield (7.21 g).

$^1$H NMR (400 MHz; DMSO-d$_6$): δ for one repeating unit: 9.94 (br. s, 1H), 7.71 (dd, J=8.4 Hz and 8.4 Hz, 1H), 7.59-7.52 (m, 2H), 7.47 (dd, J=8.4 Hz and 8.4 Hz, 1H), 7.39-7.31 (m, 2H), 7.11-6.80 (m, 5H), 6.44 (br. s, 2H), 4.50 (br. s, 2H), 4.32-4.11 (m, 2H), 3.68 (br. s, 2H), 3.64-3.46 (m, 2H), 2.47-2.39 (m, 2H), 2.38-2.30 (m, 2H), 2.05 (s, 3H), 1.71-1.62 (m, 2H), 1.60-1.48 (m, 2H), 1.25 (d, J=6.5 Hz, 6H), 1.19 (d, J=6.5 Hz, 6H), 1.14 (d, J=6.5 Hz, 6H), 1.10 (d, J=6.5 Hz, 6H).

$^{13}$C NMR (100 MHz, DMSO-d$_6$): δ for one repeating unit: 154.1, 148.0, 145.3 (4C), 142.7, 136.7, 134.8 (2C), 132.3, 132.2, 131.8, 128.2, 127.9 (2C), 127.7, 127.3, 127.1, 126.5, 125.0 (2C), 124.4 (2C), 115.2 (2C), 114.2, 75.7, 73.0, 68.7, 29.4, 28.6 (2C), 28.5 (2C), 26.0, 25.9, 24.7 (2C), 24.6 (2C), 22.6 (2C), 22.4 (2C), 7.7.

HRMS [ESI(+)]: m/z [M–5Cl]$^{+5}$/5 calculated for [C$_{368}$H$_{456}$Cl$_3$N$_{16}$O$_{24}$:]$^{+5}$/5: 1118.6820, found: 1118.6866.

IR (ATR-GE): 2966, 2931, 2871, 1639, 1598, 1536, 1462, 1330, 1300, 1257, 1214, 1143, 1049, 1030, 941, 858, 805, 744, 698.

Example 10. Synthesis of the Catalysts 29, 30, 32, 33, 35 and 36

General procedure: The synthetic procedure has been slightly modified from the reference (C. J. O'Brien, E. A. B. Kantchev, C. Valente, N. Hadei, G. A. Chass, A. Lough, A. C. Hopkinson, M. G. Organ, *Chem. Eur. J.* 2006, 12, 4743-4748). In a Schlenk flask equipped with a magnetic stirring bar were introduced the supported imidazolium precursor (31a-TA, 31a-BU, 31b, 31c or 31d, 1 equiv.), palladium bromide or chloride (10 equiv.) and dry potassium carbonate (40 equiv.). The solids were dried under vacuum for 10 min. Anhydrous pyridine (C=0.024 M) was then added under argon, and the mixture was degassed briefly before stirring at 100° C. for 20 hours. The reaction was then allowed to cool down to room temperature under argon, and DCM was added. The mixture was centrifuged (20 min, 20° C., 9000 rpm) and the supernatant was filtered on a Dicalite™ pad and rinsed with DCM. The filtrate was evaporated under reduced pressure. The residue was dissolved in a minimum of DCM and then precipitated by a dropwise addition at room temperature in a flask containing diethyl ether, under vigorous stirring. The heterogeneous solution was stirred under argon 15 min at room temperature. After filtration on a fritted glass filter, the resulting solid was triturated in EtOH overnight under argon at room temperature. The solid was filtered on a fritted glass filter and washed with diethyl ether affording Cat. 29, Cat. 30, Cat. 32, Cat. 33, Cat. 35 and Cat. 36.

The synthesis of Cat. 9 was described previously.

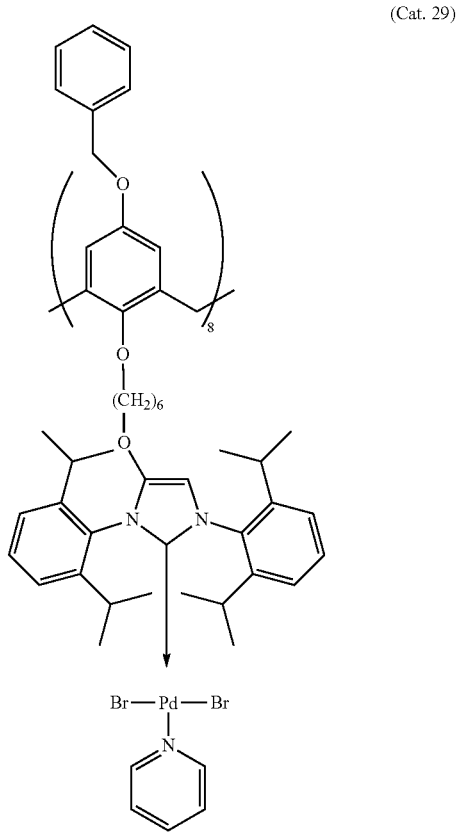

(Cat. 29)

This compound was synthesized according to the general procedure described previously, using 31a-TD (1 equiv., 0.16 mmol, 1 g), palladium bromide (10 equiv., 1.6 mmol, 0.42 g) and potassium carbonate (40 equiv., 6.41 mmol, 0.886 g) in 6.6 mL of anhydrous pyridine. The product was precipitated using 8 mL of DCM in 150 mL of diethyl ether and triturated in 15 mL EtOH. Cat. 29 was obtained as a brown solid in 35% yield (0.47 g).

$^1$H NMR (400 MHz, DMSO-d$_6$): δ for one repeating unit: 8.41-8.19 (m, 1H), 7.93-5.89 (m, 20H), 5.21-4.30 (m, 4H), 4.18-3.38 (m, 6H), 3.22-2.92 (2H), 1.82-0.59 (m, 27H). The integration is not in accordance with the one expected due to the complexity of the $^1$H NMR analysis as described in the article.

XPS: Calculated (%) for C$_{416}$H$_{504}$Br$_{16}$N$_{24}$O$_{24}$Pd$_8$. C: 89.6; Br: 3.4; N: 5.1; Pd: 1.7. Found (%): C: 93; Br: 1; N: 4; Pd: 1.

101

(Cat. 30)

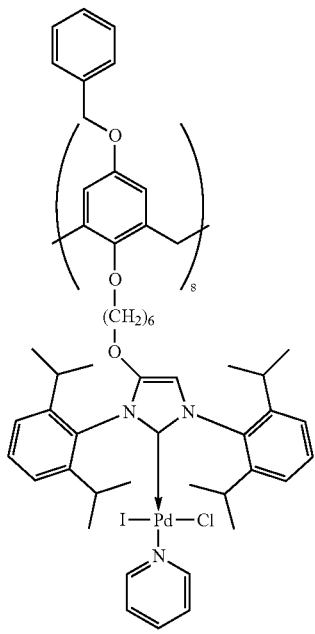

This compound was synthesized according to the general procedure described previously, using 31a-BU (1 equiv., 0.09 mmol, 0.6 g), palladium chloride (10 equiv., 0.9 mmol, 0.16 g) and potassium carbonate (40 equiv., 3.63 mmol, 0.5 g) in 3.7 mL of anhydrous pyridine. The product was precipitated using 4 mL of DCM in 100 mL of diethyl ether and triturated in 10 mL EtOH. Cat. 30 was obtained as a brown solid in 49% yield (0.37 g).

$^1$H NMR (400 MHz, DMSO-$d_6$): δ for one repeating unit: 8.50-8.11 (m, 2H), 7.87-7.67 (m, 1H), 7.54-7.47 (m, 1H), 7.41-7.20 (m, 7H), 7.14-6.93 (m, 6H), 6.40 (s, 2H), 4.53 (br. s, 2H), 3.97-3.71 (m, 4H), 3.54-3.39 (m, 2H), 3.29-2.96 (m, 4H), 1.51-1.29 (m, 16H), 1.15-0.91 (m, 16H).

$^{13}$C NMR (100 MHz, DMSO-$d_6$): δ for one repeating unit: Due to a mixture of different halogen-containing palladium species, the overall spectrum displays more peaks than expected. It seems to indicate that the distribution of the chloride and iodide ligands coordinating the palladium metal centre is not controlled. 153.9-145.7 (7 peaks expected for 10C, 16 peaks found), 139.5-134.5 (5 peaks expected for 6C, 8 peaks found), 131.3, 129.9 (2C), 127.9 (2C), 127.2, 124.4 (2C), 124.0, 123.8, 123.6, 114.2 (2C), 104.4, 72.8, 71.3, 68.8, 29.4, 28.8-23.1 (8 peaks expected for 16C, 21 peaks found).

IR (ATR-GE): ū (cm$^{-1}$)=2950, 2921, 1635, 1616, 1457, 1387, 1339, 1226, 1182, 1057, 899, 853, 758, 683.

XPS: Calculated (%) for $C_{416}Cl_8I_8N_{24}Pd_8$. C: 89.6; Cl: 1.7; I: 1.7; N: 5.1; Pd: 1.7. Found (%): C: 90; Cl: 2; I: 2; N: 4; Pd: 2.

102

(Cat. 32)

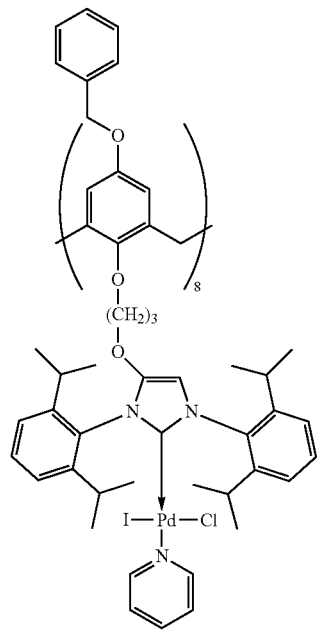

This compound was synthesized according to the general procedure described previously, using 31b (1 equiv., 0.094 mmol, 0.59 g), palladium chloride (10 equiv., 0.94 mmol, 0.166 g) and potassium carbonate (40 equiv., 3.76 mmol, 0.52 g) in 3.9 mL of anhydrous pyridine. The product was precipitated using 4 mL of DCM in 100 mL of diethyl ether and triturated in 10 mL EtOH. Cat. 32 was obtained as a brown solid in 55% yield (0.42 g).

$^1$H NMR (400 MHz, DMSO-$d_6$): δ for one repeating unit: 8.45-8.17 (m, 2H), 7.82-7.68 (m, 1H), 7.54-7.48 (m, 1H), 7.41-6.89 (m, 13H), 6.37 (br. s, 2H), 4.46 (br. s, 2H), 4.25-4.01 (m, 2H), 3.85-3.49 (m, 4H), 3.48-3.40 (m, 1H), 3.29-2.93 (m, 3H), 2.25-1.82 (m, 2H), 1.53-1.18 (m, 12H), 1.12-0.79 (m, 12H).

$^{13}$C NMR (100 MHz, DMSO-$d_6$): δ for one repeating unit: Due to a mixture of different halogen-containing palladium species, the overall spectrum displays more peaks than expected. It seems to indicate that the distribution of the chloride and iodide ligands coordinating the palladium metal centre is not controlled. 154.1-145.7 (7 peaks expected for 10C, 13 peaks found), 139.5-134.7 (5 peaks expected for 6C, 7 peaks found), 131.2, 130.0 (2C), 127.9 (2C), 127.3, 124.4 (2C), 124.0, 123.8 (2C), 114.1 (2C), 104.6, 69.9, 69.3, 68.7 (2C), 29.2, 28.8-23.1 (6 peaks expected for 12C, 12 peaks found).

IR (ATR-GE): ū (cm$^{-1}$)=2972, 2946, 2875, 2362, 1635, 1616, 1456, 1387, 1315, 1258, 1209, 1055, 855, 741, 700.

XPS: Calculated (%) for $C_{392}Cl_8I_8N_{24}Pd_8$. C: 89; Cl: 1.8; I: 1.8; N: 5.4; Pd: 1.8. Found (%): C: 90; Cl: 2; I: 2; N: 4; Pd: 2.

(Cat. 33)

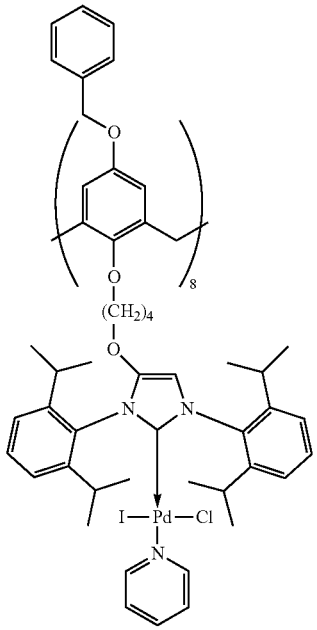

This compound was synthesized according to the general procedure described previously, using 31c (1 equiv., 0.054 mmol, 0.35 g), palladium chloride (10 equiv., 0.54 mmol, 0.095 g) and potassium carbonate (40 equiv., 2.16 mmol, 0.29 g) in 2.3 mL of anhydrous pyridine. The product was precipitated using 3 mL of DCM in 70 mL of diethyl ether and triturated in 10 mL EtOH. Cat. 33 was obtained as a light brown solid in 57% yield (0.25 g).

$^1$H NMR (400 MHz, DMSO-$d_6$): δ for one repeating unit: 8.49-8.12 (m, 2H), 7.83-7.68 (m, 1H), 7.55-7.45 (m, 1H), 7.43-6.72 (m, 13H), 6.35 (s, 2H), 4.48 (br. s, 2H), 4.07-3.84 (m, 2H), 3.67 (br. s, 2H), 3.55-3.43 (m, 2H), 3.29-2.91 (m, 4H), 1.83-1.52 (m, 4H), 1.48-1.21 (m, 12H), 1.17-0.84 (m, 12H).

$^{13}$C NMR (100 MHz, DMSO-$d_6$): δ for one repeating unit: Due to a mixture of different halogen-containing palladium species, the overall spectrum displays more peaks than expected. It seems to indicate that the distribution of the chloride and iodide ligands coordinating the palladium metal centre is not controlled. 153.9-145.7 (7 peaks expected for 10C, 19 peaks found), 139.5-134.6 (5 peaks expected for 6C, 8 peaks found), 131.2, 129.9, 127.9 (2C), 127.2, 124.4 (2C), 123.8 (2C), 123.6 (2C), 114.2 (2C), 104.6-104.1 (1 peak expected for 1C, 3 peaks found), 72.7, 71.2, 68.7, 29.2, 28.8-23.1 (6 peaks expected for 14C, 16 peaks found).

IR (ATR-GE): ū ($cm^{-1}$)=2970, 2936, 2873, 1636, 1601, 1464, 1383, 1325, 1256, 1209, 1051, 961, 855, 756, 695.

XPS: Calculated (%) for $C_{400}Cl_8I_8N_{24}Pd_8$. C: 89.3; Cl: 1.8; I: 1.8; N: 5.3; Pd: 1.8. Found (%): C: 90; Cl: 2; I: 2; N: 4; Pd: 2.

(Cat. 35)

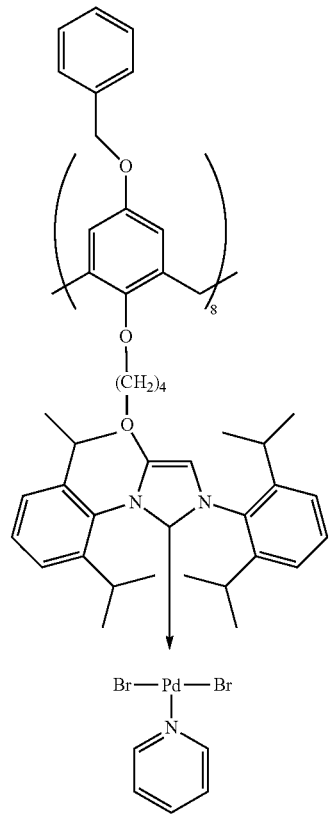

This compound was synthesized according to the general procedure described previously, using 34a (1 equiv., 0.083 mmol, 0.47 g), palladium chloride (10 equiv., 0.83 mmol, 0.147 g) and potassium carbonate (40 equiv., 3.32 mmol, 0.46 g) in 3.5 mL of anhydrous pyridine. The product was precipitated using 3 mL of DCM in 70 mL of diethyl ether and triturated in 15 mL EtOH. Cat. 35 was obtained as a brown solid in 56% yield (0.35 g).

$^1$H NMR (400 MHz, DMSO-$d_6$): δ for one repeating unit: 8.54-8.25 (m, 2H), 7.89-7.76 (m, 1H), 7.57-7.46 (m, 1H), 7.35-7.01 (m, 13H), 6.44 (br. s, 2H), 4.53 (br. s, 2H), 4.05-3.93 (m, 2H), 3.77 (br. s, 2H), 3.65-3.49 (m, 2H), 3.28-3.14 (m, 2H), 3.12-2.96 (m, 2H), 1.82-1.52 (m, 4H), 1.44-0.68 (m, 24H).

$^{13}$C NMR (100 MHz, DMSO-$d_6$): δ for one repeating unit: 161.2, 153.9, 150.5 (2C), 149.1, 148.1, 147.1 (2C), 146.4 (2C), 139.5, 138.4, 136.7, 135.6, 134.6 (2C), 131.0, 130.0, 129.8, 128.1 (2C), 127.3, 124.4 (2C), 123.7 (2C), 123.5 (2C), 119.5, 114.2 (2C), 104.3, 72.8, 71.3, 68.9, 29.5, 28.2 (4C), 26.0 (3C), 24.8 (3C), 23.4 (2C), 23.1 (2C).

IR (ATR-GE): ū ($cm^{-1}$)=2974, 2937, 2878, 1636, 1603, 1464, 1384, 1325, 1256, 1210, 1050, 960, 854, 757, 697.

XPS: Calculated (%) for $C_{400}Cl_{16}N_{24}Pd_8$. C: 89.3; Cl: 3.6; N: 5.3; Pd: 1.8. Found (%): C: 91.7; Cl: 2.6; N: 3.8; Pd: 1.6. Only residual traces of iodide were detected (less than 0.3%).

(Cat. 36)

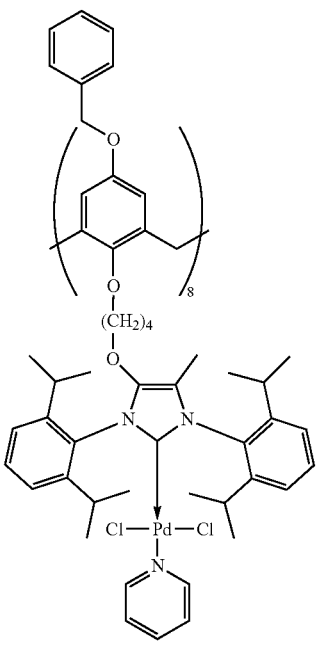

This compound was synthesized according to the general procedure described previously, using 34b (1 equiv., 0.06 mmol, 0.35 g), palladium chloride (10 equiv., 0.6 mmol, 0.107 g) and potassium carbonate (40 equiv., 2.42 mmol, 0.33 g) in 2.5 mL of anhydrous pyridine. The product was precipitated using 0.8 mL of DCM in 200 mL of diethyl ether and triturated in 10 mL EtOH. Cat. 36 was obtained as a brown solid in 50% yield (0.23 g).

$^1$H NMR (400 MHz, DMSO-$d_6$): δ for one repeating unit: 8.47-8.25 (m, 2H), 7.86-7.77 (m, 1H), 7.58-7.51 (m, 3H), 7.41-7.31 (m, 4H), 7.25-7.19 (m, 2H), 7.17-6.91 (m, 6H), 6.41 (br. s, 2H), 4.79-4.27 (m, 4H), 3.93 (br. s, 2H), 3.79-3.66 (m, 2H), 3.21-2.86 (m, 4H), 1.87 (s, 3H), 1.71-0.89 (m, 24H).

$^{13}$C NMR (100 MHz, DMSO-$d_6$): δ for one repeating unit: 154.3, 153.9, 150.5 (2C), 149.5, 146.9 (4C), 145.3, 139.4, 138.4, 136.6, 134.6 (2C), 132.9, 131.4, 130.2, 129.7, 128.0 (2C), 127.3 (2C), 124.4 (2C), 124.3 (2C), 123.8 (2C), 114.6 (2C), 113.3, 73.6, 72.7, 69.0, 28.9, 28.2 (2C), 27.9 (2C), 25.8 (2C), 24.8 (3C), 24.7 (3C), 24.6 (2C), 9.9.

IR (ATR-GE): $\bar{u}$ (cm$^{-1}$)=2974, 2938, 2875, 1642, 1604, 1450, 1383, 1329, 1254, 1206, 1052, 957, 855, 748, 695.

XPS: Calculated (%) for $C_{408}Cl_{16}N_{24}Pd_8$. C: 89.4; Cl: 3.5; N: 5.2; Pd: 1.7. Found (%): C: 90.3; Cl: 4; N: 3.9; Pd: 1.8. Only residual traces of iodide anions were detected (less than 0.1%).

Example 11. Evaluation of the Catalysts 18, 22, 23, 24 and 25

Example 11.1. General Procedure for the Catalytic Cross-Coupling Reactions

A Schlenk tube equipped with a magnetic stirring bar and a septum was charged with all the solids: the catalyst (x mol % Pd), the base (1.5 equiv.), the aryl halide (1 equiv., if solid) and the amine (1.2 equiv., if solid). The solids were dried under vacuum for 10 minutes. The Schlenk tube was evacuated and backfilled with argon 3 times. Then the solvent and the rest of the reagents (the aryl halide and/or the amine, if liquids) were introduced under argon. The Schlenk tube was then immersed in a pre-heated oil bath (at the desired temperature) and the reaction mixture was stirred under warming during x hours. At the end of the reaction, the mixture was allowed to cool to room temperature under argon, then the crude was filtered on a Dicalite™ pad and rinsed with ethyl acetate. The solvents were evaporated under reduced pressure, and the crude residue was purified by silica gel column chromatography (or in one case by preparative TLC), leading to the expected product in pure form.

Example 11. 2. Comparison of Cat 18, 22, 23 24 and 25 Activity for the Buchwald-Hartwig Coupling Between 4-Chlorotoluene and Morpholine

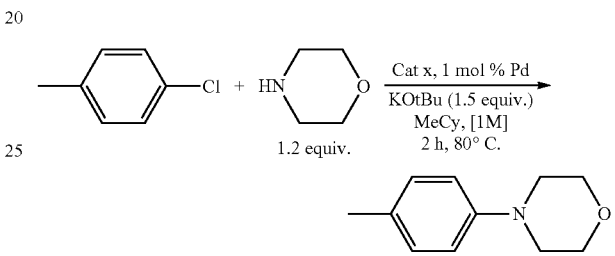

TABLE 14

Conversion and selectivity of the Buchwald-Hartwig coupling between 4-chlorotoluene and morpholine.

| Cat x | GC conv. (%)$^a$ | GC yield (%)$^a$ |
|---|---|---|
| Cat 18 | 12 | 7 |
| Cat 22 | 50 | 41 |
| Cat 23 | 62 | 59 |
| Cat 24 | >99 | >99 |
| Cat 25 | >99 | >99 |

$^a$Determined using hexadecane as internal standard.

Example 11. 3. Evaluation of the Catalysts Activity for the Buchwald-Hartwig Coupling of Primary Amines

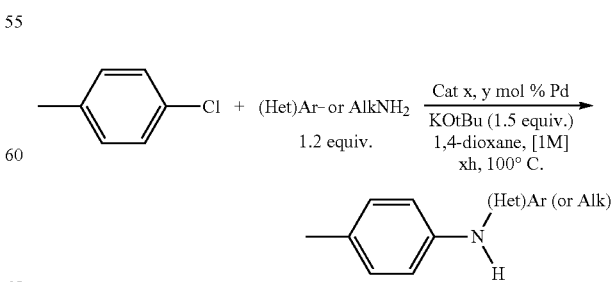

TABLE 15

Conversion and selectivity of the Buchwald-Hartwig coupling of primary amines

| Entry | (Het)ArNH$_2$ or AlkNH$_2$ | Cat x | Pd (mol %) | Time (h) | GC conv (%)[a] | GC yield (%)[a] |
|---|---|---|---|---|---|---|
| 1 | | Cat 22 | 0.1 | 20 | 82 | 72 |
| 2 | | Cat 23 | 0.1 | 20 | 74 | 70 |
| 3 | 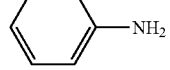 | Cat 24 | 0.1 | 20 | 95 | 90 |
| 4 | | Cat 25 | 0.1 | 20 | >99 | 95 |
| 5 | | Cat 25 | 0.1 | 2 | 97 | 93 |
| 6 | | | | | | |

Example 12. Evaluation of the Catalyst 25

Example 12.1. Evaluation of the Catalyst 25: Solvent and Base Screening

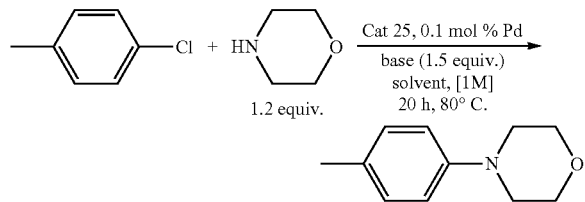

TABLE 16

Conversion, selectivity and leaching of the Buchwald-Hartwig coupling reaction

| Entry | Solvent | Base | GC conv. (%)[a] | GC yield (%)[a] | Leaching (ppm Pd)[b] |
|---|---|---|---|---|---|
| 1 | CPME | KOtBu | >99 | 93 | 38 |
| 2 | MeTHF | KOtBu | >99 | >99 | 24 |
| 3 | Dioxane | KOtBu | >99 | >99 | 25 |
| 4 | Dioxane[c] | KOtBu | 97 | 97 | 8.7 |
| 5 | MeCy + 1% H2O[d] | KOtBu | >99 | 97 | 9.5 |
| 6 | Toluene | KOtBu | 85 | 82 | — |
| 7 | Toluene[d] | KOtBu | >99 | >99 | 43 |

[a]Determined using hexadecane as internal standard.
[b]Determined by ICP-MS analyses.
[c]0.05 mol % Pd, 100° C.
[d]0.2 mol % Pd, 100° C.

Example 12.2. Preparation of Unsymmetrical Triarylamines with Cat 25

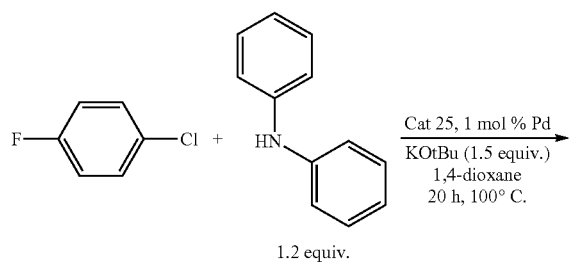

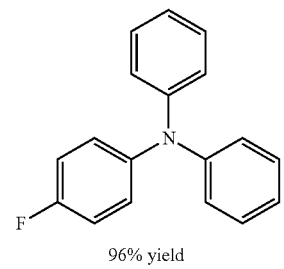

96% yield

Example 12.3. Scope of the Buchwald-Hartwig Coupling with Cat 25

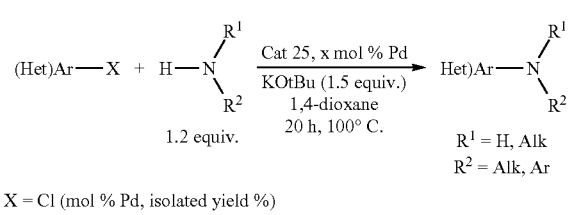

X = Cl (mol % Pd, isolated yield %)

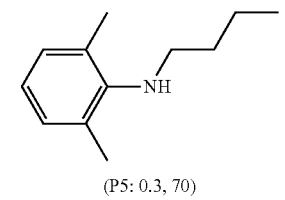

(P5: 0.3, 70)

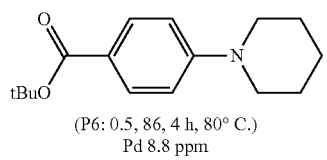

(P6: 0.5, 86, 4 h, 80° C.)
Pd 8.8 ppm

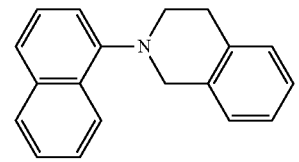

(P7: 0.2, 79)

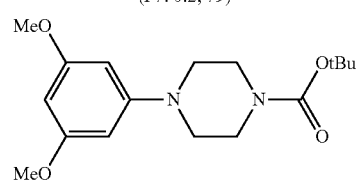

(P8: 0.03, 88)

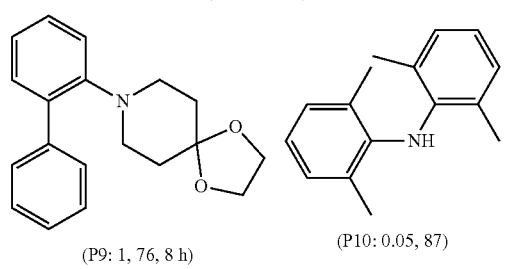

(P9: 1, 76, 8 h)    (P10: 0.05, 87)

-continued
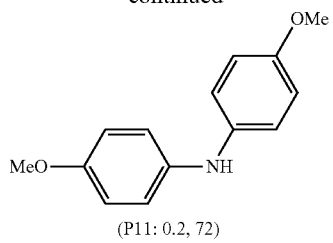
(P11: 0.2, 72)
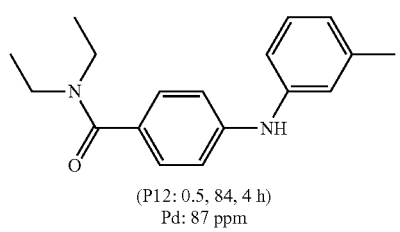
(P12: 0.5, 84, 4 h)
Pd: 87 ppm
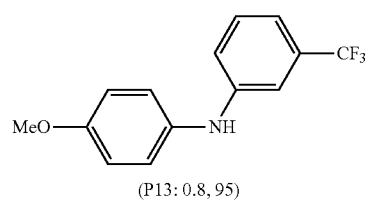
(P13: 0.8, 95)
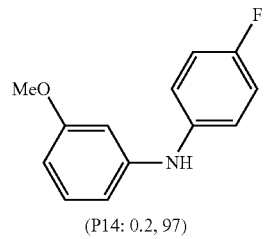
(P14: 0.2, 97)
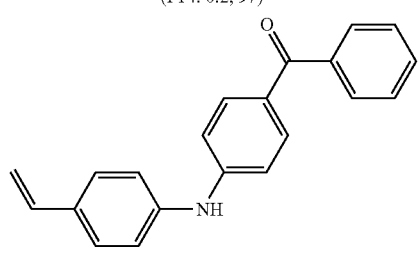
(P15: 0.2, 96)
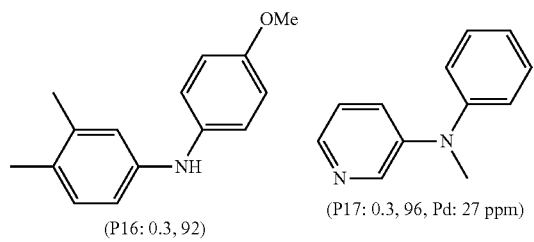
(P16: 0.3, 92)  (P17: 0.3, 96, Pd: 27 ppm)
X = Br (mol % Pd, isolated yield %)
-continued
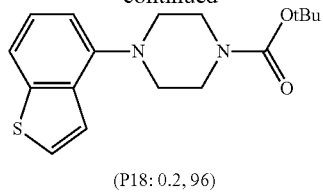
(P18: 0.2, 96)
(CPME, 4 h, Pd: 8.0 ppm)
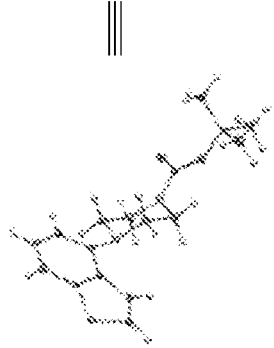
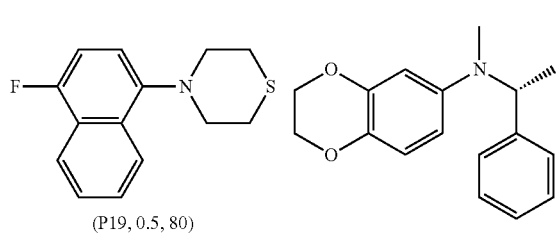
(P19, 0.5, 80)   ((R)-P20: 0.5, 72, ee = 63%)
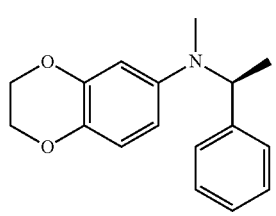
(S)-P20: 0.5, 76, ee = 55%)
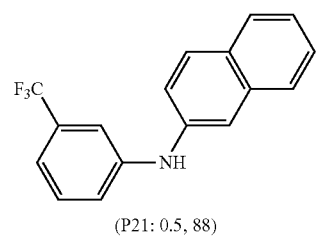
(P21: 0.5, 88)
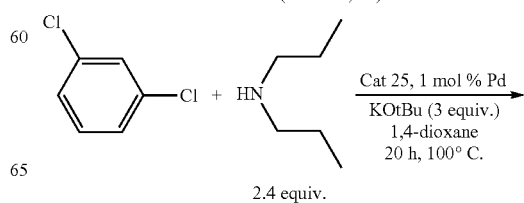
2.4 equiv.
Cat 25, 1 mol % Pd
KOtBu (3 equiv.)
1,4-dioxane
20 h, 100° C.

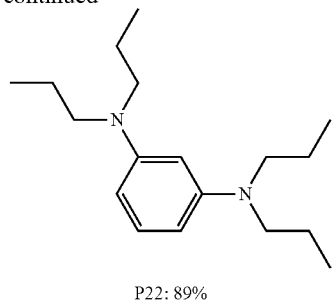

P22: 89%

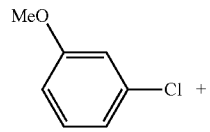

2.4 equiv.

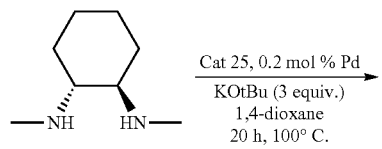

Cat 25, 0.2 mol % Pd
KOtBu (3 equiv.)
1,4-dioxane
20 h, 100° C.

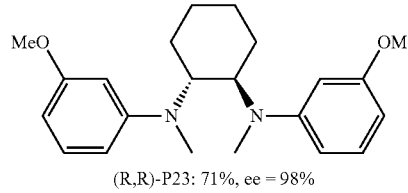

(R,R)-P23: 71%, ee = 98%

Example 13. Evaluation of the Catalysts 9, 29, 30, 32, 33, 35 and 36

Example 13.1. General Procedure for the Catalytic Tests

In a Schlenk-tube equipped with a magnetic stirring bar were introduced the catalyst (x mol % Pd), the base (1.5 or 2.0 equiv.) the aryl halide (1 equiv., if solid) and the boronic acid (1.2 or 1.5 equiv.). The solids were dried under vacuum for 10 minutes, and the Schlenk-tube was backfilled with argon, then evacuated and backfilled with argon 2 more times. Then the aryl halide (1 equiv., if liquid) and the solvent (0.5 M) were introduced under argon. The reaction mixture was stirred for 2 hours at 80° C. using a pre-heated oil bath. Then the reaction was allowed to cool down to room temperature under argon, and the internal standard (hexadecane, 1 equiv.) was added, before diluting the reaction mixture with ethyl acetate. A sample was collected, filtered on a small Dicalite™ pad (rinsed with ethyl acetate) and analysed by GC to determine the conversion and the yield. The reaction mixture was then filtered on a Dicalite™ pad, rinsed with ethyl acetate, and the solvents were evaporated under reduced pressure. The crude material was purified by column chromatography on silica gel, to afford the expected biaryl derivatives as pure products.

Example 13.2. General Procedure for the Leaching Tests

Caution: all the glassware used for the reaction, the storage of solutions and the filtration operations were thoroughly washed with aqua regia, rinsed with distilled water and oven-dried before their use in the residual palladium content determination tests.

In a Schlenk-tube equipped with a magnetic stirring bar were introduced the catalyst (x mol % Pd), the base (1.5 or 2.0 equiv.) the aryl halide (1 equiv., if solid) and the boronic acid (1.2 or 1.5 equiv.). The solids were dried under vacuum for 10 minutes, and the Schlenk-tube was backfilled with argon, then evacuated and backfilled with argon 2 more times. Then the aryl halide (1 equiv., if liquid) and the solvent (0.5 M) were introduced under argon. The reaction mixture was stirred for 2 hours at 80° C. using a pre-heated oil bath. The solution was then allowed to cool down to room temperature under argon for 30 minutes, the crude was filtered on a Dicalite™ pad, rinsed with diethyl ether or ethyl acetate, then a liquid/liquid extraction was performed using distilled water. The organic phase was evaporated and the crude residue was heated under high vacuum (10-1 mmHg) with a heat-gun for 10 to 15 minutes, and the remaining solid was mineralised in nitric acid (69%, TraceMetal grade, V=3 mL) at 140° C. for 2 or 3 h until obtaining a homogeneous light-yellow solution, which was used to perform the ICP-MS analyses.

Example 13.3. Evaluation of the Catalysts Activity in Suzuki-Miyaura Benchmark Reactions

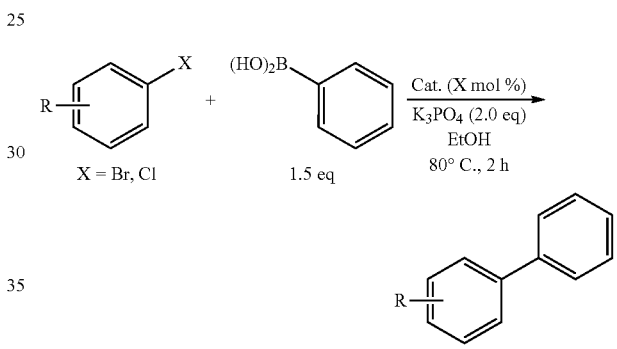

TABLE 17

Comparison of the catalysts activity in Suzuki-Miyaura benchmark reactions.

| Entry | ArX | Pd (mol %) | Cat. | Conv. (%)[a] |
|---|---|---|---|---|
| 5 |  | 2 | Cat. 9 | 74 |
| 6 |  | 0.5 | Cat. 29 | >99[b] |
| 7 | —⟨Br⟩ | 0.5 | Cat. 30 | 68 |
| 8 |  | 0.5 | Cat. 32 | 86 |
| 9 |  | 0.5 | Cat. 33 | >99 |
| 10 |  | 0.5 | Cat. 35 | >99 |
| 11 |  | 1 | Cat. 36 | 71 |

[a]Conversion determined by GC analysis.
[b]reaction performed at 60° C.

Example 13.4. Evaluation of the Catalysts Activity in Suzuki-Miyaura Benchmark Reaction Between 2-Amino-5-Chloropyrazine and Phenylboronic Acid

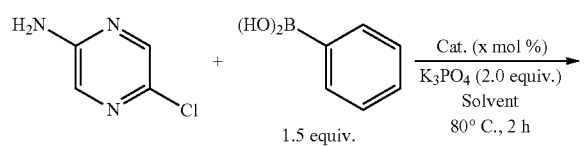

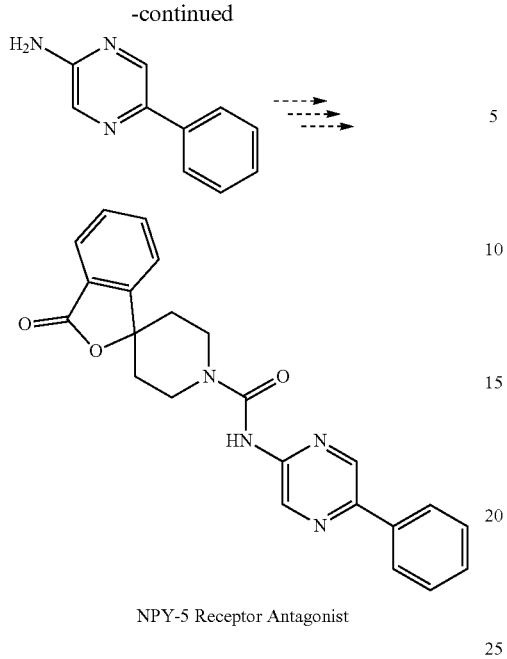

NPY-5 Receptor Antagonist

2-Amino-5-phenylpyrazine

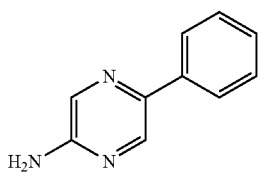 [SMILES: Nc1cnc(-c2ccccc2)cn1]

The reaction mixture was filtered on a Dicalite® pad with EtOAc and the filtrate was concentrated under reduced pressure. The crude was purified by silica gel column chromatography (DCM/ACN=98:2 to 75:25) to afford 158.7 mg (93%) of the pure desired compound as a yellow solid.

TABLE 18

Catalysts activity and Pd contamination for the Suzuki-Miyaura reaction between 2-amino-5-chloropyrazine and phenylboronic acid.

| Entry | Cat. | Pd (× mol %) | Solvent | Yield (%)[a] | Pd content (ppm) |
|---|---|---|---|---|---|
| 1 | Cat. 33 | 1 | EtOH/H$_2$O (9:1) | 87 | 119 |
| 2 | Cat. 35 | 1 | EtOH/H$_2$O (9:1) | 94 (93)[b] | 103 |
| 3 | PEPPSI-IPr | 1 | EtOH/H$_2$O (4:1) | 92 | 1430 |
| 4 | Pd(OAc)$_2$/XPhos (1:2) | 0.5 | EtOH/H$_2$O (4:1) | 91 | 2410 |

[a] GC yield using hexadecane as internal standard;
[b] Isolated yield.

Example 13.5. Evaluation of the Catalysts Activity in Suzuki-Miyaura Benchmark Reaction Between 1,2,3-trifluoro-5-bromobenzene and 2-aminophenylboronic acid

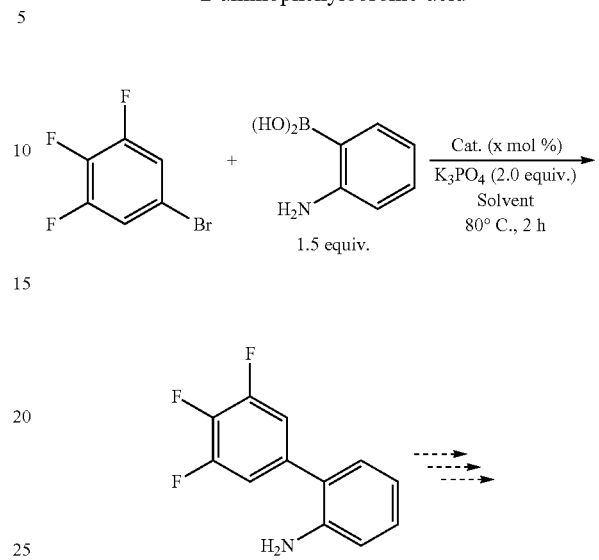

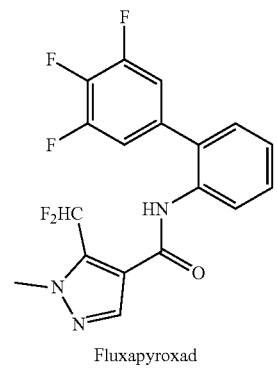

Fluxapyroxad

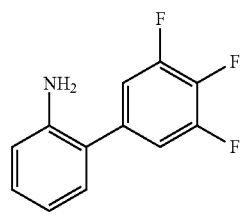 [SMILES: Nc1ccccc1-c1cc(F)c(F)c(F)c1]

3',4',5'-Trifluoro-[1,1'-biphenyl]-2-amine

The reaction mixture was filtered on a Dicalite® pad with EtOAc and the filtrate was concentrated under reduced pressure. The crude was purified by silica gel column chromatography (petroleum ether/EtOAc/triethylamine=80:17:3) to afford 209.8 mg (94%) of the pure desired compound as a brown solid.

TABLE 19

Catalysts activity and Pd contamination for the Suzuki-Miyaura reaction between 1,2,3-trifluoro-5-bromobenzene and 2-aminophenylboronic acid.

| Entry | Cat. | Pd (x mol %) | Solvent | Yield (%)[a] | Pd content (ppm) |
|---|---|---|---|---|---|
| 1 | Cat.33 | 0.2 | EtOH | >99 | 59 |
| 2 | Cat.35 | 0.2 | EtOH | >99 (94)[b] | 65 |
| 3 | PEPPSI-IPr | 0.2 | EtOH | >99 | 776 |
| 5 | Pd(OAc)$_2$/XPhos (1:2) | 0.5 | EtOH/H$_2$O (4:1) | >99 | 110 |
| 6 | Pd(PPh$_3$)$_4$ | 1 | Dioxane/H$_2$O (4:1) | >99 | 2426 |

[a]GC yield using hexadecane as internal standard;
[b]Isolated yield.

Example 13.6. Evaluation of the Catalysts Activity in Suzuki-Miyaura Benchmark Reaction Between 1,2,3-trifluoro-5-bromobenzene and 2-aminophenylboronic acid

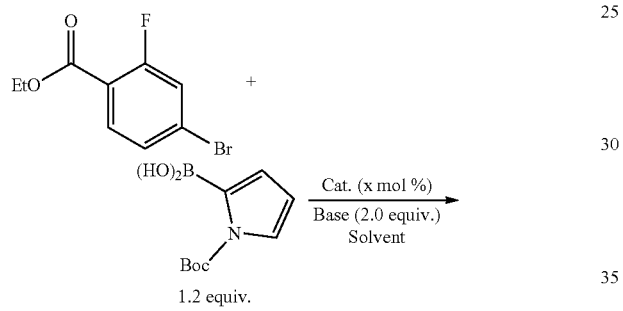

Ethyl 4-(N-Boc-pyrrolyl)-2-fluorobenzoate

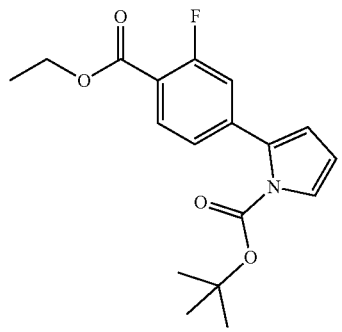 [SMILES: CCOC(=O)c1ccc(-c2cccn2C(=O)OC(C)(C)C)cc1F]

The reaction mixture was filtered on a Dicalite® pad with EtOAc and the filtrate was concentrated under reduced pressure. The crude was purified by silica gel column chromatography (petroleum ether/acetone=97:3 to 95:5) to afford 296.7 mg (89%) of the pure desired compound as a colorless oil (which became pink red after 1 day of storage).

TABLE 20

Catalysts activity and Pd contamination for the Suzuki-Miyaura reaction between ethyl 2-fluoro-4-bromobenzoate and N-Boc-2-pyrrolylboronic acid.

| Entry | Cat. | Pd (x mol %) | Base | Yield (%)[a] | Pd content (ppm) |
|---|---|---|---|---|---|
| 1[b] | Cat. 33 | 0.5 | K$_2$CO$_3$ | 86 | 23 |
| 2[b] | Cat. 35 | 0.5 | K$_2$CO$_3$ | 89 (89)[c] | 14 |
| 3[b] | PEPPSI-IPr | 0.5 | K$_2$CO$_3$ | 89 | 83 |
| 4[d] | Pd(OAc)$_2$/XPhos (1:2) | 0.5 | K$_3$PO$_4$/K$_2$HPO$_4$ | 91 | 476 |
| 5[d] | Pd(dtbpf)Cl$_2$ | 0.5 | K$_3$PO$_4$/K$_2$HPO$_4$ | 96 | 459 |

[a]GC yield using hexadecane as internal standard;
[b]EtOH, 80° C., 2 h;
[c]Isolated yield;
[d]DME/H$_2$O/EtOH (51:37:12), 25° C., 4 h.

The invention claimed is:

1. A compound selected from:

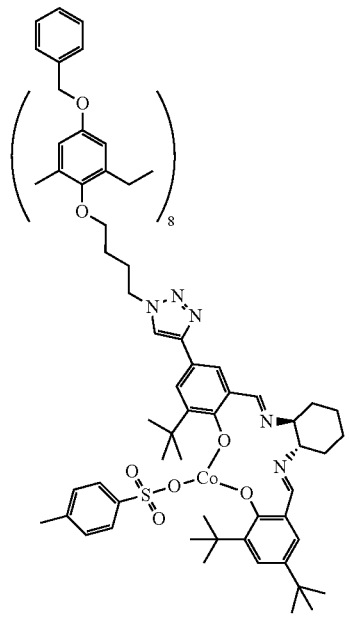

117
-continued
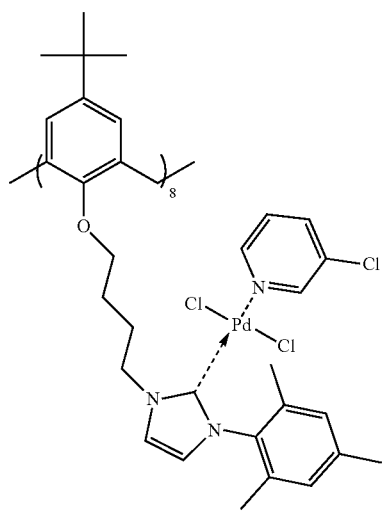
118
-continued
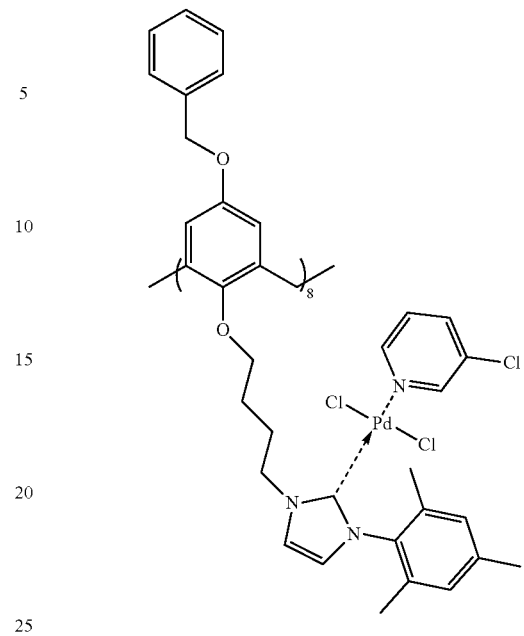
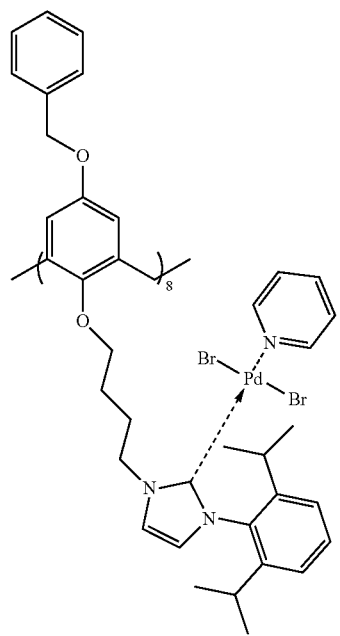
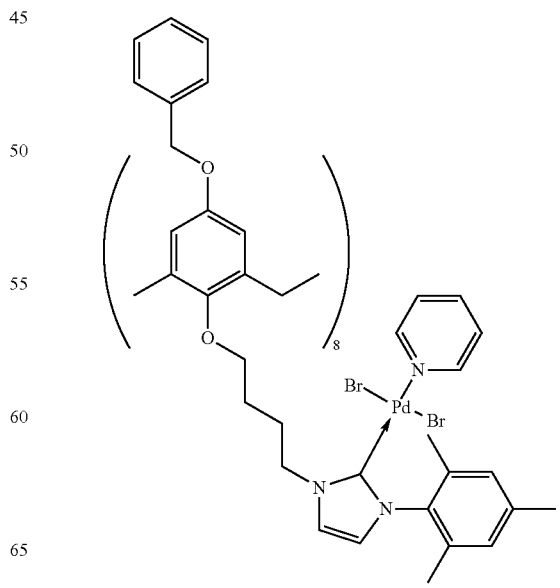

119
-continued
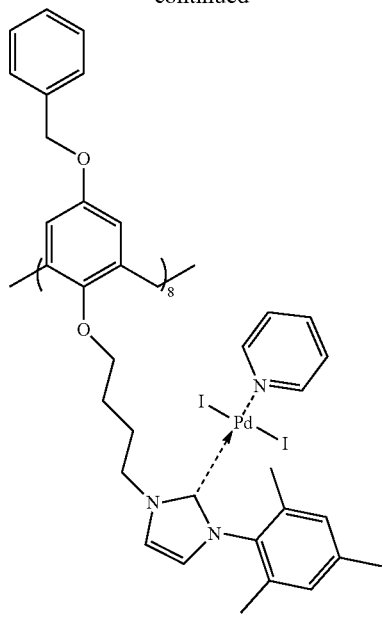
2. A compound selected from:
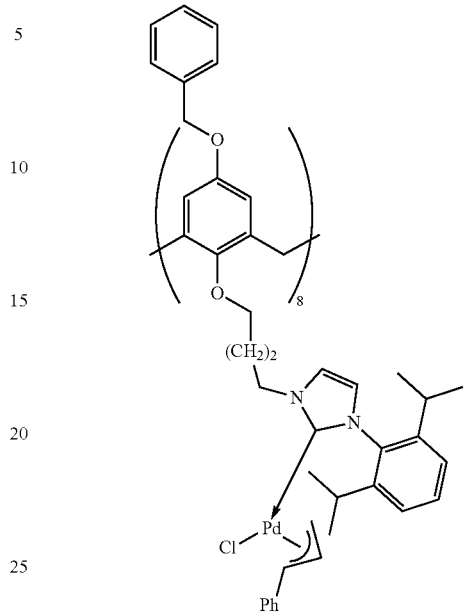
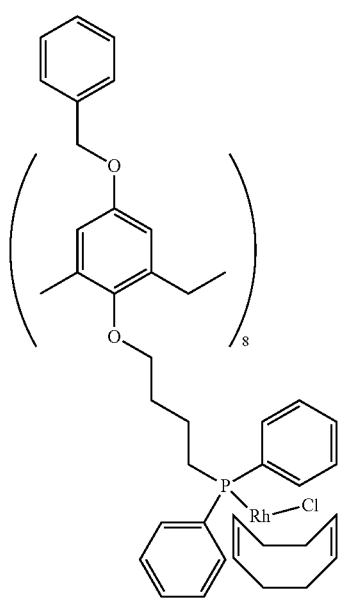
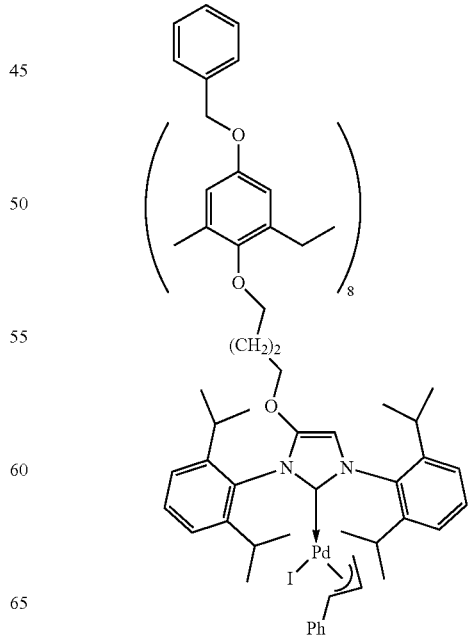

121
-continued
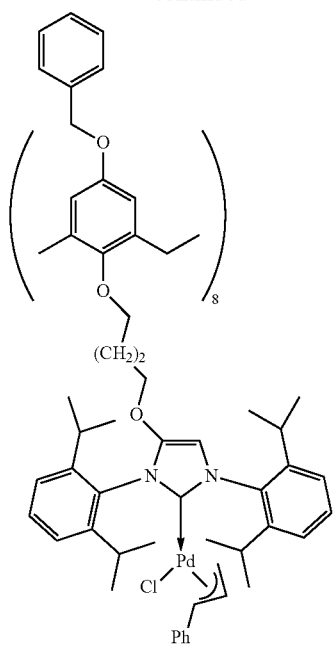
122
-continued
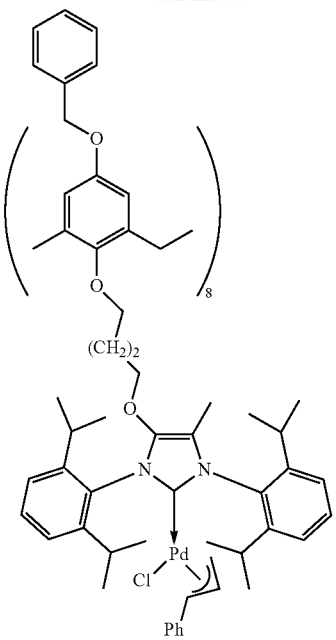
3. A compound selected from:

123
-continued
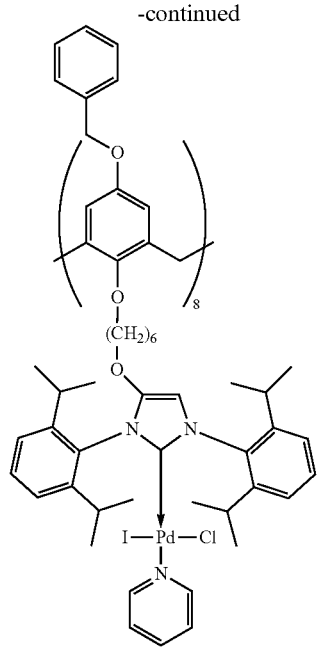
124
-continued
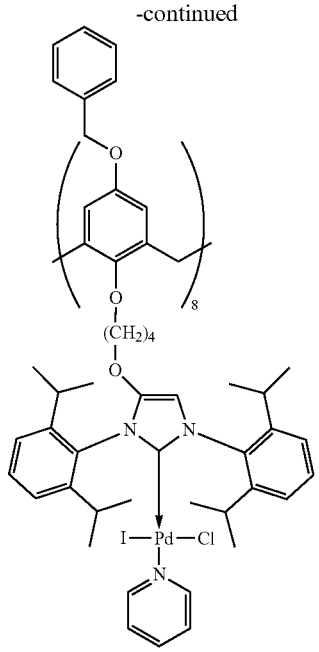
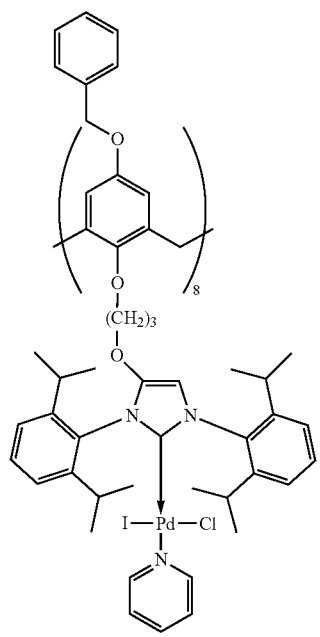
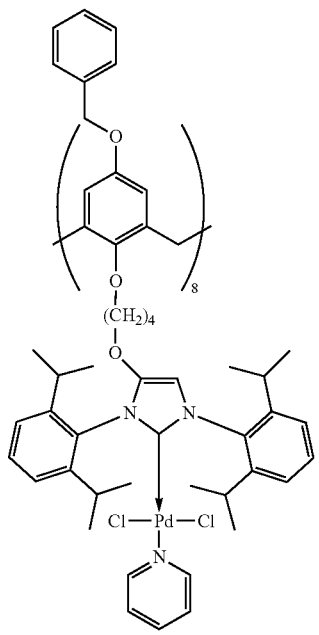

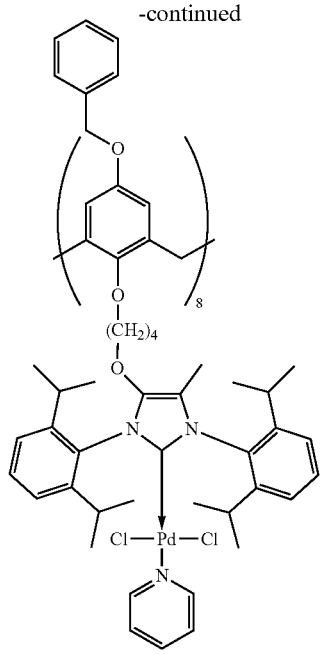
* * * * *